US012335675B2

(12) United States Patent
Huwe et al.

(10) Patent No.: US 12,335,675 B2
(45) Date of Patent: Jun. 17, 2025

(54) HEADPHONE EARTIPS WITH INTERNAL SUPPORT COMPONENTS FOR OUTER EARTIP BODIES

(71) Applicant: APPLE INC., Cupertino, CA (US)

(72) Inventors: Ethan L. Huwe, Sunnyvale, CA (US); Brad G. Boozer, Saratoga, CA (US); Erik L. Wang, Redwood City, CA (US); Phillip Qian, San Jose, CA (US)

(73) Assignee: APPLE INC., Cupertino, CA (US)

( * ) Notice: Subject to any disclaimer, the term of this patent is extended or adjusted under 35 U.S.C. 154(b) by 297 days.

(21) Appl. No.: 18/127,301

(22) Filed: Mar. 28, 2023

(65) Prior Publication Data

US 2023/0239605 A1 Jul. 27, 2023

Related U.S. Application Data

(63) Continuation of application No. 17/202,283, filed on Mar. 15, 2021, now Pat. No. 11,647,319, which is a continuation of application No. 16/983,736, filed on Aug. 3, 2020, now Pat. No. 10,979,795, which is a continuation of application No. 16/780,881, filed on Feb. 3, 2020, now Pat. No. 10,771,879, which is a continuation of application No. 16/148,552, filed on Oct. 1, 2018, now Pat. No. 10,595,113, which is a (Continued)

(51) Int. Cl.
*H04R 1/10* (2006.01)

(52) U.S. Cl.
CPC ......... *H04R 1/1016* (2013.01); *H04R 1/1058* (2013.01)

(58) Field of Classification Search
CPC .. H04R 1/1016; H04R 25/652; H04R 25/656; H04R 2225/77
See application file for complete search history.

(56) References Cited

U.S. PATENT DOCUMENTS

| | | | |
|---|---|---|---|
| 5,046,580 | A | 9/1991 | Barton |
| 5,201,007 | A | 4/1993 | Ward et al. |

(Continued)

FOREIGN PATENT DOCUMENTS

| | | |
|---|---|---|
| CN | 202496050 | 10/2012 |
| CN | 202773060 | 3/2013 |

(Continued)

OTHER PUBLICATIONS

Final Office Action issued in U.S. Appl. No. 15/253,794, dated Mar. 22, 2018 in 13 pages (of-record in parent application).

(Continued)

*Primary Examiner* — Ryan Robinson
(74) *Attorney, Agent, or Firm* — Kilpatrick Townsend & Stockton LLP

(57) ABSTRACT

Headphone eartips with internal support components and methods for making the same are provided. Different support components may provide specific amounts and types of additional rigidity at specific portions of an exterior surface of an outer eartip body that may be expected to interface with specific portions of an ear canal geometry when an eartip subassembly is positioned within the ear canal, such that the eartip subassembly may conform to the various shapes of the ear canal while maintaining an acoustic seal.

20 Claims, 34 Drawing Sheets

Related U.S. Application Data continuation of application No. 15/253,794, filed on Aug. 31, 2016, now Pat. No. 10,129,625.

(60) Provisional application No. 62/234,864, filed on Sep. 30, 2015.

(56) References Cited

U.S. PATENT DOCUMENTS

| | | | | |
|---|---|---|---|---|
| 5,659,156 | A * | 8/1997 | Mauney | H04R 1/1016 381/328 |
| 6,513,621 | B1 | 2/2003 | Deslauriers et al. | |
| 8,116,495 | B2 | 2/2012 | Spaulding | |
| 8,165,332 | B2 | 4/2012 | Giese et al. | |
| 8,194,911 | B2 * | 6/2012 | Dyer | H04R 1/1016 181/135 |
| 8,208,676 | B2 | 6/2012 | Murozaki et al. | |
| 8,243,976 | B2 | 8/2012 | Giese et al. | |
| 8,280,093 | B2 | 10/2012 | Siahaan et al. | |
| 8,590,665 | B2 | 11/2013 | Stiehl et al. | |
| 8,638,970 | B2 | 1/2014 | Burton | |
| 8,678,011 | B2 | 3/2014 | Goldstein et al. | |
| 8,848,964 | B2 | 9/2014 | Erdel | |
| 9,088,847 | B2 | 7/2015 | Young-Mun | |
| 9,955,247 | B2 * | 4/2018 | Huwe | H04R 1/1016 |
| 10,129,625 | B2 | 11/2018 | Huwe et al. | |
| 10,178,460 | B2 * | 1/2019 | Jou | H04R 1/1058 |
| 10,595,113 | B2 | 3/2020 | Huwe et al. | |
| 10,771,879 | B2 | 9/2020 | Huwe et al. | |
| 10,979,795 | B2 | 4/2021 | Huwe et al. | |
| 10,986,433 | B2 | 4/2021 | McIntosh et al. | |
| 11,072,101 | B2 * | 7/2021 | Huang | B29C 45/14 |
| 11,647,319 | B2 | 5/2023 | Huwe et al. | |
| 2002/0006209 | A1 | 1/2002 | Mahoney et al. | |
| 2003/0172938 | A1 | 9/2003 | Falco | |
| 2003/0178247 | A1 | 9/2003 | Saltykov | |
| 2006/0045299 | A1 | 3/2006 | Haussmann | |
| 2006/0233411 | A1 | 10/2006 | Utigard | |
| 2007/0071265 | A1 | 3/2007 | Leedom et al. | |
| 2007/0183613 | A1 | 8/2007 | Juneau et al. | |
| 2008/0019554 | A1 | 1/2008 | Krywko | |
| 2008/0240485 | A1 | 10/2008 | Dyer et al. | |
| 2009/0103764 | A1 | 4/2009 | Stiehl et al. | |
| 2010/0177919 | A1 | 7/2010 | Giese et al. | |
| 2010/0307861 | A1 | 12/2010 | Tiemens | |
| 2011/0051979 | A1 | 3/2011 | Lee et al. | |
| 2011/0268308 | A1 | 11/2011 | Vasquez | |
| 2013/0188819 | A1 | 7/2013 | Young-Mun | |
| 2014/0166389 | A1 | 6/2014 | Young-Mun | |
| 2015/0049897 | A1 | 2/2015 | Blanchard | |
| 2016/0057551 | A1 | 2/2016 | Higgins et al. | |
| 2017/0094387 | A1 | 3/2017 | Huwe et al. | |
| 2019/0141430 | A1 | 5/2019 | Huwe et al. | |
| 2020/0177983 | A1 | 6/2020 | Huwe et al. | |
| 2020/0314519 | A1 | 10/2020 | Hatfield et al. | |
| 2020/0366981 | A1 | 11/2020 | Huwe et al. | |
| 2021/0258678 | A1 | 8/2021 | Huwe et al. | |

FOREIGN PATENT DOCUMENTS

| | | | | |
|---|---|---|---|---|
| CN | 103220589 | | | 7/2013 |
| CN | 107925810 | | | 12/2019 |
| EP | 2124477 | | | 11/2009 |
| EP | 2709383 | | | 3/2014 |
| JP | 2011139180 | A | * | 7/2011 |
| KR | 101341867 | | | 12/2013 |
| WO | 2004100608 | | | 11/2004 |

OTHER PUBLICATIONS

First Action Interview Pilot Program Pre-Interview Communication issued in U.S. Appl. No. 15/253,794, dated Jul. 7, 2017 in 4 pages (of-record in parent application).

First Action Interview Pilot Program Pre-Interview Communication issued in U.S. Appl. No. 15/253,794, dated Nov. 22, 2017 in 6 pages (of-record in parent application).

Notice of Allowance issued in U.S. Appl. No. 15/253,794, dated Jul. 16, 2018 in 5 pages (of-record in parent application).

First Action Interview Office Action Summary issued in U.S. Appl. No. 16/148,552, dated Jul. 31, 2019 in 5 pages (of-record in parent application).

First Action Interview Pilot Program Pre-Interview Communication issued in U.S. Appl. No. 16/148,552, dated Apr. 25, 2019 in 4 pages (of-record in parent application).

Notice of Allowance issued in U.S. Appl. No. 16/148,552, dated Nov. 8, 2019 in 8 pages (of-record in parent application).

First Action Interview Pilot Program Pre-Interview Communication issued in U.S. Appl. No. 16/780,881, dated Mar. 3, 2020 in 5 pages (of-record in parent application).

Notice of Allowance issued in U.S. Appl. No. 16/780,881, dated Jun. 4, 2020 in 7 pages (of-record in parent application).

Supplemental Notice of Allowability issued in U.S. Appl. No. 16/780,881, dated Jun. 23, 2020 in 2 pages (of-record in parent application).

Notice of Allowance issued in U.S. Appl. No. 16/983,736, dated Dec. 18, 2020 in 11 pages (of-record in parent application).

Final Office Action issued in U.S. Appl. No. 17/202,283, dated Dec. 16, 2022 in 7 pages (of-record in parent application).

Non-Final Office Action issued in U.S. Appl. No. 17/202,283, dated Oct. 4, 2022 in 8 pages (of-record in parent application).

Notice of Allowance issued in U.S. Appl. No. 17/202,283, dated Feb. 24, 2023 in 6 pages (of-record in parent application).

Notice of Decision to Grant issued in China Application No. CN201680050032.X, dated Oct. 28, 2019 in 2 pages (of-record in parent application).

Office Action issued in China Application No. CN201680050032.X, dated Mar. 4, 2019 in 22 pages (of-record in parent application).

Notice of Decision to Grant issued in China Application No. CN202010031194.7, dated Jul. 27, 2022 in 2 pages (of-record in parent application).

Office Action issued in China Application No. CN202010031194.7, dated May 7, 2022 in 3 pages (of-record in parent application).

Office Action issued in China Application No. CN202010031194.7, dated Mar. 1, 2021 in 31 pages (of-record in parent application).

Office Action issued in China Application No. CN202010031194.7, dated Jan. 6, 2022 in 7 pages (of-record in parent application).

International Preliminary Report on Patentability issued in PCT Application No. PCT/US2016/049794, dated Apr. 12, 2018 in 12 pages (of-record in parent application).

International Search Report and Written Opinion issued in PCT Application No. PCT/US2016/049794, dated Nov. 18, 2016 in 14 pages (of-record in parent application).

* cited by examiner

HEADPHONE EARTIPS WITH INTERNAL SUPPORT COMPONENTS FOR OUTER EARTIP BODIES

CROSS-REFERENCE TO RELATED APPLICATIONS

This application is a continuation of U.S. patent application Ser. No. 17/202,283, filed on Mar. 15, 2021, which is a continuation of U.S. patent application Ser. No. 16/983,736, filed on Aug. 3, 2020, now U.S. Pat. No. 10,979,795, which is a continuation of U.S. patent application Ser. No. 16/780,881, filed Feb. 3, 2020, now U.S. Pat. No. 10,771,879, which is a continuation Ser. No. 16/148,552, filed Oct. 1, 2018, now U.S. Pat. No. 10,595,113, which is a continuation of U.S. patent application Ser. No. 15/253,794, filed Aug. 31, 2016, now U.S. Pat. No. 10,129,625, issued on Nov. 13, 2018, which claims the benefit of U.S. Patent Application No. 62/234,864, filed Sep. 30, 2015. Each of the Ser. Nos. 16/983,736; 16/780,881; 16/148,552; 15/253,794; and 62/234,864 applications listed above are incorporated by reference herein in their entirety.

FIELD

This disclosure relates to headphone eartips with internal support components and methods for making the same.

BACKGROUND

Whether listening to sound from a portable media player while traveling or from a theater system while at home, consumers often use headphones rather than open air loudspeakers to do so. Some headphones include at least one earpiece with a driver for emitting sound waves and an eartip communicatively coupled to the driver and insertable into a user's ear canal for directing the sound waves from the driver and through the user's ear canal towards the user's eardrum. When such headphones are worn by a user, the eartip may deform in order to fit inside the user's ear canal. However, such eartips are often unable to obtain or maintain a deformed shape that substantially matches the unique shape of a particular user's ear canal in order to create an efficient acoustic seal. Accordingly, alternative eartips for earpieces are needed.

SUMMARY OF THE DISCLOSURE

This document describes headphone eartips with internal support components and methods for making the same.

As an example, an eartip that is operative to be at least partially positioned within an ear canal may include an inner eartip body including an inner eartip front end with an inner eartip front opening through the inner eartip front end, an inner eartip back end with an inner eartip back opening through the inner eartip back end, an inner eartip interior surface extending between the inner eartip front opening and the inner eartip back opening for defining an inner eartip space, and an inner eartip exterior surface extending about the inner eartip interior surface between the inner eartip front end and the inner eartip back end. The eartip may also include an outer eartip body that is operative to deform when the eartip is at least partially positioned within the ear canal. The outer eartip body may include an outer eartip front end with an outer eartip front opening through the outer eartip front end, wherein the outer eartip front end is coupled to the inner eartip front end for at least partially aligning the inner eartip front opening and the outer eartip front opening, an outer eartip back end with an outer eartip back opening through the outer eartip back end, an outer eartip interior surface extending between the outer eartip front opening and the outer eartip back opening for defining an outer eartip space, and an outer eartip exterior surface extending about the outer eartip interior surface between the outer eartip front end and the outer eartip back end. The eartip may also include an internal support subsystem including a support body extending between a first support body end and a second support body end. The first support body end is coupled to one of the inner eartip exterior surface and the outer eartip interior surface. The internal support subsystem further includes a flap that extends from the second support body end. A flap surface portion of the flap interfaces with an interface surface portion of the other one of the inner eartip exterior surface and the outer eartip interior surface. A contour of the flap surface portion matches a contour of the interface surface portion.

As another example, an eartip for use with a sound emitting component may include an outer eartip body defining an outer eartip space and operative to be at least partially positioned within an ear canal, an inner eartip body coupled to the outer eartip body and defining an inner eartip space at least partially within the outer eartip space for passing sound from the sound emitting component, and an internal support subsystem including a support body extending between a first support body end that is coupled to the inner eartip body and a second support body end that interfaces with an interface portion of the outer eartip body that defines a spiral with respect to a longitudinal axis of the inner eartip space.

As yet another example, an eartip for use with a sound emitting component may include an outer eartip body defining an outer eartip space and operative to be at least partially positioned within an ear canal, and an internal support subsystem including a support body coupled to the outer eartip body. The support body and a portion of the outer eartip body together define a fluid enclosure space within the outer eartip space. A portion of the support body defines at least a portion of an inner eartip space within the outer eartip space. The inner eartip space is operative to at least one of at least partially retain at least a portion of the sound emitting component and provide at least a portion of a path for passing sound from the sound emitting component.

As yet another example, an earpiece that is operative to be at least partially positioned within an ear canal may include an eartip subassembly including an inner eartip body, an outer eartip body that is operative to deform when the earpiece is at least partially positioned within the ear canal, and an internal support subsystem. The inner eartip body may include an inner eartip front end with an inner eartip front opening through the inner eartip front end, an inner eartip back end with an inner eartip back opening through the inner eartip back end, an inner eartip interior surface extending between the inner eartip front opening and the inner eartip back opening for defining an inner eartip space, and an inner eartip exterior surface extending about the inner eartip interior surface between the inner eartip front end and the inner eartip back end. The outer eartip body may include an outer eartip front end with an outer eartip front opening through the outer eartip front end, wherein the outer eartip front end is coupled to the inner eartip front end for at least partially aligning the inner eartip front opening and the outer eartip front opening, an outer eartip back end with an outer eartip back opening through the outer eartip back end, an outer eartip interior surface extending between the outer eartip front opening and the outer eartip back opening for defining an outer eartip space, and an outer eartip exterior surface extending about the outer eartip interior surface between the outer eartip front end and the outer eartip back end. The internal support subsystem may include an internal support component, wherein the internal support component contacts at least a portion of the inner eartip body, wherein the internal support component extends at least partially about the inner eartip space and along at least a portion of the length of the inner eartip space, and wherein the internal support component is operative to ensure that a cross-sectional area of the inner eartip space exists along the at least a portion of the length of the inner eartip space when the earpiece is at least partially positioned within the ear canal.

As yet another example, an earpiece that is operative to be at least partially positioned within an ear canal may include a transducer subassembly, an eartip subassembly including an outer eartip body defining an outer eartip space and operative to be at least partially positioned within the ear canal and an inner eartip body coupled to the outer eartip body and defining an inner eartip space at least partially within the outer eartip space, and an internal support subsystem including an internal support component, wherein the internal support component at least partially couples the transducer subassembly to the eartip subassembly such that the transducer subassembly is operative to emit sound into the inner eartip space, and wherein the internal support component is operative to ensure that a cross-sectional area of the inner eartip space exists along at least a portion of the length of the inner eartip space when the earpiece is at least partially positioned within the ear canal.

As yet another example, an earpiece that is operative to be at least partially positioned within an ear canal may include a transducer subassembly, an eartip subassembly including an outer eartip body defining an outer eartip space and operative to be at least partially positioned within the ear canal and an inner eartip body coupled to the outer eartip body and defining an inner eartip space at least partially within the outer eartip space, and an internal support subsystem comprising an internal support component, wherein the internal support component at least partially couples the transducer subassembly to the eartip subassembly such that the transducer subassembly is operative to emit sound into the inner eartip space, and wherein a portion of the internal support component extends within the inner eartip body at least partially about the inner eartip space.

This Summary is provided merely to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which.

DETAILED DESCRIPTION

Headphone eartips with internal support components and methods for making the same are provided and described with reference to FIGS. 1-34.

An earpiece of a headphone assembly may include a transducer subassembly that may be operative to emit sound and an eartip subassembly that may be operative to deform in order to fit inside a user's ear canal. The eartip subassembly may include an outer eartip body that may define an exterior surface of the earpiece that may conform to the geometry of a user's ear canal for creating a consistent and comfortable acoustic seal between the earpiece and the user. The eartip subassembly may also include an inner eartip body coupled to the transducer subassembly and to the outer eartip body. The inner eartip body may define an inner eartip space positioned at least partially within an outer eartip space defined by the outer eartip body, where the inner eartip space may be operative to pass the sound emitted by the transducer subassembly through the outer eartip space and into the user's ear canal. Independent of any geometry or material variability of the inner eartip body and/or of the outer eartip body of an eartip subassembly, one or more internal support subsystems may be provided to vary the effective rigidity of an eartip body of the eartip subassembly for affecting the ability of the eartip subassembly to conform to various ear canal geometries. Different support components of one or more internal support subsystems may be positioned and configured to provide specific amounts and types of additional rigidity at specific portions of the exterior surface of the outer eartip body that may be expected to interface with specific portions of a user's ear canal geometry when the eartip subassembly is positioned within the user's ear canal (e.g., such that the eartip subassembly may be operative to conform to different bumps along the surfaces of the ear canal while maintaining an acoustic seal and while providing comfort to the user). Additionally or alternatively, at least one support component of an internal support subsystem may be positioned and configured to provide specific amounts and types of additional rigidity at specific portions of the inner eartip body defining the inner eartip space (e.g., such that the inner eartip space may be operative to ensure an effective sound path while also at least partially conforming to various ear canal geometries).

FIGS. 1-4

Figure 1:
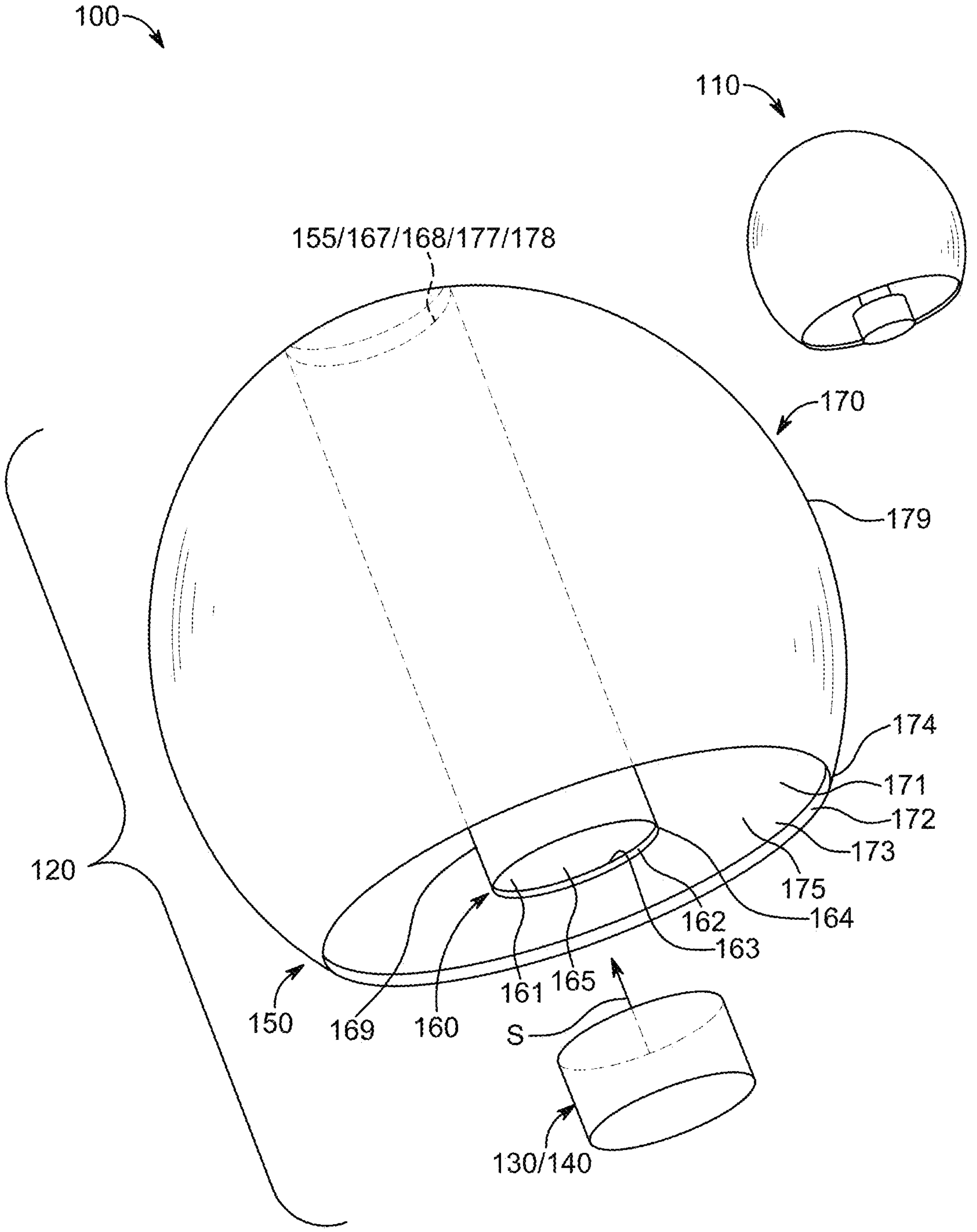
FIG. 1 is a perspective view of an illustrative headphone assembly that includes two earpieces with internal support components, where one of the two earpieces is shown fully assembled and the other of the two earpieces is shown exploded.

For example, as shown in FIG. 1, a headphone assembly 100 may provide any suitable headphones that may include one earpiece or a pair of earpieces, such as a first earpiece assembly 110 for use with a user's left ear and a second earpiece assembly 120 for use with a user's right ear. When a user wears headphone assembly 100 by inserting at least a portion of an eartip of each earpiece in a respective ear canal, that portion of the eartip may be operative to deform so as to fit within the unique shape of the particular user's ear canal and also to press outwardly against at least a portion of the user's ear canal for creating an efficient acoustic seal that may be suitable to hold the eartip in the ear canal such that sound may be provided from the earpiece and through the ear canal towards the user's eardrum. Such an earpiece may be referred to as a canalphone or an in-ear-monitor ("IEM"), or sometimes as an earbud (e.g., an in the canal earbud or an occluding earbud).

Figure 2:
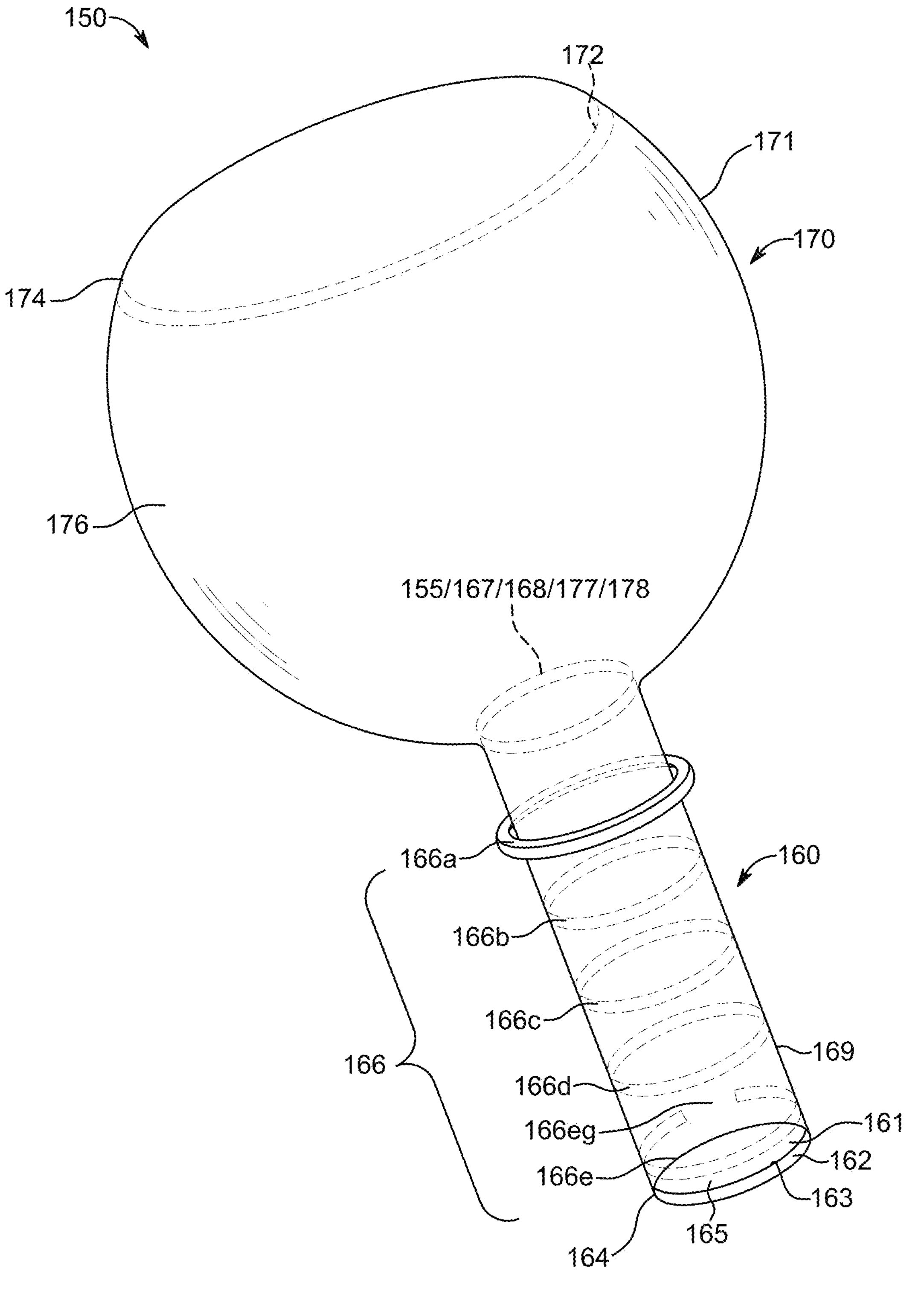
FIG. 2 is a perspective view of a portion of one of the earpieces of FIG. 1 as manufactured prior to inversion.
Figure 3:
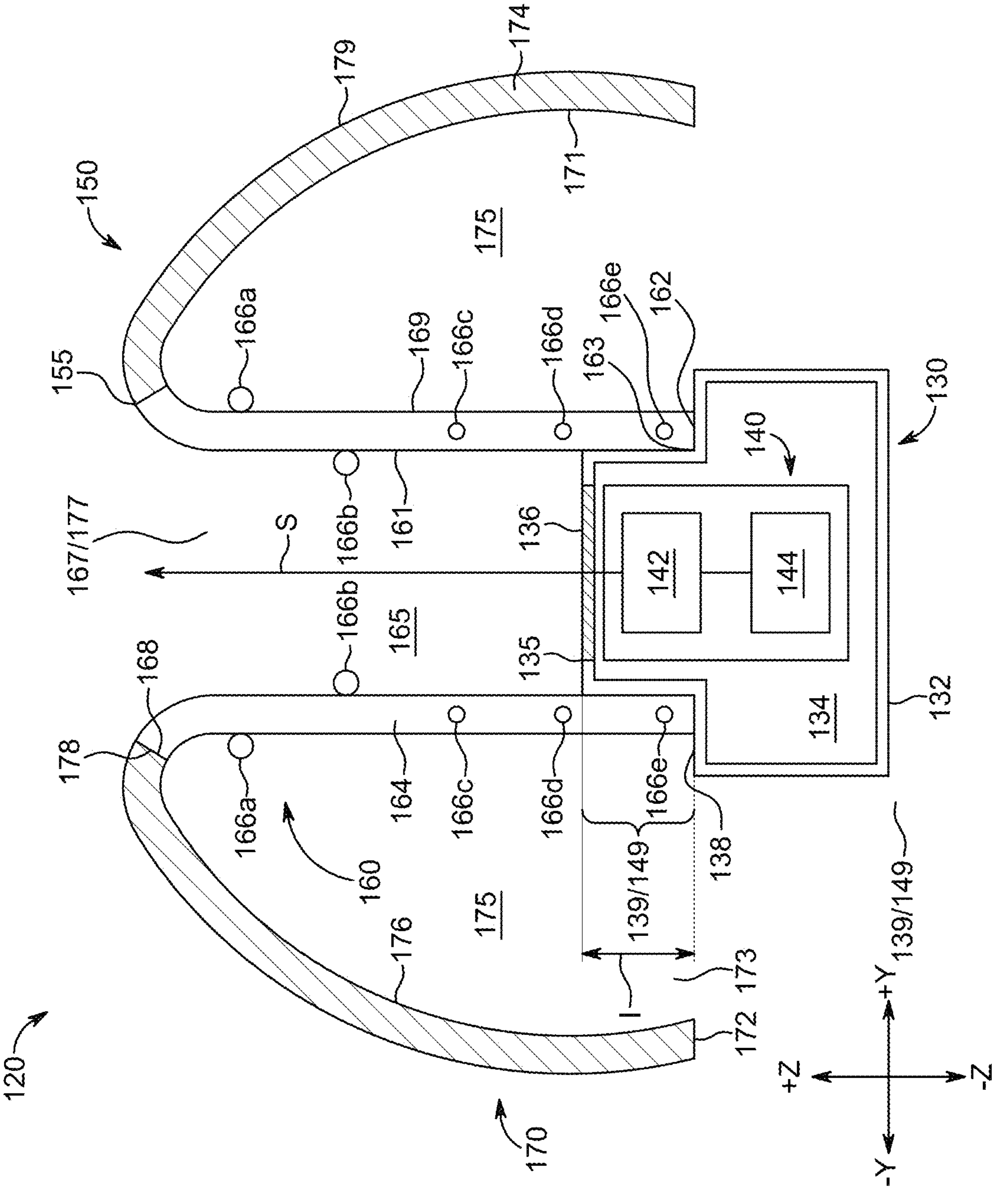
FIG. 3 is a cross-sectional view of the fully assembled earpiece of FIGS. 1 and 2.
Figure 4:
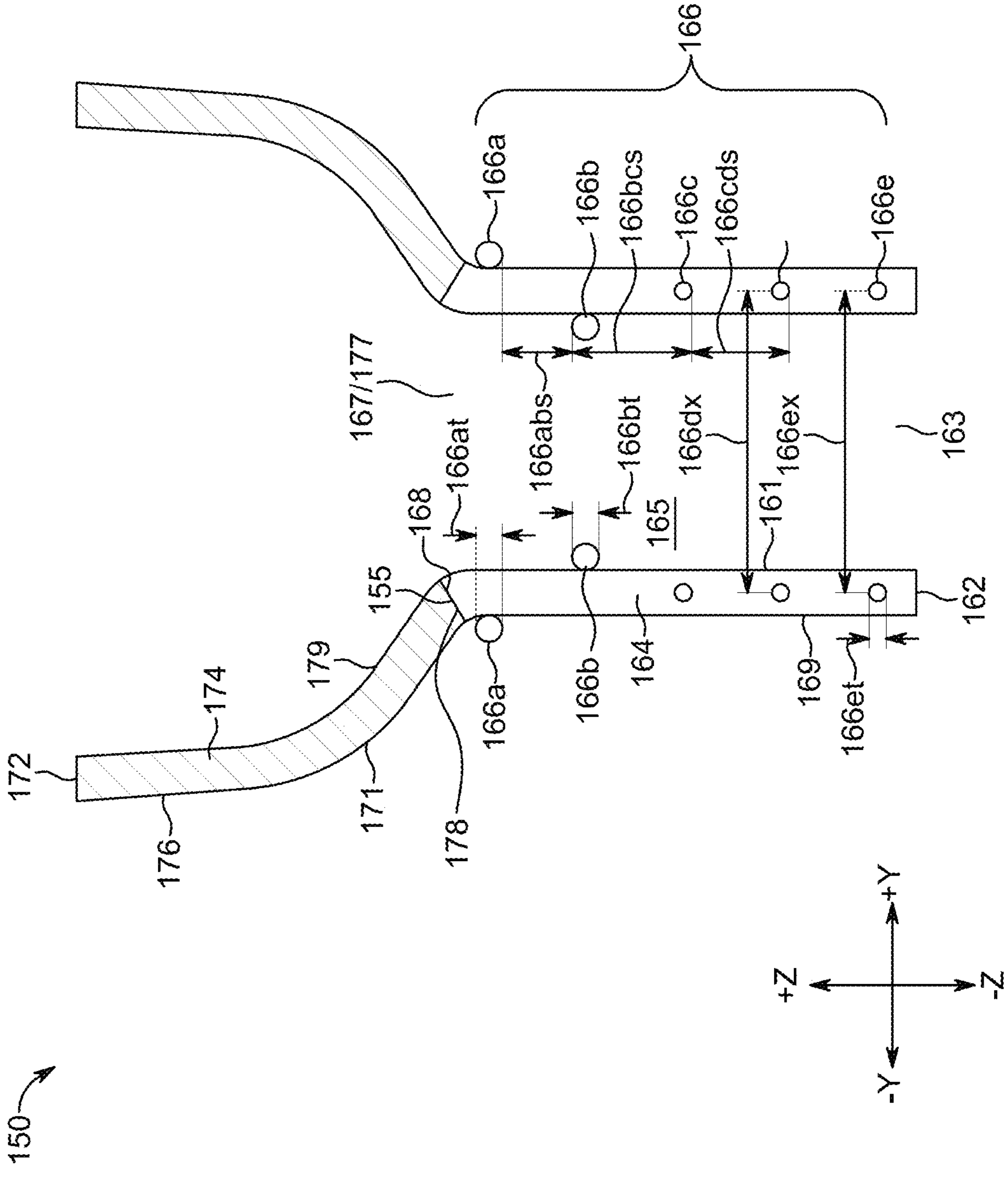
FIG. 4 is a cross-sectional view of a portion of the earpiece of FIGS. 1-3 as manufactured prior to inversion.

As shown in FIG. 1 as well as in FIGS. 2-4, earpiece 120 may include a housing subassembly 130, a sound emitting subassembly 140, and an eartip subassembly 150. Housing subassembly 130 may be operative to house at least a portion of sound emitting subassembly 140 and/or to communicatively couple sound emitting subassembly 140 to an inner eartip space 165 of eartip subassembly 150. Sound emitting subassembly 140 may be operative to emit sound S for passage through inner eartip space 165 of eartip subassembly 150. Eartip subassembly 150 may be operative to provide a comfortable fit for earpiece 120 at least partially within an ear canal of a user and/or to form an acoustic seal between earpiece 120 and the ear canal and/or to pass sound S through the ear canal via inner eartip space 165 when headphone assembly 100 is worn by the user. It is to be understood that while FIGS. 2-4 may illustrate only earpiece 120 of the pair of earpieces 110 and 120 of headphone assembly 100, one, some, or all of the features of earpiece 120, alone and/or with respect to an ear of a user, may also apply to earpiece 110, alone and/or with respect to another ear of a user.

Housing subassembly 130 may include a housing portion 132, which may at least partially define a housing space 134. Housing portion 132 may provide at least a portion of an enclosure that may be operative to protect or hold at least a portion of sound emitting subassembly 140 in housing space 134. At least a portion of housing subassembly 130 (e.g., housing portion 132) and/or at least a portion of sound emitting subassembly 140 may be coupled to eartip subassembly 150 for enabling sound emitting subassembly 140 to be acoustically communicatively coupled with inner eartip space 165 of eartip subassembly 150. For example, housing portion 132 may include a housing opening that may be operative to enable a portion of sound emitting subassembly 140 that emits sound S to extend out from housing space 134 and into inner eartip space 165 of eartip subassembly 150 such that sound emitting subassembly 140 may emit sound S directly into inner eartip space 165 when eartip subassembly 150 is coupled to housing subassembly 130 and/or sound emitting subassembly 140. Alternatively, as shown in FIG. 3, housing portion 132 may include a housing opening 135 that may be operative to enable sound S emitted from sound emitting subassembly 140 to exit housing space 134 through housing opening 135 and into inner eartip space 165 of eartip subassembly 150 when eartip subassembly 150 is coupled to housing subassembly 130 and/or sound emitting subassembly 140. In some embodiments, housing subassembly 130 may also include a filter 136 (e.g., spanning housing opening 135 (e.g., as shown in FIG. 3) and/or spanning a cross-section of eartip space 165 in front of sound emitting subassembly 140), where filter 136 may be operative to enable sound S to pass through filter 136 from sound emitting subassembly 140 and into eartip space 165 while preventing any harmful objects (e.g., wax or debris) from passing through filter 136 from eartip space 165 and into sound emitting subassembly 140, thereby protecting at least a portion of sound emitting subassembly 140. Housing subassembly 130, such as housing portion 132, may be constructed from any suitable material, including, but not limited to, metal, ceramic, plastic, and any combination thereof.

Sound emitting subassembly 140 may be provided at least partially within housing subassembly 130 and may be operative to emit sound S into inner eartip space 165 and towards an eardrum of a user when assembly 100 is being worn by the user. For example, in some embodiments, as shown in FIG. 2, sound emitting subassembly 140 may include at least one driver 142 communicatively coupled to a sound source 144. Driver 142 may be any suitable acoustic element or component (e.g., one or more electroacoustic transducers) that may be operative to convert an electrical audio signal that may be received from sound source 144 into a corresponding sound S (e.g., vibrations) for receipt by an eardrum of a user. Sound source 144 may be any suitable type of and/or portion of audio playback circuitry (e.g., a processing component, a memory component, a communications component, and/or the like, such as may be provided by a portable media player) that may be operative to output such an electrical audio signal for use by at least one driver 142. Housing subassembly 130 and sound emitting subassembly 140 may be individually and/or collectively referred to herein as a driver subassembly or a transducer subassembly.

Eartip subassembly 150 may be coupled to any suitable portion of housing subassembly 130 and/or sound emitting subassembly 140 in any suitable way such that sound S may be effectively emitted into a portion of eartip space 165 of eartip subassembly 150, and then passed through and out of eartip space 165 towards an eardrum of a user when eartip subassembly 150 is at least partially retained within an ear canal of the user. Eartip subassembly 150 may include an inner eartip portion 160 and an outer eartip portion 170 coupled to inner eartip portion 160. Inner eartip portion 160 may include an inner eartip body 164 that may extend between an inner eartip back end 162 and an inner eartip front end 168. For example, as shown, both an inner eartip interior surface 161 of inner eartip body 164 and an opposite inner eartip exterior surface 169 of inner eartip body 164 may extend between inner eartip back end 162 and inner eartip front end 168. Inner eartip space 165 may be defined by inner eartip interior surface 161 and may extend between an inner eartip back opening 163 that may be provided through inner eartip back end 162 and an inner eartip front opening 167 that may be provided through inner eartip front end 168. Inner eartip space 165 and, thus, inner eartip interior surface 161 may be any suitable shape in its default configuration, such as a cylinder, a cube, a rectangular cuboid, or any irregular shape. The cross-sectional geometry of inner eartip space 165 and, thus, inner eartip interior surface 161 may be constant or may vary in any suitable manner along the length of inner eartip body 164 (e.g., along a Z-axis between ends 162 and 168). Similarly, inner eartip exterior surface 169 of inner eartip body 164 may be any suitable shape in its default configuration, such as a cylinder, a cube, a rectangular cuboid, or any irregular shape. The cross-sectional geometry of inner eartip exterior surface 169 may be constant or may vary in any suitable manner along the length of inner eartip body 164 (e.g., along a Z-axis between ends 162 and 168).

Outer eartip portion 170 may include an outer eartip body 174 that may extend between an outer eartip back end 172 and an outer eartip front end 178. For example, as shown, both an outer eartip interior surface 171 of outer eartip body 174 and an opposite outer eartip exterior surface 179 of outer eartip body 174 may extend between outer eartip back end 172 and outer eartip front end 178. As shown in FIGS. 1 and 3, for example, an outer eartip space 175 may be defined by outer eartip interior surface 171 (e.g., one portion of space 375 may be defined between outer eartip interior surface 171 and inner eartip exterior surface 169 when at least a portion of inner eartip body 164 is positioned between portions of outer eartip interior surface 171, and another portion of space 175 may be occupied by inner eartip body 164 and inner eartip space 165) and may extend between outer eartip back end 172 and outer eartip front end 178. Moreover, as also shown in FIGS. 1 and 3, an outer eartip back opening 173 may be provided through outer eartip back end 172 and an outer eartip front opening 177 may be provided through outer eartip front end 178.

Outer eartip portion 170 may be coupled to inner eartip portion 160 at an eartip portion interface 155. For example, as shown, outer eartip front end 178 of outer eartip portion 170 may be coupled to inner eartip front end 168 of inner eartip portion 160, whereby inner eartip front opening 167 that may be provided through inner eartip front end 168 may be coupled to outer eartip front opening 177 that may be provided through outer eartip front end 178 (e.g., at least a portion of opening 167 and at least a portion of opening 177 may be combined to provide a path for sound S). Outer eartip portion 170 may be coupled to inner eartip portion 160 at eartip portion interface 155 using any suitable approach or mechanism, including, but not limited to, any suitable adhesive(s) (e.g., glues or tapes), any suitable gasket(s), any suitable heat staking or other heat treatment, any suitable interference fit(s), any suitable mechanical connector(s), and/or the like. Additionally or alternatively, outer eartip portion 170 may be molded to or otherwise integrated with inner eartip portion 160 at eartip portion interface 155 using any suitable process (e.g., in a single or double-shot molding process). As shown in a functional configuration of FIGS. 1 and 3, outer eartip body 174 may be configured with respect to inner eartip body 164 such that outer eartip interior surface 171 may extend from interface 155 both about and along inner eartip exterior surface 169. Outer eartip exterior surface 179 of outer eartip body 174 may have any suitable shape, including, for example, a substantially curved or domed shape (e.g., with a variable circular or elliptical cross-sectional area transverse or perpendicular to a longitudinal axis of inner eartip space 165 of inner eartip body 164 along which sound S may travel (e.g., a Z-axis)). The shape and length of outer eartip exterior surface 179 may be selected based on the size of the ear canal of an intended user or of an average user, such that outer eartip exterior surface 179 may be operative to deflect to receive the geometry of the user's ear canal, thus providing an interference-type fit, but may be operative not deflect so much as to create significant pressure against the user's ear. For example, at least a portion of outer eartip exterior surface 179 may define a concave structure such that a cross-sectional area defined by outer eartip exterior surface 179 at outer eartip front end 178 and/or at outer eartip back end 172 may be less than a cross-sectional area defined by outer eartip exterior surface 179 between outer eartip front end 178 and outer eartip back end 172. At least a substantial portion of outer eartip exterior surface 179 may be substantially smooth to ensure a comfortable fit against a surface of a user's ear canal when eartip subassembly 150 is positioned within the user's ear canal.

Eartip subassembly 150 may be constructed from any suitable material. In some embodiments, inner eartip portion 160 and outer eartip portion 170 may be constructed from the same material (e.g., in a single-shot molding process) or from different materials (e.g., in a double-shot molding process) that may provide different characteristics between the two eartip portions (e.g., different colors for aesthetic reasons and/or different structural characteristics (e.g., rigidities) for functional purposes). Any suitable material may be used for inner eartip portion 160 and/or outer eartip portion 170, including, for example, silicone, rubber, latex, foam, or any other suitable material. In some embodiments, eartip assembly 150 (e.g., at least outer eartip portion 170 may be manufactured from an elastic material (e.g., an elastomer or other composite material) that may be operative to deform when eartip assembly 150 is at least partially positioned within a user's ear canal, such that at least a portion of outer eartip portion 170 may be compressed and may then expand to press against a user's ear canal to create a seal and/or to retain at least a portion of eartip assembly 150 within the user's ear canal. In some embodiments, the material used for at least a portion of eartip assembly 150 may be selected based on its acoustic properties (e.g., based on the material's acoustical absorption).

Eartip subassembly 150 may be manufactured using any suitable approach. In some embodiments, eartip subassembly 150 may be manufactured using a molding process. To create eartip subassembly 150, material may be injected into a mold along an outermost portion or any other suitable portion of eartip subassembly 150. For example, material may be injected into a mold at an area 176 of eartip subassembly 150 (e.g., a single line going around the periphery of eartip subassembly 150, such as along an equator of outer eartip interior surface 171 of outer eartip body 174 when outer eartip portion 170 is in an uninverted configuration of FIGS. 2 and 4). When such a molding process is finished, whereby the material has been suitably inserted in the mold, a parting line may remain at such an area 176. Such a parting line (not shown) may be visible to a user's eye and/or may create a ridge or bump that may be detectable by a user's touch. To hide such a parting line at such an area 176 from the user and to make eartip subassembly 150 more comfortable for use when inserted in a user's ear canal, at least a portion of eartip subassembly 150 may be inverted. For example, as shown, outer eartip portion 170 may be inverted with respect to inner eartip portion 160 from the uninverted configuration of FIGS. 2 and 4 to an inverted configuration of FIGS. 1 and 3, such that outer eartip interior surface 171 may face and surround at least a portion of inner eartip exterior surface 169 (e.g., such that outer eartip back end 172 may be closer to inner eartip back end 162 in the inverted configuration than it was in the uninverted configuration (e.g., such that outer eartip back end 172 may be closer to inner eartip back end 162 than to interface 155 in the inverted configuration)). In such an embodiment, once outer eartip portion 170 has been inverted, a parting line at area 176 may be facing inner eartip portion 160 and, thus, away from the user's ear canal, such that outer eartip exterior surface 179 of outer eartip portion 170 (e.g., the inner surface pre-inversion in FIGS. 2 and 4) that may contact a user's ear canal during use may be substantially smooth and not include such a parting line.

Using such an inversion approach, additional features may be formed on outer eartip interior surface 171 and/or on inner eartip exterior surface 169 prior to inversion that may otherwise be more difficult or impossible to form post-inversion (e.g., one or more support components of one or more eartip subassemblies of FIGS. 7-34). In some embodiments, eartip subassembly 150, when manufactured in an inverted form (e.g., as in FIGS. 2 and 4) and subsequently inverted for use, may be shaped differently than when manufactured directly in its final functional shape (e.g., as in FIGS. 1 and 3). In particular, it may not be possible to create a mold based on the inverted shape of an eartip subassembly manufactured directly in the final shape due to stresses inherent to the material when it is shaped.

As mentioned, eartip subassembly 150 may be coupled to any suitable portion of housing subassembly 130 and/or sound emitting subassembly 140 in any suitable way such that sound S may be effectively emitted into a portion of eartip space 165 of eartip subassembly 150, and then passed through and out of eartip space 165 via inner eartip front opening 167 towards an eardrum of a user when eartip subassembly 150 is at least partially retained within an ear canal of the user. For example, as shown in FIG. 3, a portion of a housing front end 138 of housing portion 132 of housing subassembly 130 may abut and/or be coupled to inner eartip back end 162 of inner eartip portion 160 about inner eartip back opening 163 such that another portion of housing subassembly 130 and/or at least a portion of sound emitting subassembly 140 may cover at least a portion of inner eartip back opening 163. In some embodiments, housing front end 138 may be coupled to inner eartip back end 162 (e.g., using any suitable adhesive(s) or mechanical feature(s) or the like) for coupling housing subassembly 130 and sound emitting subassembly 140 to eartip subassembly 150. Additionally or alternatively, as also shown in FIG. 3, a leading housing portion 139 of housing portion 132 of housing subassembly 130 (e.g., a nozzle portion of housing portion 132 that may extend in the +Z direction beyond housing front end 138, which may include opening 135 and/or filter 136) and/or a leading sound emitting portion 149 of sound emitting subassembly 140 (e.g., a nozzle portion of sound emitting subassembly 140, which may include at least a portion of at least one driver 142) may extend beyond inner eartip back opening 163 (e.g., by an insertion distance I) so as to be positioned within inner eartip space 165. In some embodiments, leading housing portion 139 and/or leading sound emitting portion 149 may be coupled to inner eartip interior surface 161 of inner eartip body 164 (e.g., using any suitable adhesive(s) or mechanical feature(s) or interference fit(s) or the like) for coupling housing subassembly 130 and sound emitting subassembly 140 to eartip subassembly 150. Therefore, inner eartip portion 160 may be coupled to any suitable portion of housing subassembly 130 and/or sound emitting subassembly 140 using geometric or structural elements (e.g., inner eartip body 164 may be coupled to housing front end 138 and/or to leading housing portion 139 and/or to leading sound emitting portion 149 using an adhesive, tape, heat staking or heat treatment, an interference fit, a gasket, a mechanical fastener, combinations thereof, or any other suitable approach) and/or inner eartip portion 160 may be manufactured as a part of any suitable portion of housing subassembly 130 and/or sound emitting subassembly 140 (e.g., inner eartip portion 160 may be molded into housing subassembly 130 (e.g., in a double-shot molding process)).

In its default configuration (e.g., prior to any deformation of eartip subassembly 150 for use in a user's ear), inner eartip space 165 may be any suitable shape and its cross-sectional geometry may be constant or may vary in any suitable manner along the length of inner eartip body 164. However, when eartip subassembly 150 is positioned within a user's ear canal for use in delivering sound S from sound emitting subassembly 140 to the user's eardrum, inner eartip portion 160 may be configured to provide at least a minimum cross-sectional geometry for inner eartip space 165 at every point along the length of inner eartip body 164 in order to prevent the sound path for sound S (e.g., through and out from inner eartip space 165 via inner eartip front opening 167) from being pinched, kinked, or otherwise misshapen so as to be ineffective when eartip subassembly 150 (e.g., outer eartip portion 170) may conform to the bends and shapes of the user's ear canal. In some embodiments, at least a portion of inner eartip body 164 may be formed by a material or combination of materials that may be rigid enough to prevent the collapse or a change in the shape of inner eartip space 165 that would negatively affect the quality of sound S being passed through inner eartip space 165. Additionally or alternatively, an inner eartip internal support subsystem 166 may be provided for increasing the rigidity of inner eartip portion 160. For example, as shown in FIGS. 3 and 4, inner eartip internal support subsystem 166 of earpiece 120 may include one or more rigid or expandable components, such as five inner eartip internal support components 166*a*-166*e*, each of which may be positioned within a portion of inner eartip body 164 and at least partially about a portion of inner eartip space 165. Each one of support components 166*a*-166*e* may be operative to provide cross-sectional rigidity (e.g., circumferential stiffness) to inner eartip body 164 about a respective portion of inner eartip space 165 while still enabling outer eartip portion 170 and, perhaps, even portions of inner eartip body 164 extending between two support components of inner eartip internal support subsystem 166, to conform to the bends and shapes of the user's ear canal when eartip subassembly 150 is positioned therein (e.g., inner eartip body 164 may be enabled to bend from a default configuration in which two particular inner eartip internal support components 166*c* and 166*d* within inner eartip body 164 may lie parallel to one another (e.g., in parallel X-Y planes and/or such that components 166*c* and 166*d* may extend about the same axis) to a deformed configuration in which inner eartip internal support components 166*c* and 166*d* within inner eartip body 164 may not be parallel to one another (e.g., in intersecting X-Y planes and/or such that components 166*c* and 166*d* may extend about different axes)). As shown, each one of inner eartip internal support components 166*a*-166*d* may extend entirely about a respective portion of inner eartip space 165 (e.g., as a complete ring). However, in some embodiments, at least one of inner eartip internal support component (e.g., inner eartip internal support component 166*e* may instead only extend at least partially about a respective portion of inner eartip space 165 (e.g., 75% or 95% of the way about inner eartip space 165) and include a gap 166*eg*, while still ensuring at least a minimum cross-sectional geometry for inner eartip space 165. At least a portion of an inner eartip internal support component of inner eartip internal support subsystem 166 may be contacting inner eartip body 164 in any suitable manner. In some embodiments, at least one inner eartip internal support component (e.g., inner eartip internal support component 166*a*) may be provided about and against exterior surface 169 of inner eartip body 164. In some embodiments, at least one inner eartip internal support component (e.g., inner eartip internal support component 166*b*) may be provided within space 165 against interior surface 161 of inner eartip body 164. Alternatively, at least one inner eartip internal support component (e.g., inner eartip internal support components 166*c*-166*e*) may be provided at least partially or completely within inner eartip body 164.

Each support component of inner eartip internal support subsystem 166 may be spaced apart from one another along the length of inner eartip body 164 (e.g., along the Z-axis) in any suitable fashion. For example, each pair of consecutively positioned inner eartip internal support components may be spaced equidistant from one another along the length of inner eartip body 164 (e.g., spacing distance 166*abs* between support components 166*a* and 166*b* may be the same as spacing distance 166*bcs* between support components 166*b* and 166*c* and the same as spacing distance 166*cds* between support components 166*c* and 166*d*, which may provide a consistent rigidity to inner eartip body 164 between support components 166*a* and 166*d* (e.g., at least when the material rigidity of each one of support components 166*a*-166*d* is the same and when the rigidity of the material of body 164 is the same between components 166*a* and 166*d*)). Alternatively, the spacing between different pairs of consecutively positioned inner eartip internal support components may vary along the length of inner eartip body 164 (e.g., spacing distance I 66*abs* may be shorter than spacing distance 166*bcs*, and spacing distance 166*bcs* may be shorter than spacing distance 166*cds*, which may provide more rigidity to inner eartip body 164 between support components 166*a* and 166*b* than between support components 166*c* and 166*d* (e.g., at least when the material rigidity of each one of support components 166*a*-166*d* is the same and when the rigidity of the material of body 164 is the same between components 166*a* and 166*d*)).

The geometry of each support component of inner eartip internal support subsystem 166 may vary in any suitable fashion. For example, different ones of inner eartip internal support components 166*a*-166*e* may have the same thickness or different thicknesses (e.g., thickness 166*at* of support component 166*a* may be the same as or different than thickness 166*bt* of support component 166*b*). Additionally or alternatively, different ones of inner eartip internal support components 166*a*-166*e* may have the same cross-sectional area or different cross-sectional areas (e.g., minimum cross-sectional dimension 166*dx* of support component 166*d* may be the same as or different than minimum cross-sectional dimension 166*ex* of support component 166*e* (e.g., where such a minimum cross-sectional dimension may be defined as the minimum distance at which two portions of a support component on opposites sides of inner eartip space 165 within any particular cross-sectional area of that support component may be separated, which may at least partially dictate the minimum cross-sectional area of inner eartip space 165 at that support component)).

The rigidity (e.g., stiffness or flexibility) of each support component of inner eartip internal support subsystem 166 may vary in any suitable fashion. For example, different ones of inner eartip internal support components 166*a*-166*e* may have the same rigidity or different rigidities. In some embodiments, each one of support components 166*a*-166*e* may have the same rigidity for imparting the same internal support to its respective location within inner eartip body 164 (e.g., maximum rigidity, such that the default configuration of each support component (e.g., as shown in FIG. 4) may be maintained throughout any use of eartip subassembly 150 despite any deformation pressures applied thereto). Alternatively, one support component may have a different rigidity than another support component for varying the internal support provided by inner eartip internal support subsystem 166 from one support component to the other (e.g., the rigidity of support component 166*a* may be more than the rigidity of support component 166*b* and the rigidity of support component 166*b* may be more than the rigidity of support component 166*c* and the rigidity of support component 166*c* may be more than the rigidity of support component 166*d* and the rigidity of support component 166*d* may be more than the rigidity of support component 166*e*, which may provide more rigidity to inner eartip body 164 at support component 166*a* than at support component 166*e* (e.g., at least when the rigidity of the material of body 164 is the same between components 166*a* and 166*e*)). For example, the geometries of support components 166*d* and 166*e* may be the same such that minimum cross-sectional dimension 166*dx* of support component 166*d* in its default configuration may be the same as minimum cross-sectional dimension 166*ex* of support component 166*e* in its default configuration, but the rigidities of support components 166*d* and **166*e* may be different such that a high rigidity of support component 166*d* may prevent the magnitude of minimum cross-sectional dimension 166*dx* from changing due any external forces while a lower rigidity of support component 166*e* may enable the magnitude of minimum cross-sectional dimension 166*de* to increase due to certain external forces. For example, a flexibility of support component 166*e* may enable the magnitude of minimum cross-sectional dimension 166*ex* to expand from a first value when support component 166*e* is in a default configuration of FIG. 4 to a second larger value when support component 166*e* is in a second configuration of FIG. 3 (e.g., when leading housing portion 139 may be inserted within inner eartip space 165 and within support component 166*e*, the flexibility of support component 166*e* may enable minimum cross-sectional dimension 166*ex* to expand to accommodate leading housing portion 139, yet may attempt to return to support component 166*e* to its default configuration, thereby exerting an inward retention force on leading housing portion 139 for retaining leading housing portion 139 within inner eartip space 165). In some embodiments, a single inner eartip internal support component may have a thickness suitable to extend along a significant portion of the length of inner eartip body 164. For example, in some embodiments, the thickness 166*et* of support component 166*e* may be long enough not only to extend about at least a portion of leading housing portion 139 within inner eartip space 165 (e.g., to at least partially couple leading housing portion 139 to inner eartip body 164 (e.g., by at least partially retaining leading housing portion 139 within eartip space 165)) but also to extend about at least another portion of inner eartip space 165 in front of leading housing portion 139 (e.g., a portion of inner eartip space 165 that is more proximal to inner eartip front end 168 than leading housing portion 139 is to inner eartip front end 168), such that support component 166*e* may also be operative to ensure at least a minimum cross-sectional area of that other portion of inner eartip space 165 to ensure an effective sound path for sound S at least through that portion of inner eartip space 165. In some embodiments, no leading housing portion 139 and no leading sound emitting portion 149 may extend into inner eartip space 165, such that inner eartip space 165 may be completely hollow. In such instances, the flexibility of inner eartip body 164 may not be affected by any portion of housing subassembly 130 or sound emitting subassembly 140 but may be affected by inner eartip internal support subsystem 166**.

Each one of inner eartip internal support components **166*a*-166*e* of inner eartip internal support subsystem 166 may be made of any suitable material (e.g., plastic and/or ceramic and/or metal). Moreover, each one of inner eartip internal support components 166*a*-166*e* of inner eartip internal support subsystem 166 may be formed using any suitable process (e.g., support components 166*a*-166*e* may be insert molded within inner eartip body 164). In one particular embodiment, each one of inner eartip internal support components 166*a*-166*e* may be a faceted ring. Inner eartip internal support subsystem 166 may provide internal support to inner eartip body 164 with variable or consistent rigidity such that an effective sound path for sound S through inner eartip space 165 may be ensured (e.g., a minimum cross-sectional area of inner eartip space 165 may be maintained) while enabling certain portions of eartip subassembly 150 to deform during use. For example, each one of support components 166*a*-166*e* may maintain its minimum cross-sectional dimensions at certain portions along the length of inner eartip body 164 where those support components are positioned, while still enabling other portions of inner eartip body 164 where those support components are not positioned to deform (e.g., bend), such that eartip body 164 may be comfortably positioned within a user's ear canal while still preserving an effective sound path. The materials, geometries and rigidities of the support components and the spacings between the support components may all be selectively varied to control the functionality of inner eartip internal support system 166**.

Figure 5:
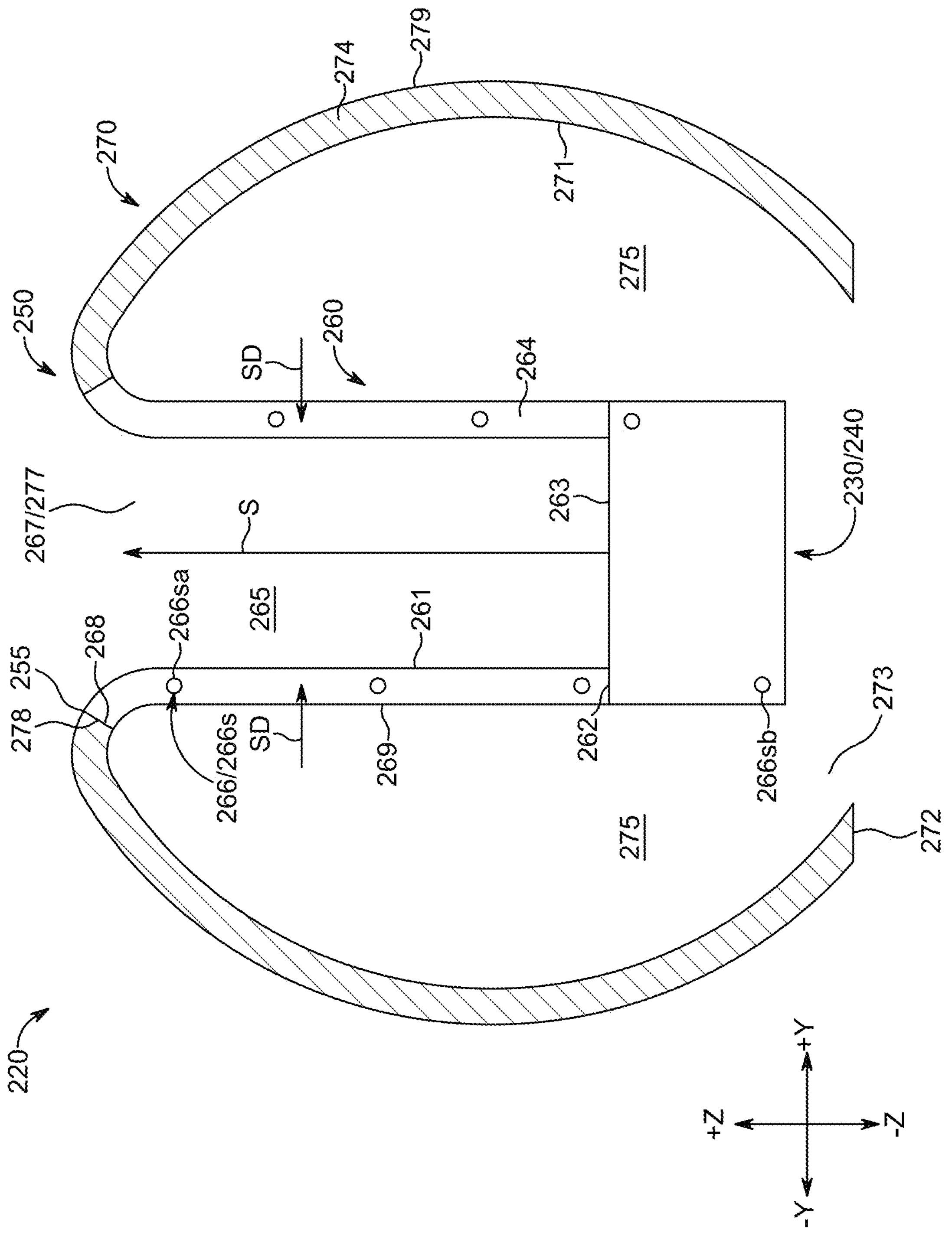
FIG. 5 is a cross-sectional view of another illustrative earpiece with internal support components fully assembled.
Figure 6:
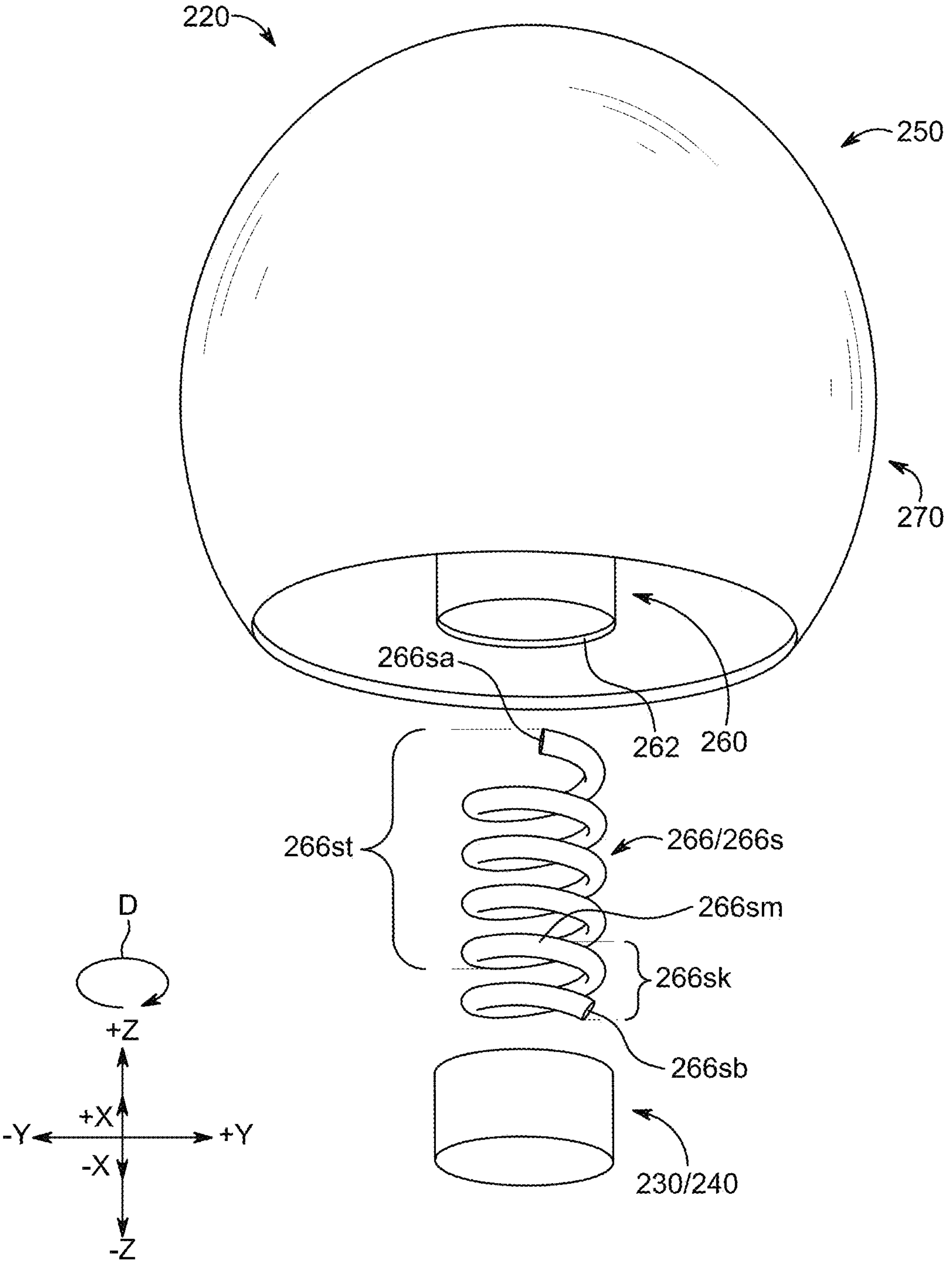
FIG. 6 is a perspective view of the earpiece of FIG. 5 but exploded.
Figure 7:
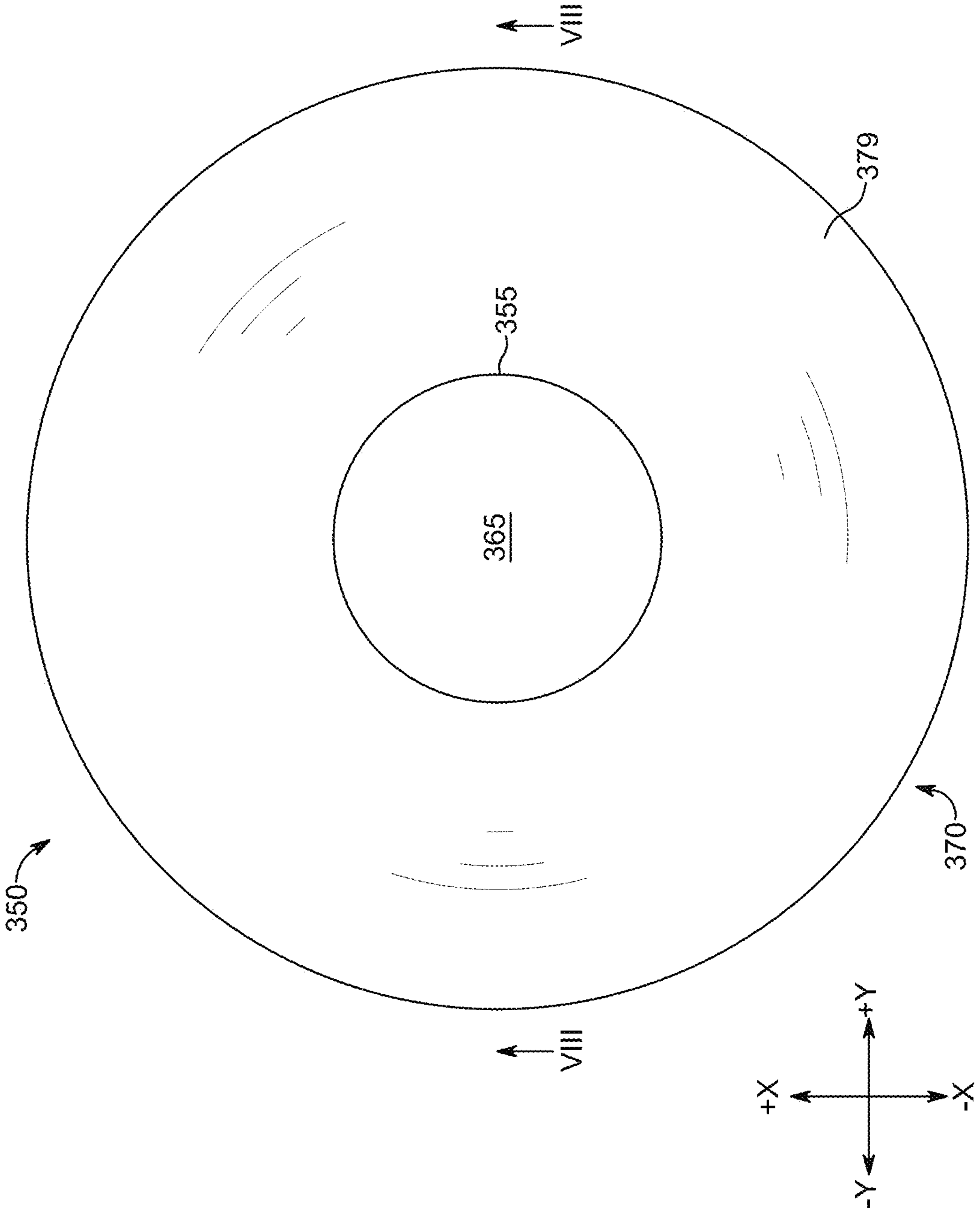
FIG. 7 is a top elevational view of an illustrative eartip subassembly with internal support components.

FIGS. 5 and 6

FIGS. 5 and 6 show another illustrative earpiece 220, which may be similar to earpiece 120 of FIGS. 1-4 but may include an inner eartip internal support system that may also facilitate the coupling of an inner eartip portion to an earpiece housing subassembly and/or to a sound emitting subassembly. Earpiece 220 of FIGS. 5 and 6 may include similar components to earpiece 120 of FIGS. 1-4, where elements of earpiece 220 of FIGS. 5 and 6 being labeled with "2xx" reference labels may correspond to the "1xx" reference labels of the labeled elements of earpiece 120 of FIGS. 1-4, and where differences therebetween may be described below. As shown, earpiece 220 may include a housing subassembly 230, a sound emitting subassembly 240 for emitting sound S, and an eartip subassembly 250, which may include an inner eartip portion 260 and an outer eartip portion 270 coupled to inner eartip portion 260 at interface 255. Inner eartip portion 260 may include an inner eartip body 264 that may extend between an inner eartip back end 262 and an inner eartip front end 268, where both an inner eartip interior surface 261 of inner eartip body 264 and an opposite inner eartip exterior surface 269 of inner eartip body 264 may extend between inner eartip back end 262 and inner eartip front end 268, and where an inner eartip space 265 may be defined by inner eartip interior surface 261 and may extend between an inner eartip back opening 263 that may be provided through inner eartip back end 262 and an inner eartip front opening 267 that may be provided through inner eartip front end 268. Outer eartip portion 270 may include an outer eartip body 274 that may extend between an outer eartip back end 272 and an outer eartip front end 278, where both an outer eartip interior surface 271 of outer eartip body 274 and an opposite outer eartip exterior surface 279 of outer eartip body 274 may extend between outer eartip back end 272 and outer eartip front end 278, and where an outer eartip space 275 may be defined by outer eartip interior surface 271 (e.g., one portion of space 275 may be defined between outer eartip interior surface 271 and inner eartip exterior surface 269 when at least a portion of inner eartip body 264 is positioned between portions of outer eartip interior surface 271, and another portion of space 275 may be occupied by inner eartip body 264 and inner eartip space 265) and may extend between outer eartip back end 272 and outer eartip front end 278, while an outer eartip back opening 273 may be provided through outer eartip back end 272 and an outer eartip front opening 277 may be provided through outer eartip front end 278. As shown in FIG. 5, outer eartip back end 272 may be configured to be positioned beyond inner eartip back end 262 and, optionally, even beyond the back end of housing subassembly 230 and/or sound emitting subassembly 240 (e.g., in the —Z direction).

In some embodiments, at least a portion of inner eartip body 264 may be formed by a material or combination of materials that may be rigid enough to prevent the collapse or a change in the shape of inner eartip space 265 that would negatively affect the quality of sound S being passed through inner eartip space 265. Additionally or alternatively, an inner eartip internal support subsystem 266 may be provided for affecting the rigidity of inner eartip portion 260. For example, as shown in FIGS. 5 and 6, inner eartip internal support subsystem 266 may include one or more rigid or expandable components, such as a spring inner eartip internal support component 266*s*, which may be positioned within a portion of inner eartip body 264 and about a portion of inner eartip space 265. Spring support component 266*s* may be any suitable type of spring, such as a coil spring made of any suitable material, and may extend between a first spring end 266*sa* and a second spring end 266*sb*. The material of spring support component 266*s* may store energy when component 266*s* is compressed or extended or bent but may then return to its natural configuration when unloaded. Spring component 266*s* may be shaped like a helix or any other suitable spiral or otherwise suitably shaped with any suitable twisting direction (e.g., a right handed or left handed spiral with respect to a particular axis).

Spring support component 266*s* may be provided using any suitable process. For example, spring support component 266*s* may be insert molded within inner eartip body 264. Alternatively, spring support component 266*s* may be driven (e.g., screwed) into inner eartip body 264. For example, spring end 266*sa* may be initially inserted upwardly in the ±Z direction through inner eartip back end 262 while also rotating spring support component 266*s* in the direction of arrow D of FIG. 6 about the Z-axis until spring support component 266*s* reaches the position of FIG. 5 with respect to inner eartip body 264. Alternatively, spring end 266*sb* may be initially inserted downwardly in the −Z direction through inner eartip front end 268 while also rotating sprint, support component 266*s* in the direction opposite to that of arrow D of FIG. 6 until spring support component 266*s* reaches the position of FIG. 5 with respect to inner eartip body 264.

At least a portion of spring support component 266*s* of inner eartip internal support subsystem 266 may be contacting inner eartip body 264 in any suitable manner. In some embodiments, spring support component 266*s* may be provided about and against exterior surface 269 of inner eartip body 264 or within space 265 against interior surface 261 of inner eartip body 264. Alternatively, spring support component 266*s* may be provided at least partially or completely within inner eartip body 264 such that at least one end of spring support component 266*s* may extend out from inner eartip body 264. For example, as shown in FIG. 5, a first portion of spring support component 266*s* (e.g., a portion 266*st* extending between end 266*sa* and point 266*sm* of FIG. 6) may be positioned within inner eartip body 264, while a second portion of spring support component 266*s* (e.g., a portion 266*sk* extending between point 266*sm* of FIG. 6 and end 266*sb*) may be positioned outside of inner eartip body 264. Such a second portion of spring support component 266*s* may be coupled to earpiece housing subassembly 230 and/or sound emitting subassembly 240 for coupling earpiece housing subassembly 230 and sound emitting subassembly 240 to inner ear portion 260. For example, as shown in FIG. 5, while portion 266*st* of spring support component 266*s* may be retained within inner eartip body 264 (e.g., by screwing or insert molding portion 266*st* therein), portion 266*sk* of spring support component 266*s* may be retained within earpiece housing subassembly 230 and/or sound emitting subassembly 240 (e.g., by screwing or insert molding portion 266*sk* therein). In some embodiments, such coupling of earpiece housing subassembly 230 and/or sound emitting subassembly 240 with inner eartip body 264 using spring support component 266*s* may obviate a need for any portion of earpiece housing subassembly 230 and/or sound emitting subassembly 240 to extend into inner eartip space 265 for such coupling (e.g., unlike leading housing portion 139 and/or leading sound emitting portion 149 being positioned within inner eartip space 165 by insertion distance I of FIG. 3), which may thereby reduce a necessary length of inner eartip space 265 (e.g., for enabling a shorter acoustic cavity) and/or may thereby avoid the flexibility of inner eartip body 264 from being unnecessarily affected by such a portion of earpiece housing subassembly 230 and/or sound emitting subassembly 240 within inner eartip space 265. In other embodiments, portion 266*st* of spring support component 266*s* may be coupled to inner eartip body 264 about inner eartip space 265 by being held against exterior surface 279 of inner eartip body 264 or by being held against interior surface 271 of inner eartip body 264. Alternatively or additionally, portion 266*sk* of spring support component 266*s* may be coupled to earpiece housing subassembly 230 and/or to sound emitting subassembly 240 by being held against an exterior surface or an interior surface of housing subassembly 230 and/or of sound emitting subassembly 240.

Inner eartip internal support subsystem 266 may include a single spring support component 266*s* or may include any suitable number of distinct springs provided as multiple distinct spring inner eartip internal support components of inner eartip internal support subsystem 266, each one of which may span a particular length of inner eartip body 264, where such particular lengths may be non-overlapping or at least partially overlapping. Each spring support component of inner eartip internal support subsystem 266 may be made of any suitable material (e.g., plastic and/or metal, such as a metal coiled wire or a dense coil spring). Moreover, each spring support component of inner eartip internal support subsystem 266 may be formed using any suitable process and may have any suitable spring characteristics. Inner eartip internal support subsystem 266 may provide internal support to inner eartip body 264 with variable or consistent rigidity such that an effective sound path for sound S through inner eartip space 265 may be ensured (e.g., a minimum cross-sectional area of inner eartip space 265 may be maintained) while enabling certain portions of eartip subassembly 250 to deform during use. For example, spring support component 266*s* may maintain its minimum cross-sectional dimensions at certain portions along the length of inner eartip body 264 (e.g., a consistent cross-sectional dimension may be provided by a cylindrical spring or a cross-sectional dimension may vary along the length of a conical spring), while still enabling other portions of inner eartip body 264 to deform (e.g., bend) along with spring support component 266*s* (e.g., spring support component 266*s* may bend away from the Z-axis), such that eartip body 264 may be comfortably positioned within a user's ear canal while still preserving an effective sound path. The materials, geometries and rigidities of each spring support component and the spacings between coils of a spring support component in its default configuration may all be selectively varied to control the functionality of inner eartip internal support system 266. Each coil of spring support component 266*s* may be operative to provide substantially cross-sectional rigidity (e.g., circumferential stiffness) to inner eartip body 264 about a respective portion of inner eartip space 265 while still enabling outer eartip portion 270 and, perhaps, even portions of inner eartip body 264 extending between two coils of spring support component 266*s*, to conform to the bends and shapes of the user's ear canal when eartip subassembly 250 is positioned therein. For example, inner eartip body 264 may be enabled to bend from a default configuration in which two coils of spring support component 266*s* within inner eartip body 264 may lie parallel to one another (e.g., in parallel planes and/or such that the two coils of spring support component 266*s* may extend about the same axis) to a deformed configuration in which those two coils of spring support component 266*s* within inner eartip body 264 may not be parallel to one another (e.g., in intersecting planes and/or such the two coils of spring support component 266*s* may extend about different axes)).

FIGS. 7-11

FIGS. 7-11 show another illustrative eartip subassembly 350, which may be similar to eartip subassembly 150 of FIGS. 1-4 but may include an outer eartip internal support subsystem with one or more support components extending away from an exterior surface of an inner eartip body substantially transversely to a longitudinal length of the inner eartip body for varying the effective rigidity of an exterior surface of an outer eartip body to affect the ability of the outer eartip body to conform to various ear canal geometries. Eartip subassembly 350 of FIGS. 7-11 may include similar components to eartip subassembly 150 of FIGS. 1-4, where elements of eartip subassembly 350 of FIGS. 7-11 being labeled with "3xx" reference labels may correspond to the "1 xx" reference labels of the labeled elements of eartip subassembly 150 of FIGS. 1-4, and where differences therebetween may be described below. As shown, an eartip subassembly 350 may include an inner eartip portion 360 and an outer eartip portion 370 coupled to inner eartip portion 360 at interface 355. Inner eartip portion 360 may include an inner eartip body 364 that may extend between an inner eartip back end 362 and an inner eartip front end 368, where both an inner eartip interior surface 361 of inner eartip body 364 and an opposite inner eartip exterior surface 369 of inner eartip body 364 may extend between inner eartip back end 362 and inner eartip front end 368, and where an inner eartip space 365 may be defined by inner eartip interior surface 361 and may extend between an inner eartip back opening 363 that may be provided through inner eartip back end 362 and an inner eartip front opening 367 that may be provided through inner eartip front end 368. Outer eartip portion 370 may include an outer eartip body 374 that may extend between an outer eartip back end 372 and an outer eartip front end 378, where both an outer eartip interior surface 371 of outer eartip body 374 and an opposite outer eartip exterior surface 379 of outer eartip body 374 may extend between outer eartip back end 372 and outer eartip front end 378, and where an outer eartip space 375 may be defined by outer eartip interior surface 371 (e.g., one portion of space 375 may be defined between outer eartip interior surface 371 and inner eartip exterior surface 369 when at least a portion of inner eartip body 364 is positioned between portions of outer eartip interior surface 371 and another portion of space 375 may be occupied by inner eartip body 364 and inner eartip space 365) and may extend between outer eartip back end 372 and outer eartip front end 378, while an outer eartip back opening 373 may be provided through outer eartip back end 372 and an outer eartip front opening 377 may be provided through outer eartip front end 378. Although not shown, eartip subassembly 350 may include any suitable inner eartip internal support system, such as inner eartip internal support system 166 of eartip subassembly 150 or inner eartip internal support system 266 of eartip subassembly 250. Additionally or alternatively, although not shown, eartip subassembly 350 may be coupled to any suitable housing subassembly and any suitable sound emitting subassembly in any suitable manner for providing any suitable earpiece for a headphone assembly.

Eartip subassembly 350 may include an outer eartip internal support subsystem 380 that may be operative to vary the ability of outer eartip exterior surface 379 to conform to various ear canal geometries for improving the ability of eartip subassembly 350 to create an effective acoustic seal and/or to provide comfort to the user. Outer eartip internal support subsystem 380 may be operative to vary the effective surface stiffness of eartip exterior surface 379 along a length of eartip exterior surface 379 (e.g., from outer eartip front end 378 to outer eartip back end 372) and/or about a perimeter of eartip exterior surface 379 (e.g., about at least a portion of the path of sound S (e.g., about the Z-axis in an X-Y plane)). Outer eartip internal support subsystem 380 may include one or more eartip internal support features (e.g., three eartip internal support features 381, 383, and 385), each of which may include one or more support components that may extend from inner eartip exterior surface 369 and about at least a portion of a longitudinal axis of inner eartip exterior surface 369 (e.g., about at least a portion of a longitudinal axis of inner eartip space 565) at an anchor end towards a free end that may contact or lie proximal to a portion of outer eartip interior surface 371 (e.g., as one or more transverse support components). Different eartip internal support features of outer eartip internal support subsystem 380 may be spaced longitudinally from one another along the length of inner eartip body 364 and/or along the length of outer eartip interior surface 371 such that different eartip internal support features may be operative to interact with different portions of outer eartip interior surface 371 along the length of outer eartip portion 370 (e.g., from outer eartip front end 378 to outer eartip back end 372).

Figure 8:
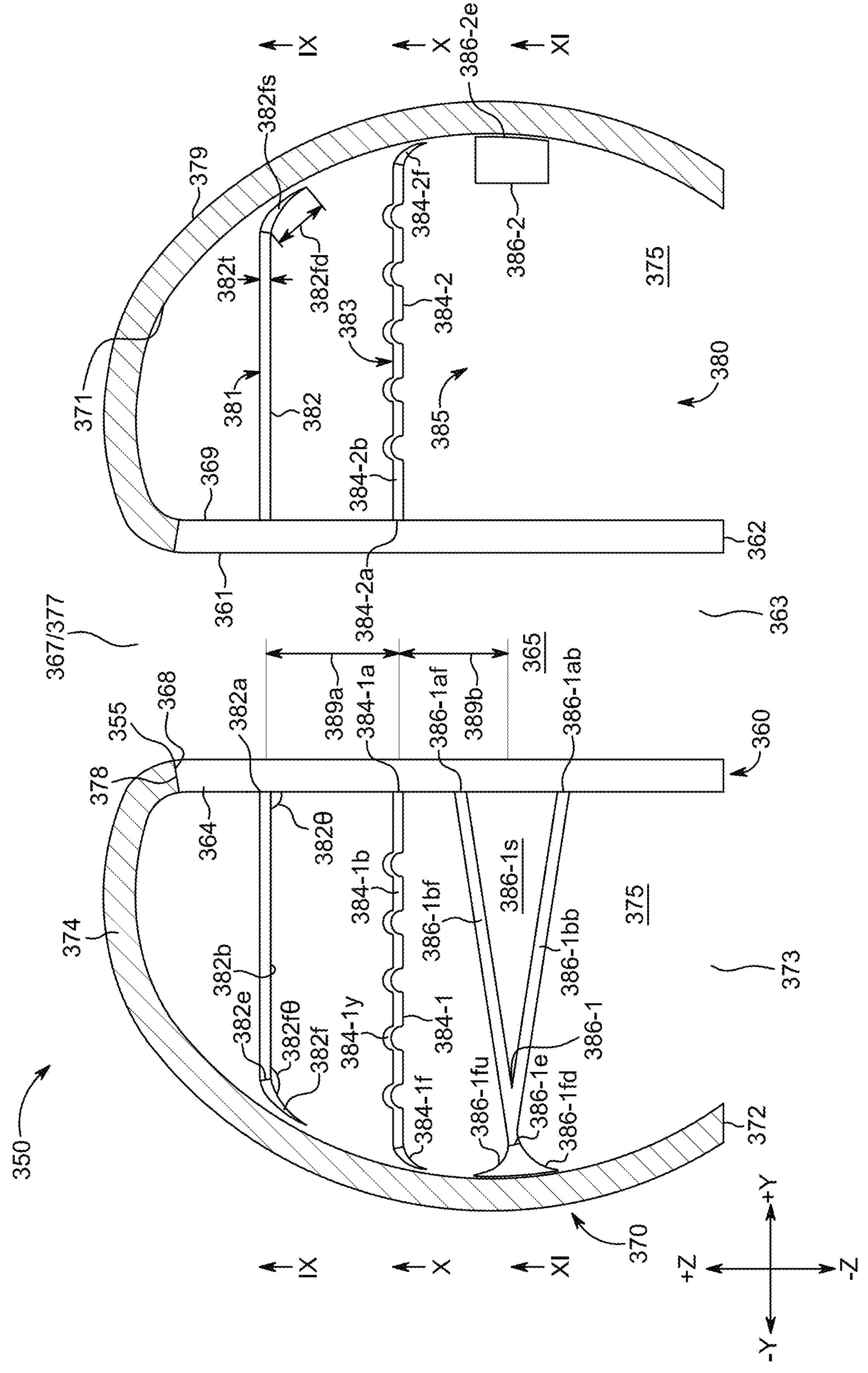
FIG. 8 is a cross-sectional view of the eartip subassembly of FIG. 7, taken from line VIII-VIII of FIG. 7.
Figure 9:
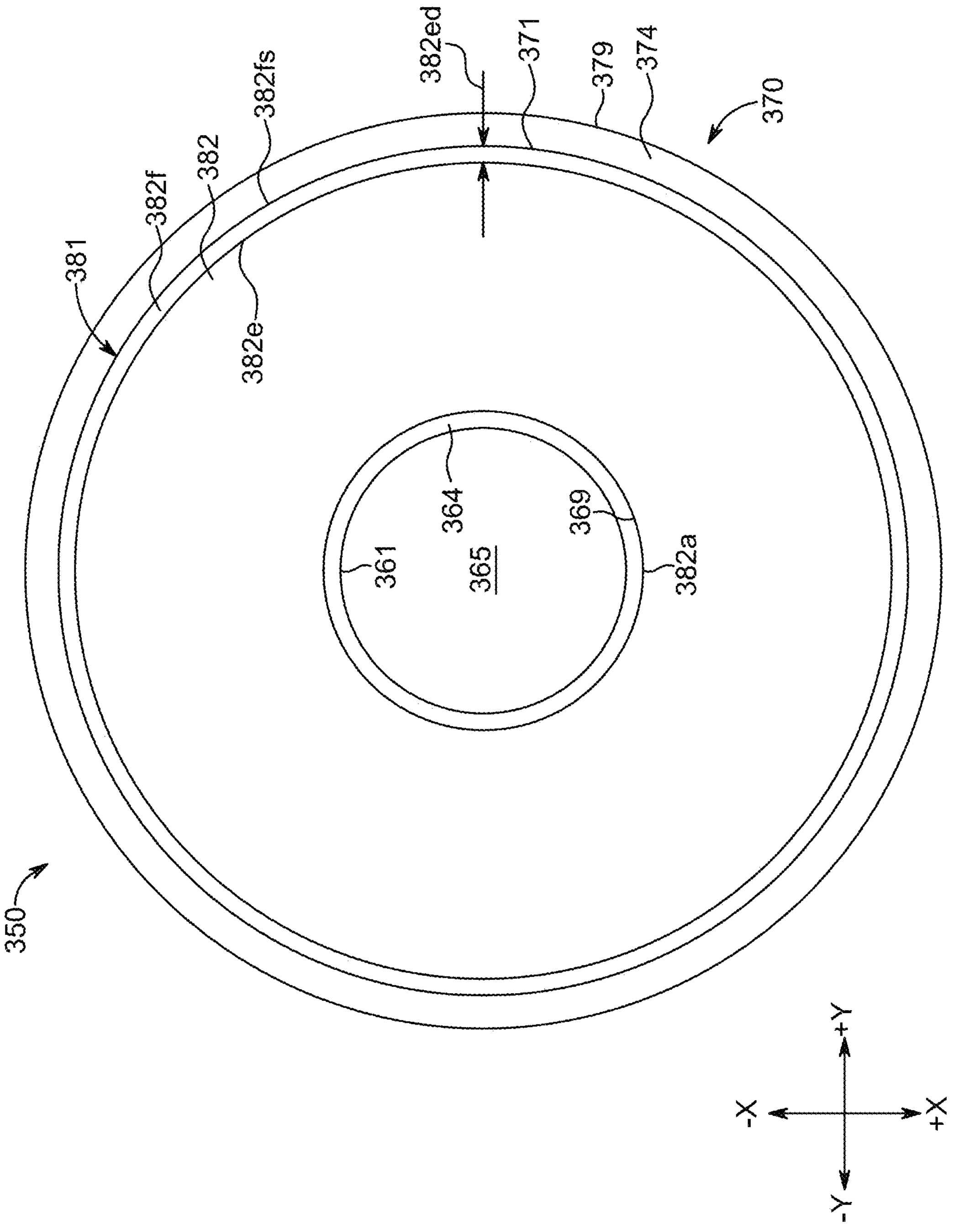
FIG. 9 is a cross-sectional view of the eartip subassembly of FIGS. 7 and 8, taken from line IX-IX of FIG. 8.

As shown in FIGS. 8 and 9, outer eartip internal support subsystem 380 may include an outer eartip internal support feature 381 that may extend from inner eartip exterior surface 369 towards outer eartip interior surface 371 (e.g., through a portion of outer eartip space 375). For example, outer eartip internal support feature 381 may include a single support component 382 with a support body 382*b* that may extend out to a free end 382*e* from an anchor end 382*a* that may be coupled to or integrated with inner eartip exterior surface 369 about the entirety of a perimeter of inner eartip body 364. In some embodiments, as shown, for example, thickness 382*t* of support body 382*b* of support component 382 between front and back surfaces of support body 382*b* may be consistent along its entire length (e.g., between anchor end 382*a* and free end 382*e*). Alternatively, the thickness of support body 382*b* of support component 382 may vary as it extends away from inner eartip body 364 (e.g., the thickness of support body 382*b* may increase or decrease as support body 382*b* approaches free end 382*e*). In some embodiments, as shown, for example, angle 3820 at which support body 382*b* may extend away from exterior surface 369 of undeformed inner eartip body 364 at anchor end 382*a* may be 90°. Alternatively, the angle at which support body 382*b* may extend away from undeformed inner eartip body 364 at anchor end 382*a* may be any other suitable angle greater than or less than 90° (see, CAL, the angle at which a support body of eartip internal support feature 385 may extend away from undeformed inner eartip body 364). Support body 382*b* may extend linearly from inner eartip body 364 at angle 3820 to free end 382*e*. For example, in one particular embodiment, as shown, support body 382*b* may be a flat ring-shaped object (e.g., a three-dimensional annulus) with front and back surfaces that may be flat and/or parallel as extending between ends 382*a* and 382*e*, where free end 382*e* may interface with (e.g., contact or lie adjacent to) a portion of outer eartip interior surface

371. In an undeformed configuration of eartip subassembly 350 of FIGS. 7-11 (e.g., the functional configuration of eartip subassembly 350 without any external forces applied thereto, such as by a user), free end 382*e* of support body 382*b* of support component 382 may contact outer eartip interior surface 371 or may be distanced any suitable distance 382*ed* from outer eartip interior surface 371, where such a distance 382*ed* may be small enough so as to be closed when outer eartip body 374 may receive an external force on outer eartip exterior surface 379 (e.g., by a user's ear canal) that may deform outer eartip body 374 to contact at least a portion of free end 382*e* of support component 382 and potentially to deform support component 382 (e.g., to deform support body 382*b* so as to shorten the distance between ends 382*a* and 382*e* of support body 382*b*).

One or more flap portions may be provided to extend in any suitable direction from a free end of a support body such that at least a portion (e.g., surface) of the flap portion may interface with (e.g., face towards, contact. and/or be coupled to) a portion of an interior surface of an exterior eartip body. A surface of the flap portion (e.g., an external surface proximate a free end of the flap portion) may be operative to act as a spring-like interface with the exterior eartip body and/or to provide a more expansive surface with which a support body may interact with the exterior eartip body (e.g., as compared to the free end of a support body, which may be limited in size or shape and/or may be operative to buckle when an external force is applied to the free end of the support body in a direction opposite to the direction at which the support body extends from its support body anchor end to its support body free end). For example, while support body 382*b* of support component 382 may extend substantially linearly between ends 382*a* and 382*e*, a flap portion 382*f* may be provided at free end 382*e* that may be operative to extend away from support body 382*b* (e.g., at any suitable flap angle 382*f*0, such as 75°) for following at least a portion of a contour of outer eartip interior surface 371. For example, as shown, while free end 382*e* of body 382*b* may be an end of a substantially uniformly thick support body 382*b* with a free end surface that may be similar to and/or parallel to anchor end 382*a*, flap portion 382*f* may be provided to extend from at least a portion of free end 382*e* for providing a portion of support component 382 that may be operative to provide a larger surface area for interacting with outer eartip interior surface 371. In its default configuration, flap portion 382*f* may extend downwardly (e.g., for a distance 382*fd*) from free end 382*e* with an exterior flap surface 382*fs* that may be shaped similarly to or otherwise configured to follow a contoured shape similar to that of a portion of outer eartip interior surface 371 that may be interfaced by exterior flap surface 382*fs* (e.g., as shown in FIG. 8), where such interfacing surfaces may be contacting one another or positioned proximate one another when eartip subassembly 350 may be in its default configuration. Flap portion 382*f* may be operative to provide a larger and more gradual interface than free end 382*e* for a portion of outer eartip interior surface 371 with support component 382 during deformation of that portion of outer eartip interior surface 371. For example, flap portion 382*f* may be operative to act as a soft leaf spring for providing some rigidity to at least the portion of outer eartip interior surface 371 that may contact exterior flap surface 382*fs* during any attempted deformation of that portion of outer eartip interior surface 371 (e.g., the material of a flap portion may have a stiffness and room to deflect (e.g., an arch shaped flap portion may facilitate this action), where tunable parameters to control the stiffness of such a flap portion may be material selection, body thickness, degree and/or radius of such an arch, and where contact between the flap portion and an outer eartip interior surface may be configured to be with a low angle and/or broad to avoid a concentrated contact point). Any flap of any support component of any outer eartip internal support subsystem disclosed herein may be coupled to or integrated with the eartip body with which it interfaces or may simply contact the eartip body with which it interfaces (e.g., contacts the eartip body at all times or only after certain deformation of the outer eartip body). A flap portion of any support component of any outer eartip internal support subsystem disclosed herein may be operative to adjust the geometry of a flap surface to at least partially match the geometry of an eartip body surface with which the flap surface is interfacing (e.g., a contour of at least a portion of a flap surface may match the contour of at least a portion of the eartip body surface with which the flap surface may be interfacing). This may be accomplished in any suitable manner, such as by constructing the flap portion of a material that may be operative to conform to at least one contour (e.g., with respect to one, some, or all suitable spatial dimensions) of a surface with which it is interfacing and/or by constructing the flap portion to have the appropriate contour in its default or undeformed configuration. Each portion may be constructed in any suitable manner, such as the inner eartip body, outer eartip body, and internal support subsystem being molded in a single shot with the same or varying materials (e.g., the inner eartip body may be more rigid for support and the outer eartip body may be more soft for comfort) or in different shots and then coupled or, for example, the inner eartip body may be formed in a first shot and then the internal support subsystem may be formed with a second shot of the same or different material than the first shot.

Figure 10:
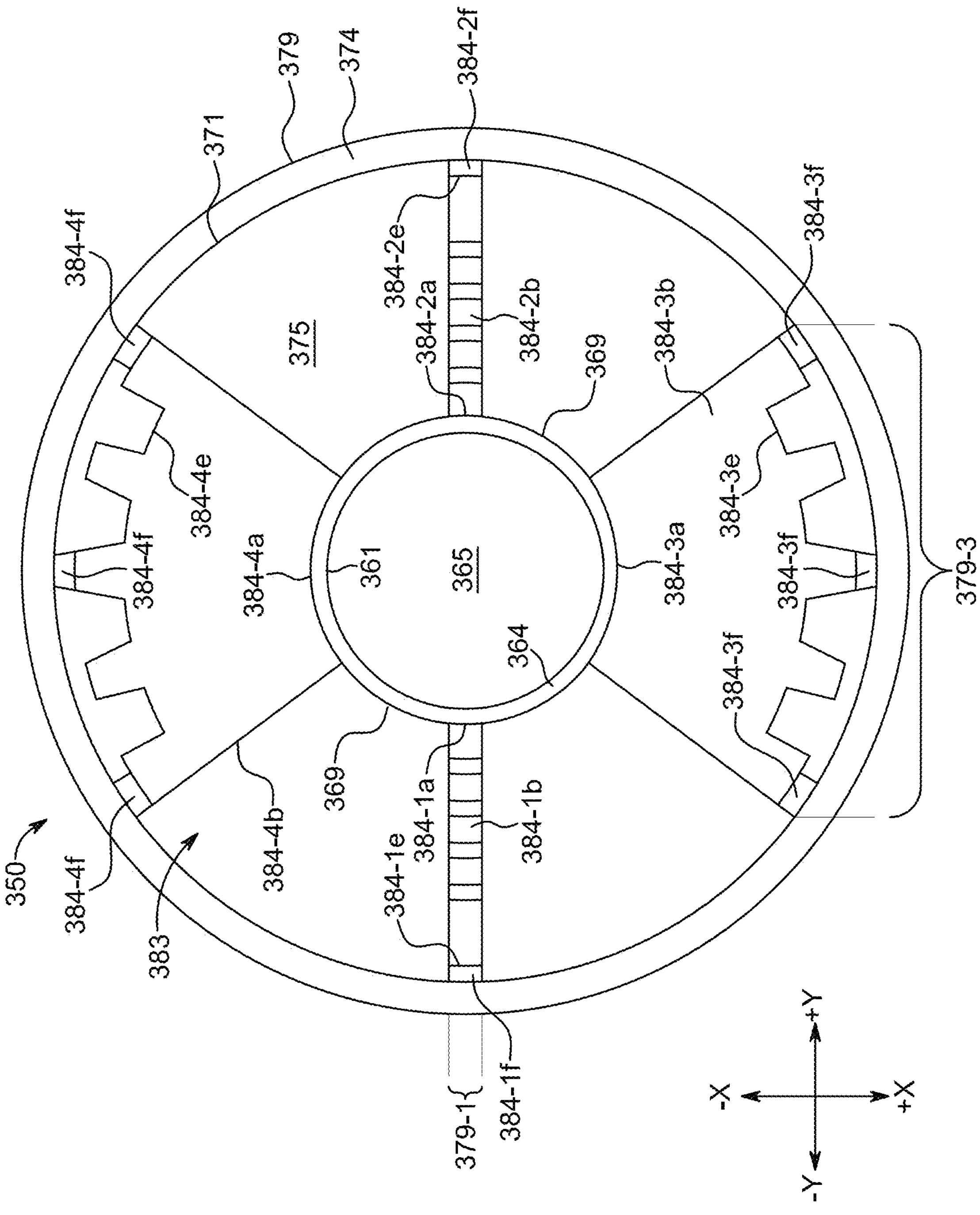
FIG. 10 is a cross-sectional view of the eartip subassembly of FIGS. 7-9, taken from line X-X of FIG. 8.

As shown in FIGS. 8 and 10, outer eartip internal support subsystem 380 may include an outer eartip internal support feature 383 that may extend from inner eartip exterior surface 369 towards outer eartip interior surface 371 (e.g., through a portion of outer eartip space 375). For example, outer eartip internal support feature 383 may include four support components, such as a first support component 384-1 with a support body 384-1*b* that may extend out to a free end 384-1*e* from an anchor end 384-1*a* that may be coupled to or integrated with inner eartip exterior surface 369 about a first portion of a perimeter of inner eartip body 364, a second support component 384-2 with a support body 384-2*b* that may extend out to a free end 384-2*e* from an anchor end 384-2*a* that may be coupled to or integrated with inner eartip exterior surface 369 about a second portion of a perimeter of inner eartip body 364, a third support component 384-3 with a support body 384-3*b* that may extend out to a free end 384-3*e* from an anchor end 384-3*a* that may be coupled to or integrated with inner eartip exterior surface 369 about a third portion of a perimeter of inner eartip body 364, and a fourth support component 384-4 with a support body 384-4*b* that may extend out to a free end 384-4*e* from an anchor end 384-4*a* that may be coupled to or integrated with inner eartip exterior surface 369 about a fourth portion of a perimeter of inner eartip body 364. As shown, each one of free ends 384-1*e*, 384-2*e*, 384-3*e*, and 384-4*e* may be at least partially provided in the same plane (e.g., a single X-Y plane of FIG. 10), such that each support component of outer eartip internal support feature 383 may be operative to interface with (e.g., face, contact, and/or be coupled to) different portions of outer eartip interior surface 371 within a single cross-sectional periphery thereof.

Different support components of outer eartip internal support feature 383 may be configured with different geometries for facing different sized portions of a perimeter of outer eartip interior surface 371. For example, each one of support components 384-1 and 384-2 may be configured with similar geometries on opposite sides of inner eartip space 365, while each one of support components 384-3 and 384-4 may be configured with similar geometries on opposite sides of inner eartip space 365 that may be offset from each one of support components 384-1 and 384-2 about inner eartip body 364 (e.g., by about 90°). Support component 384-1 may extend from inner eartip exterior surface 369 such that free end 384-1*e* may interface with (e.g., extend adjacent to) a relatively small interface portion 379-1 of outer eartip interior surface 371 (e.g., 3.6° or 1% of the perimeter of outer eartip interior surface 371 in the X-Y plane of FIG. 10) while support component 384-3 may extend from inner eartip exterior surface 369 such that free end 384-3*e* may interface with (e.g., extend adjacent to) a relatively large interface portion 379-3 of outer eartip interior surface 371 (e.g., 60° or 16% of the perimeter of outer eartip interior surface 371 in the X-Y plane of FIG. 10). A flap portion 384-1*f* may be provided at free end 384-1*e* along the entire perimeter of free end 384-1*e* and may extend downwardly (e.g., following a contour of a portion of outer eartip interior surface 371 that may interface with flap portion 384-10 and, similarly, a flap portion 384-2*f* may be provided at free end 384-2*e* along the entire perimeter of free end 384-2*e* and may extend downwardly (e.g., following a contour of a portion of outer eartip interior surface 371 that may interface with flap portion 384-20. A flap portion 384-3*f* may be provided at free end 384-3*e* along only certain portions of the perimeter of free end 384-3*e* and may extend downwardly or upwardly (e.g., following any contour of a portion of outer eartip interior surface 371 that may interface with flap portion 384-3*f*) and, similarly, a flap portion 384-4*f* may be provided at free end 384-4*e* along only certain portions of the perimeter of free end 384-4*e* and may extend downwardly or upwardly (e.g., following any contour of a portion of outer eartip interior surface 371 that may interface with flap portion 384-4*f*). Therefore, a flap portion may extend from an entirety or only a portion of a perimeter of a free end of a support component of an outer eartip internal support feature. Moreover, as shown in FIG. 10, the geometry of a free end of a support component may have a variable distance from an adjacent portion of outer eartip interior surface 371 (e.g., an exterior surface of free end 384-3*e* of support component 384-3 facing outer eartip interior surface 371 may have an irregular shape such that different portions of that exterior surface of free end 384-3*e* may have different minimum distances from outer eartip interior surface 371 when eartip subassembly 350 is in its default configuration, which may enable different portions of free end 384-3*e* to provide different rigidities to outer eartip interior surface 371).

Different support components of outer eartip internal support feature 383 may be configured with different geometries for deforming in different manners (e.g., in response to pressure being exerted thereon by outer eartip interior surface 371 in response to outer eartip exterior surface 379 being deformed by an external force of a user). For example, as shown in FIG. 8, the geometry of support body 384-1*b* of first support component 384-1 in a default configuration may include one or more flexibility features 384-1*y* that may be operative to provide additional flexibility to support body 384-1*b*. As just one example, a flexibility feature 384-1*y* may be operative to make the length of a front surface and/or the length of a back surface of support body 384-1*b* longer than the distance between ends 384-1*a* and 384-1*e* in the default configuration of support body 384-1*b*, such that support body 384-1*b* may be operative to flex more easily out of plane at such a flexibility feature 384-1*y*. One or more local cuts, holes, pockets, or reduced thickness portions may be provided along any suitable portion or portions of a support body to vary the flexibility of the support body. Additionally or alternatively, a tapering wall section, a constant thickness section of a varying shape along its length or width (e.g., adding an S-shape or the like within a plane of the body), or the like may be utilized to vary the flexibility of a support body.

Figure 11:
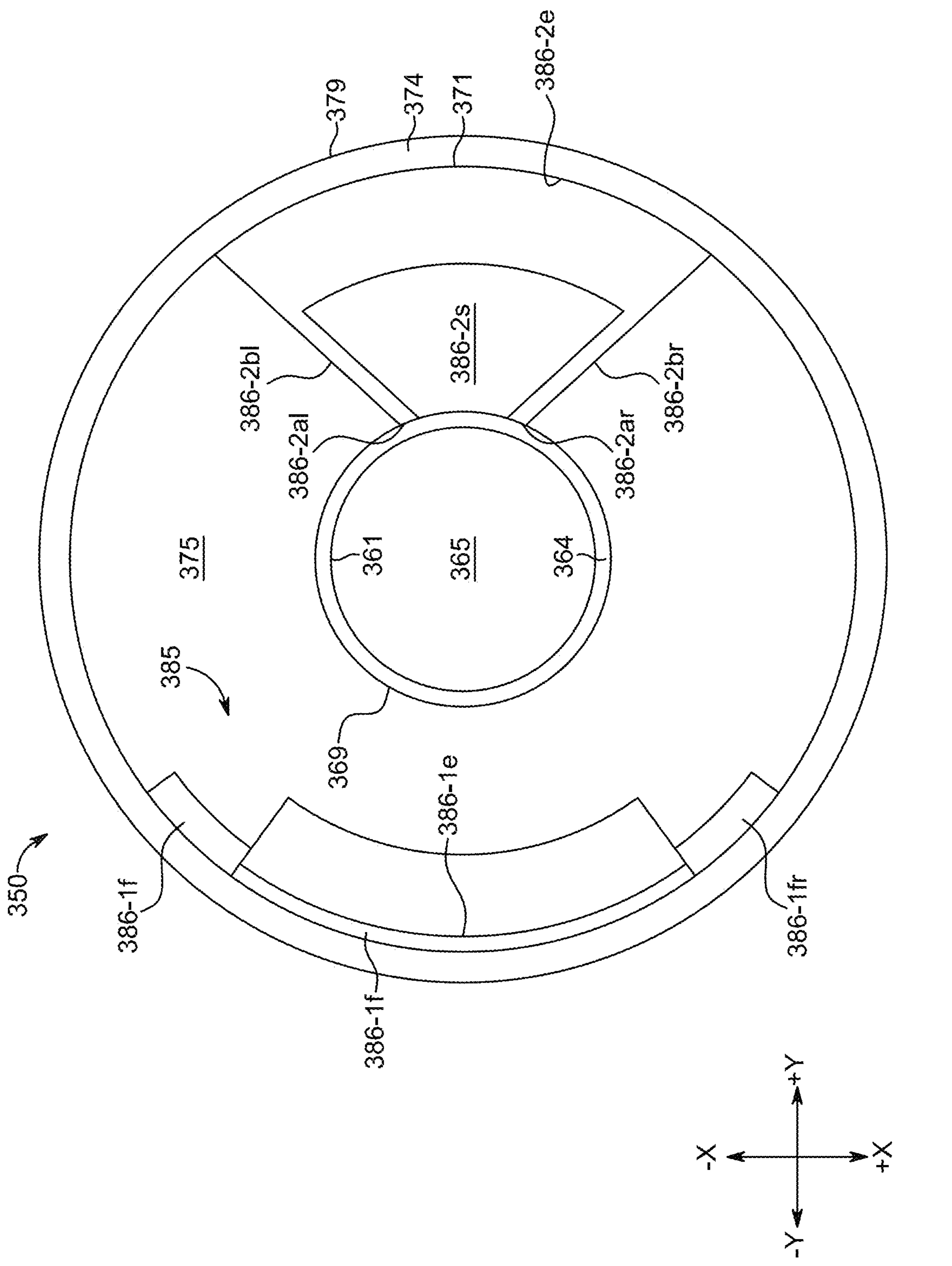
FIG. 11 is a cross-sectional view of the eartip subassembly of FIGS. 7-10, taken from line XI-XI of FIG. 8.
Figure 12:
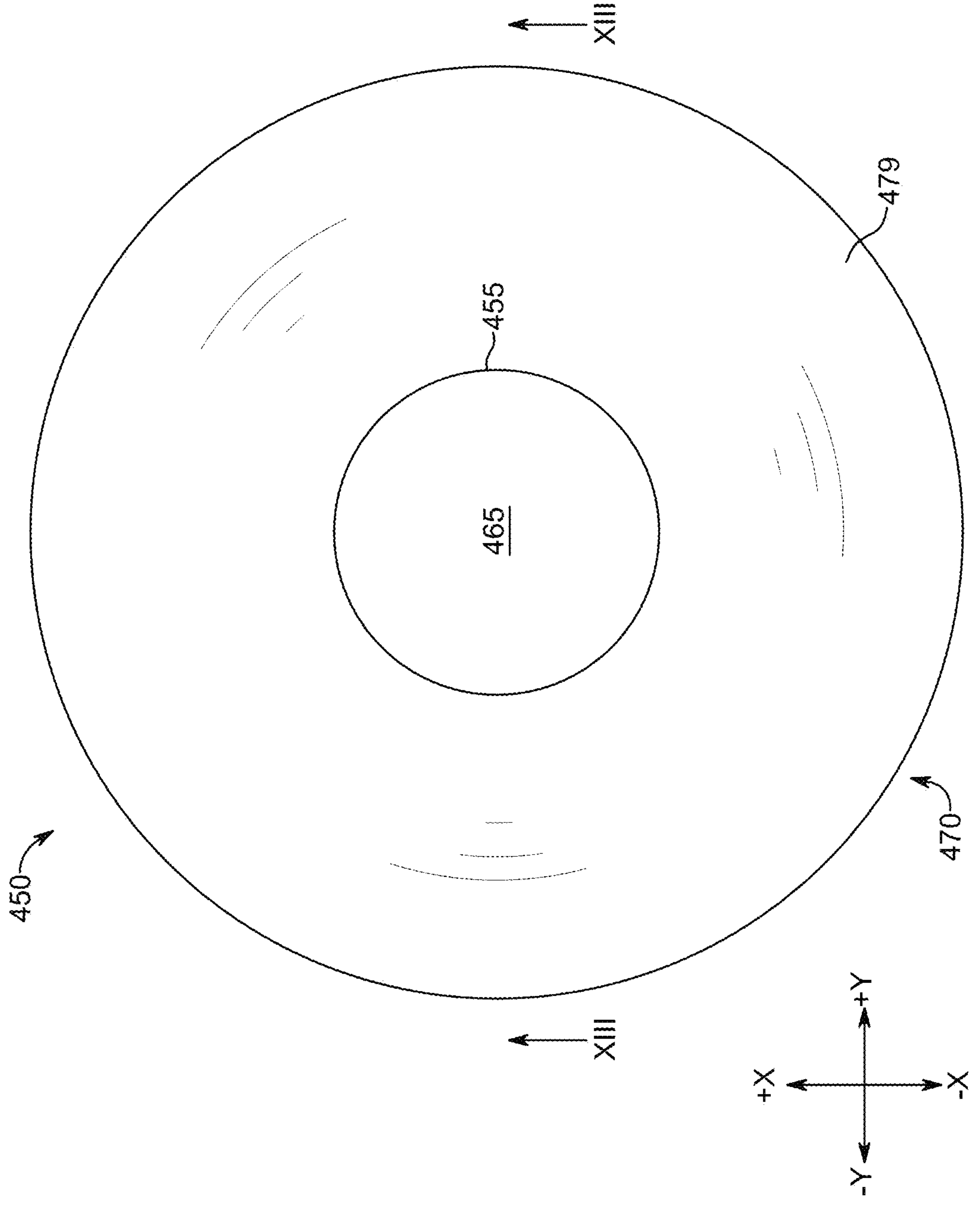
FIG. 12 is a top elevational view of another illustrative eartip subassembly with internal support components.

As shown in FIGS. 8 and 11, outer eartip internal support subsystem 380 may include an outer eartip internal support feature 385 that may extend from inner eartip exterior surface 369 towards outer eartip interior surface 371 (e.g., through a portion of outer eartip space 375). For example, outer eartip internal support feature 385 may include two support components, such as a first support component 386-1 with a front support body 386-1*bf* that may extend out to a free end 386-1*e* from a front anchor end 386-1*af* that may be coupled to or integrated with inner eartip exterior surface 369 at a front portion of inner eartip body 364 and a back support body 386-*ibb* that may extend out to that same free end 386-1*e* from a back anchor end 386-1*ab* that may be coupled to or integrated with inner eartip exterior surface 369 at a back portion of inner eartip body 364, and a second support component 386-2 with a left support body 386-2*b*1 that may extend out to a free end 386-2*e* from a left anchor end 386-2*a*1 that may be coupled to or integrated with inner eartip exterior surface 369 at a left portion of inner eartip body 364 and a right support body 386-2*br* that may extend out to free end 386-2*e* from a right anchor end 386-2*ar* that may be coupled to or integrated with inner eartip exterior surface 369 at a right portion of inner eartip body 364. As shown, each one of free ends 386-1*e* and 386-2*e* may be at least partially provided in the same plane (e.g., a single X-Y plane of FIG. 11), such that each support component of outer eartip internal support feature 385 may be operative to interface with different portions of outer eartip interior surface 371 within a single cross-sectional periphery thereof.

Different portions of a flap may extend in different directions from a free end of a support body for interfacing with different portions of an outer eartip interior surface. For example, as shown in FIG. 8, a flap portion 386-1*f* may be provided at free end 386-1*e* along a portion or the entirety of free end 386-1*e* and an upward portion 386-1*fu* of flap portion 386-1*f* may extend upwardly from free end 386-1*e* (e.g., following a contour of a portion of outer eartip interior surface 371 extending towards front end 378 that may interface with that upwardly extending portion of flap portion 386-1*f*) while a downward portion 386-1*fd* of flap portion 386-1*f* may extend downwardly from free end 386-1*e* (e.g., following a contour of a portion of outer eartip interior surface 371 extending towards back end 372 that may interface with that downwardly extending portion of flap portion 386-10. Alternatively or additionally, as shown in FIG. 11, flap portion 386-1*f* may be provided at free end 386-1*e* along a portion or the entirety of free end 386-1*e* and a leftward portion 386-1*fl* of flap portion 386-1*f* may extend leftwardly from free end 386-1*e* (e.g., following a contour of a portion of outer eartip interior surface 371 extending in a clockwise direction about the path for sound S of inner eartip space 365 (e.g., about the Z-axis) that may interface with that leftwardly extending portion of flap portion 386-1*f*)

while a rightward portion 386-1*fr* of flap portion 386-1*f* may extend rightwardly from free end 386-1*e* (e.g., following a contour of a portion of outer eartip interior surface 371 extending in a counter-clockwise direction about the path for sound S of inner eartip space 365 (e.g., about the Z-axis) that may interface with that rightwardly extending portion of flap portion 386-1*f*). Therefore, different flap portions may extend in opposite directions from a free end of a particular support body (e.g., upwardly and downwardly, or leftwardly and rightwardly), and/or different flap portions may extend in substantially perpendicular directions from a free end of a particular support body (e.g., upwardly and rightwardly or leftwardly, or downwardly and rightwardly or leftwardly). Different portions of a flap portion or different flap portions coupled to a particular support body (e.g., upward portion 386-1*fu* and downward portion 386-1*fd*) may be configured to have different rigidities for imparting different flexibility characteristics to the respective different portions of an eartip body surface with which those different flap portions may interface (e.g., during deformation of outer eartip body 374 when eartip subassembly 350 is positioned within a user's ear canal).

In some embodiments, a support component may not be provided with a flap portion but, instead, the free end of the support body of that support component may be shaped to follow the contour of a portion of an outer eartip interior surface. For example, as shown in FIGS. 8 and 11, the external surface of free end 386-2*e* of support component 386-2 may be shaped to match the contour of a portion of outer eartip interior surface 371 that may interface with support component 386-2. Particularly, as shown in FIG. 8, a first geometry of the external surface of free end 386-2*e* may be operative to match the geometry of a portion of outer eartip interior surface 371 in a Y-Z plane (e.g., along a length of a portion of outer eartip interior surface 371) and/or, as shown in FIG. 11, a second geometry of the external surface of free end 386-2*e* may be operative to match the geometry of a portion of outer eartip interior surface 371 in aX-Y plane (e.g., along a cross-sectional perimeter of a portion of outer eartip interior surface 371).

Different support components of outer eartip internal support feature 385 may be configured with different geometries for deforming in different manners (e.g., in response to pressure being exerted thereon by outer eartip interior surface 371 in response to outer eartip exterior surface 379 being deformed by an external force of a user). For example, as shown in FIG. 8, the geometry of support component 386-1 may include two different support bodies (e.g., front support body 386-1*bf* and back support body 386-11*k*) that may extend to the same free end 386-1*e* from different anchor points along the length of inner eartip body 364 (e.g., a first anchor point at anchor end 386-1*af* that may be more proximal to front end 368 of inner eartip body 364 and a second anchor point at anchor end 386-1*ab* that may be more proximal to back end 362 of inner eartip body 364) for defining a longitudinal space 386-1*s* therebetween that may be deformed when an external force is applied to flap portion 386-1*f* by outer eartip body 374 (e.g., deformation in the Y-Z plane of FIG. 8). As another example, as shown in FIG. 11, the geometry of support component 386-2 may include two different support bodies (e.g., left support body 386-2*b*1 and right support body 386-2*br*) that may extend to the same free end 386-2*e* from the same or different anchor points about the periphery of inner eartip body 364 for defining a transverse or radial space 386-2*s* therebetween that may be deformed when an external force is applied to flap portion 386-2*f* by outer eartip body 374 (e.g., deformation in the X-Y plane of FIG. 11). In some embodiments, rather than two support bodies being provided by support component 386-1 or support component 386-2, only one of such support bodies may be provided, thereby changing the rigidity of that support component and, thus, the effective surface stiffness of the portion of outer eartip interior surface 371 that may interface with the flap portion or the free end portion of that support component 386-1 or that support component 386-2.

Eartip internal support features 381, 383, and 385 of outer eartip internal support subsystem 380 may be spaced apart from one another along the length of inner eartip body 164 (e.g., along the Z-axis) in any suitable fashion. For example, each pair of consecutively positioned eartip internal support features may be spaced equidistant from one another along the length of inner eartip body 164 (e.g., spacing distance 389*a* between internal support feature 381 and internal support feature 383 may be the same as spacing distance 389*b* between internal support feature 383 and internal support feature 385). Alternatively, the spacing between different pairs of consecutively positioned eartip internal support features may vary along the length of inner eartip body 164 (e.g., spacing distance 389*a* may be shorter or longer than spacing distance 389*b*).

Any portion or the entirety of one or more outer eartip internal support features of outer eartip internal support subsystem 380 (e.g., support bodies and/or flap portions of eartip internal support features 381, 383, and 385) may be formed of any suitable material, which may be the same as or different than the material of inner eartip body 364. Moreover, one or more outer eartip internal support features of outer eartip internal support subsystem 380 (e.g., one or more of the support bodies of eartip internal support features 381, 383, and 385) may be coupled to inner eartip portion 360 (e.g., with one or more anchor ends at one or more portions of inner eartip exterior surface 369) using any suitable approach or mechanism, including, but not limited to, any suitable adhesive(s) (e.g., glues or tapes), any suitable ttasket(s), any suitable heat staking or other heat treatment, any suitable interference fit(s), any suitable mechanical connector(s), and/or the like. Additionally or alternatively, one or more outer eartip internal support features of outer eartip internal support subsystem 380 (e.g., eartip internal support features 381, 383, and 385) may be molded to or otherwise integrated with inner eartip portion 360 using any suitable process (e.g., in a single or double-shot molding process). Any portion or the entirety of one or more support bodies of one or more support components of one or more outer eartip internal support features of an outer eartip internal support subsystem may be formed of any suitable material, which may be the same as or different than the material of any portion of the entirety of one or more flap portions of one or more support components of one or more outer eartip internal support features of an outer eartip internal support subsystem. Moreover, any flap portion of any eartip internal support feature of an outer eartip internal support subsystem may be coupled to any support body of any eartip internal support feature of an outer eartip internal support subsystem using any suitable approach or mechanism, including, but not limited to, any suitable adhesive(s) (e.g., glues or tapes), any suitable gasket(s), any suitable heat staking or other heat treatment, any suitable interference fit(s), any suitable mechanical connector(s), and/or the like. Additionally or alternatively, any flap portion of any eartip internal support feature of an outer eartip internal support subsystem may be molded to or otherwise integrated with any support body of any eartip internal support feature of an outer eartip internal support subsystem using any suitable process (e.g., in a single or double-shot molding process).

FIGS. 12-16

FIGS. 12-15 show another illustrative eartip subassembly 450, which may be similar to eartip subassembly 150 of FIGS. 1-4 but may include an outer eartip internal support subsystem with one or more support components extending away from an exterior surface of an inner eartip body and substantially along a longitudinal length of the inner eartip body for varying the effective rigidity of an exterior surface of an outer eartip body to affect the ability of the outer eartip body to conform to various ear canal geometries. Eartip subassembly 450 of FIGS. 12-16 may include similar components to eartip subassembly 150 of FIGS. 1-4, where elements of eartip subassembly 450 of FIGS. 12-16 being labeled with "4xx" reference labels may correspond to the "1 xx" reference labels of the labeled elements of eartip subassembly 150 of FIGS. 1-4, and where differences therebetween may be described below. As shown, an eartip subassembly 450 may include an inner eartip portion 460 and an outer eartip portion 470 coupled to inner eartip portion 460 at interface 455. Inner eartip portion 460 may include an inner eartip body 464 that may extend between an inner eartip back end 462 and an inner eartip front end 468, where both an inner eartip interior surface 461 of inner eartip body 464 and an opposite inner eartip exterior surface 469 of inner eartip body 464 may extend between inner eartip back end 462 and inner eartip front end 468, and where an inner eartip space 465 may be defined by inner eartip interior surface 461 and may extend between an inner eartip back opening 463 that may be provided through inner eartip back end 462 and an inner eartip front opening 467 that may be provided through inner eartip front end 468. Outer eartip portion 470 may include an outer eartip body 474 that may extend between an outer eartip back end 472 and an outer eartip front end 478, where both an outer eartip interior surface 471 of outer eartip body 474 and an opposite outer eartip exterior surface 479 of outer eartip body 474 may extend between outer eartip back end 472 and outer eartip front end 478, and where an outer eartip space 475 may be defined by outer eartip interior surface 471 (e.g., one portion of space 475 may be defined between outer eartip interior surface 471 and inner eartip exterior surface 469 when at least a portion of inner eartip body 464 is positioned between portions of outer eartip interior surface 471, and another portion of space 475 may be occupied by inner eartip body 464 and inner eartip space 465) and may extend between outer eartip back end 472 and outer eartip front end 478, while an outer eartip back opening 473 may be provided through outer eartip back end 472 and an outer eartip front opening 477 may be provided through outer eartip front end 478. Although not shown, eartip subassembly 450 may include any suitable inner eartip internal support system, such as inner eartip internal support system 166 of eartip subassembly 150 or inner eartip internal support system 266 of eartip subassembly 250. Additionally or alternatively, although not shown, eartip subassembly 450 may be coupled to any suitable housing subassembly and any suitable sound emitting subassembly in any suitable manner for providing any suitable earpiece for a headphone assembly.

Eartip subassembly 450 may include an outer eartip internal support subsystem 480 that may be operative to vary the ability of outer eartip exterior surface 479 to conform to various ear canal geometries for improving the ability of eartip subassembly 450 to create an effective acoustic seal and/or to provide comfort to the user. Outer eartip internal support subsystem 480 may be operative to vary the effective surface stiffness of eartip exterior surface 479 along a length of eartip exterior surface 479 (e.g., from outer eartip front end 478 to outer eartip back end 472) and/or about a perimeter of eartip exterior surface 479 (e.g., about at least a portion of the path of sound S (e.g., about the Z-axis in an X-Y plane)). Outer eartip internal support subsystem 480 may include one or more eartip internal support features (e.g., three eartip internal support features 481, 483, and 485), each of which may include one or more support components that may extend from inner eartip exterior surface 469 and along at least a portion of a length of inner eartip exterior surface 469 at an anchor end towards a free end that may contact or lie proximal to a portion of outer eartip interior surface 471 (e.g., as one or more longitudinal support components). Different eartip internal support features of outer eartip internal support subsystem 480 may be spaced longitudinally from one another along the length of inner eartip body 464 and/or along the length of outer eartip interior surface 471 such that different eartip internal support features may be operative to interact with different portions of outer eartip interior surface 471 along the length of outer eartip portion 470 (e.g., from outer eartip front end 478 to outer eartip back end 472).

Figure 13:
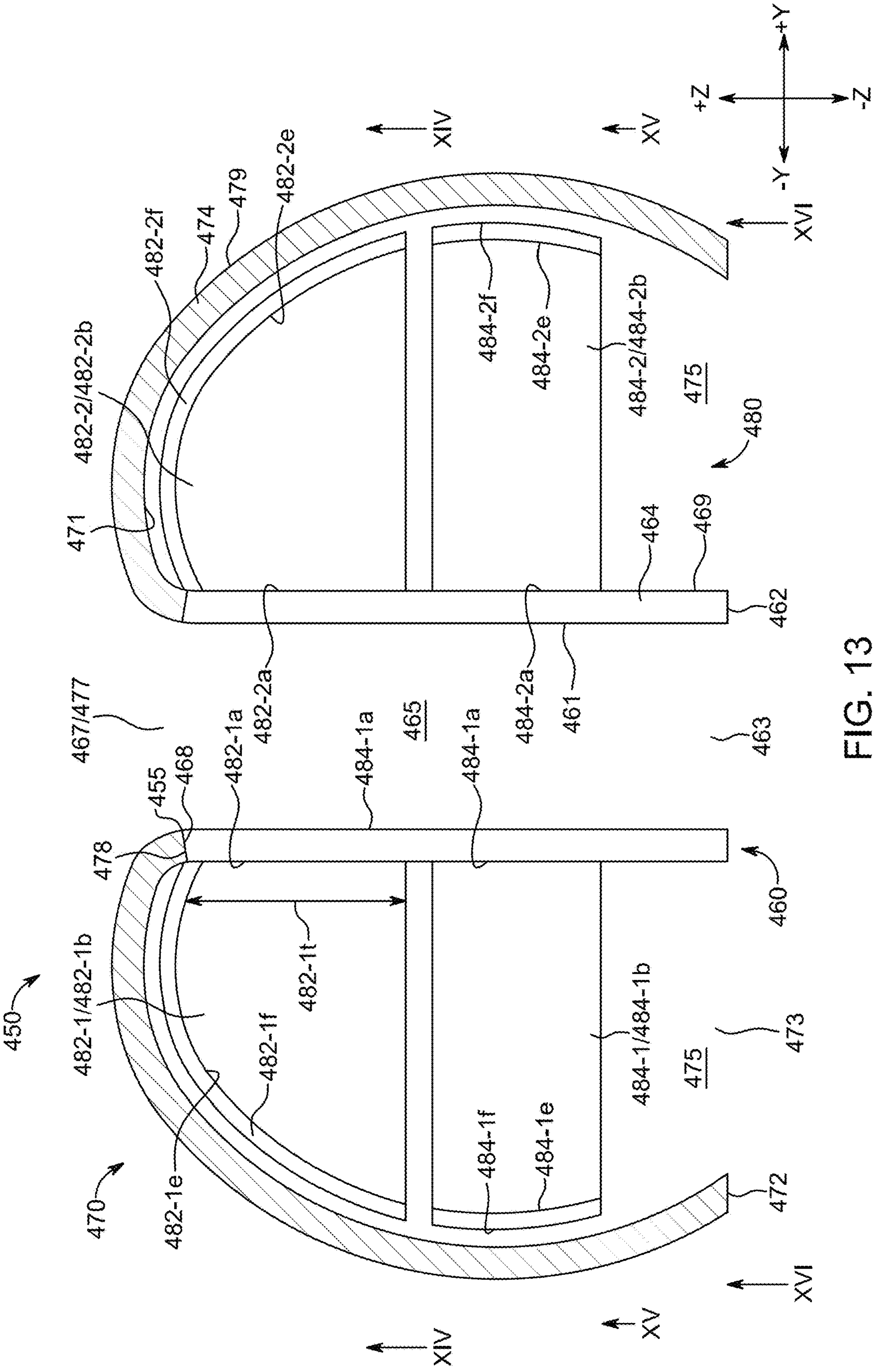
FIG. 13 is a cross-sectional view of the eartip subassembly of FIG. 12, taken from line XIII-XIII of FIG. 12.
Figure 14:
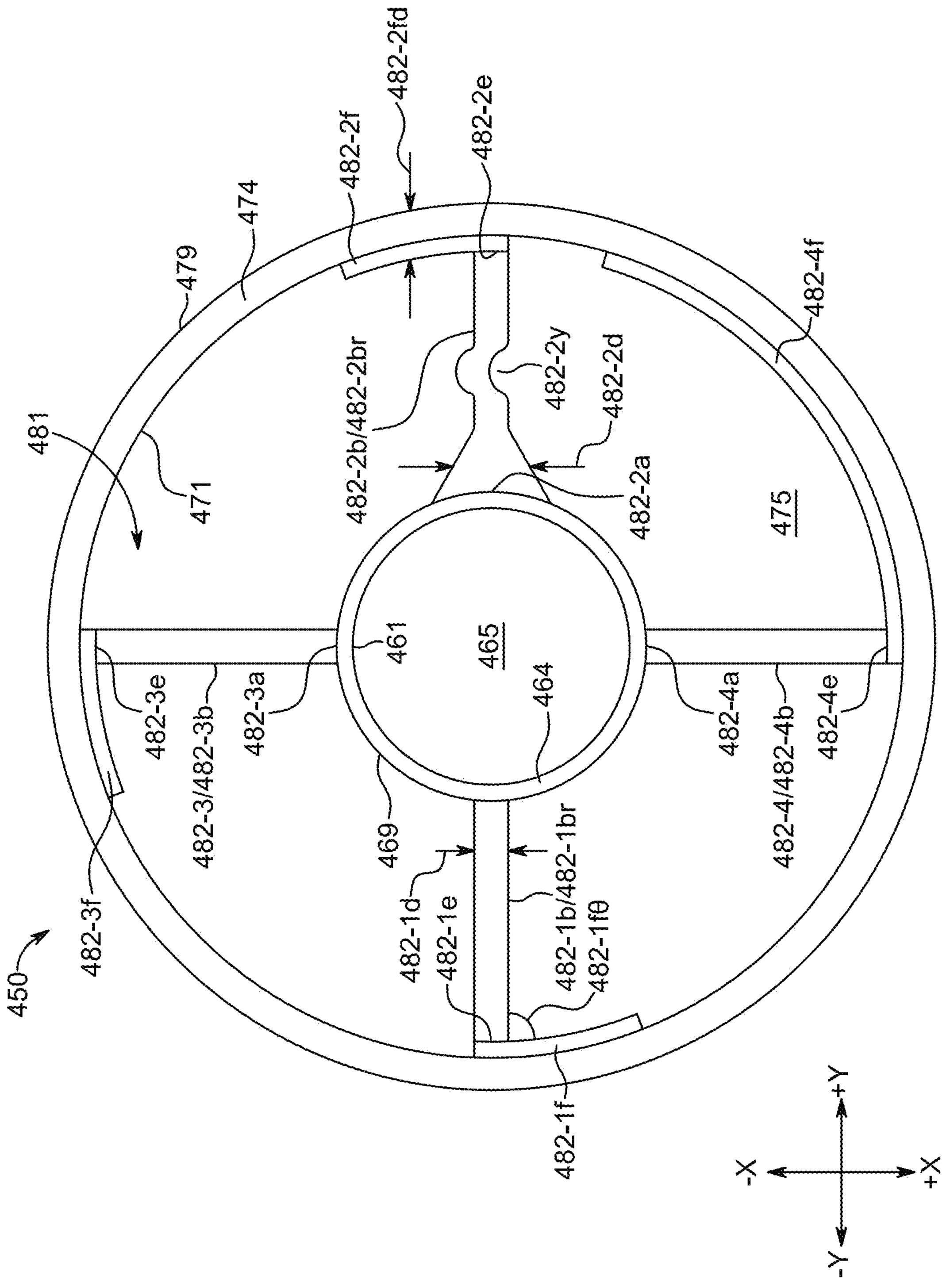
FIG. 14 is a cross-sectional view of the eartip subassembly of FIGS. 12 and 13, taken from line XIV-XIV of FIG. 13.

As shown in FIGS. 13 and 14, outer eartip internal support subsystem 480 may include an outer eartip internal support feature 481 that may extend from inner eartip exterior surface 469 towards outer eartip interior surface 471 (e.g., through a portion of outer eartip space 475). For example, outer eartip internal support feature 481 may include one or more support components, such as a first support component 482-1 with a support body **482-1*b* that may extend out to a free end 482-1*e* from an anchor end 482-1*a* that may be coupled to or integrated with inner eartip exterior surface 469 along a first longitudinal portion of inner eartip body 464, a second support component 482-2 with a support body 482-2*b* that may extend out to a free end 482-2*e* from an anchor end 482-2*a* that may be coupled to or integrated with inner eartip exterior surface 469 along a second longitudinal portion of inner eartip body 464, a third support component 482-3 with a support body 482-3*b* that may extend out to a free end 482-3*e* from an anchor end 482-3*a* that may be coupled to or integrated with inner eartip exterior surface 469 along a third portion of inner eartip body 464, and/or a fourth support component 482-4 with a support body 482-4*b* that may extend out to a free end 482-4*e* from an anchor end 482-4*a* that may be coupled to or integrated with inner eartip exterior surface 469 along a fourth portion of inner eartip body 464. The depth of a support body may be consistent or vary along the length of the support body. For example, as shown, depth 482-1*d* of support body 482-1*b* of support component 482-1 between opposite surfaces of support body 482-1*b* may be consistent along its entire length (e.g., between anchor end 482-1*a* and free end 482-1*e*), while depth 482-2*d* of support body 482-2*b* of support component 482-2 between opposite surfaces of support body 482-2*b* may vary along at least a portion of its length (e.g., between anchor end 482-2*a* and free end 482-2*e***).

Unlike one or more of the support bodies of outer eartip internal support subsystem 380 of FIGS. 7-11, where the thickness of a support body may be substantially smaller than the depth of that support body (e.g., where thickness **382*t* of support body 382*b* along a Z-direction in a Y-Z plane of FIG. 8 may be relatively minimal compared to the depth of support body 382*b* that may extend all the way about the Z-axis in the X-Y plane of FIG. 9), the thickness of a support body of outer eartip internal support subsystem 480** of FIGS.

12-16 may be substantially greater than the depth of that support body (e.g., where thickness 482-1*t* of support body 482-1*b* along a Z-direction in a Y-Z plane of FIG. 13 may be large compared to depth 482-1*d* of support body 482-1*b* that may extend a relatively minimal distance with respect to the Z-axis in the X-Y plane of FIG. 14). Therefore, support components of outer eartip internal support subsystem 480 may be considered longitudinal support components as compared to support components of outer eartip internal support subsystem 380 that may be considered transverse support components. For example, in one particular embodiment, as shown, support body 482-1*b* may be a thin flat rudder-like object with opposite side surfaces that may be flat and/or parallel for defining depth 482-1*d* therebetween, where free end 482-1*e* may contact or lie adjacent to outer eartip interior surface 471. In an undeformed configuration of eartip subassembly 450 of FIGS. 12-16 (e.g., the functional configuration of eartip subassembly 450 without any external forces applied thereto, such as by a user), free end 482-1*e* of support body 482-1*b* of support component 482-1 may contact outer eartip interior surface 471 or may be distanced any suitable spacing distance from outer eartip interior surface 471, where such a spacing distance may be small enough so as to be closed when outer eartip body 474 may receive an external force on outer eartip exterior surface 479 (e.g., by a user's ear canal) that may deform outer eartip body 474 to contact at least a portion of free end 482-1*e* of support component 482-1 and potentially to deform support component 482-1 (e.g., to deform support body 482-1*b* so as to shorten the distance between ends 482-1*a* and 482-1*e* of support body 482-1*b*). Support body 482-2*b* may be shaped similarly, except, for example, depth 482-2*d* may vary in any suitable way between ends 482-2*a* and 482-2*e*.

Different support components of outer eartip internal support feature 481 may be configured with different geometries for deforming in different manners (e.g., in response to pressure being exerted thereon by outer eartip interior surface 471 in response to outer eartip exterior surface 479 being deformed by an external force of a user). For example, as shown in FIG. 14, the geometry of support body 482-1*b* of first support component 482-1 in a default configuration may be substantially linear along its entire length (e.g., along a back surface 482-1*br* between anchor end 482-1*a* and free end 482-1*e*), while the geometry of support body 482-2*b* may include one or more flexibility features 482-2*y* (e.g., along a back surface 482-2*br* between anchor end 482-2*a* and free end 482-2*e*) that may be operative to provide additional flexibility to support body 482-2*b*. As just one example, a flexibility feature 482-2*y* may be operative to make the length of a front surface and/or the length of back surface 482-2*br* of support body 482-2*b* longer than the distance between ends 482-2*a* and 482-2*e* in the default configuration of support body 482-2*b*, such that support body 482-2*b* may be operative to flex more easily out of plane at such a flexibility feature 482-2*y*. One or more local cuts, holes, pockets, or reduced thickness portions may be provided along any suitable portion or portions of a support body to vary the flexibility of the support body. Additionally or alternatively, a tapering wall section, a constant thickness section of a varying shape along its length or width (e.g., adding an S-shape or the like within a plane of the body), varying the size of a coupling between a support body at an anchor end and inner eartip body, or the like may be utilized to vary the flexibility of a support body.

While support body 482-1*b* of support component 482-1 may extend substantially linearly between ends 482-1*a* and 482-1*e* within any particular cross-section transverse to interior eartip body 464 (e.g., in any X-Y plane transverse to a Z-axis, as may be shown in FIG. 14), a flap portion 482-1*f* may be provided at free end 482-1*e* that may be operative to extend away from support body 482-1*b* (e.g., at any suitable flap angle 482-1*f*θ, such as 85°) within such a particular cross-section for following at least a portion of a contour of outer eartip interior surface 471 (e.g., a portion of the perimeter of outer eartip interior surface 471 that may extend about at least a portion of the path of sound S (e.g., about the Z-axis in an X-Y plane)). For example, flap portion 482-1*f* may extend away from free end 482-1*e* of support component 482-1 and along any suitable portion of outer eartip interior surface 471 (e.g., about 25% of the way along outer eartip interior surface 471 towards adjacent support component 482-4, as shown in FIG. 14), while a flap portion 482-4*f* may extend away from free end 482-4*e* of support component 482-4 and along any suitable portion of outer eartip interior surface 471 (e.g., about 95% of the way along outer eartip interior surface 471 towards adjacent support component 482-2, as shown in FIG. 14). In its default configuration, flap portion 482-1*f* may extend about the Z-axis in a counter-clockwise direction from free end 482-1*e* with an exterior flap surface that may be shaped similarly to or otherwise follow a contoured shape similar to that of a portion of outer eartip interior surface 471 that may be facing the exterior flap surface of flap portion 482-1*f* (e.g., as shown in FIG. 14), where such surfaces may be contacting one another or positioned proximate one another when eartip subassembly 450 may be in its default configuration. Flap portion 482-1*f* may be operative to provide a larger and more gradual interface than free end 482-1*e* for at least a portion of outer eartip interior surface 471 with support component 482-1 during deformation of that portion of outer eartip interior surface 471. For example, flap portion 482-1*f* may be operative to act as a soft leaf spring for providing some rigidity to at least the portion of outer eartip interior surface 471 that may contact an exterior flap surface of flap portion 482-*f* during any attempted deformation of that portion of outer eartip interior surface 471.

As shown in FIG. 14, each one of support components 482-1, 482-2, 482-3, and 482-4 may include a respective flap portion that may extend about the Z-axis in a counter-clockwise direction from a respective free end with an exterior flap surface that may be shaped similarly to or otherwise follow a contoured shape similar to that of a portion of outer eartip interior surface 471 that may be facing the exterior flap surface of that respective flap portion. For example, flap portion 482-1*f* may extend from free end 482-1*e* about the Z-axis in a counter-clockwise direction with a contour similar to that of an adjacent portion of outer eartip interior surface 471, flap portion 482-2*f* may extend from free end 482-2*e* about the Z-axis in a counter-clockwise direction with a contour similar to that of an adjacent portion of outer eartip interior surface 471, flap portion 482-3*f* may extend from free end 482-3*e* about the Z-axis in a counter-clockwise direction with a contour similar to that of an adjacent portion of outer eartip interior surface 471, and flap portion 482-4*f* may extend from free end 482-4*e* about the Z-axis in a counter-clockwise direction with a contour similar to that of an adjacent portion of outer eartip interior surface 471.

Figure 15:
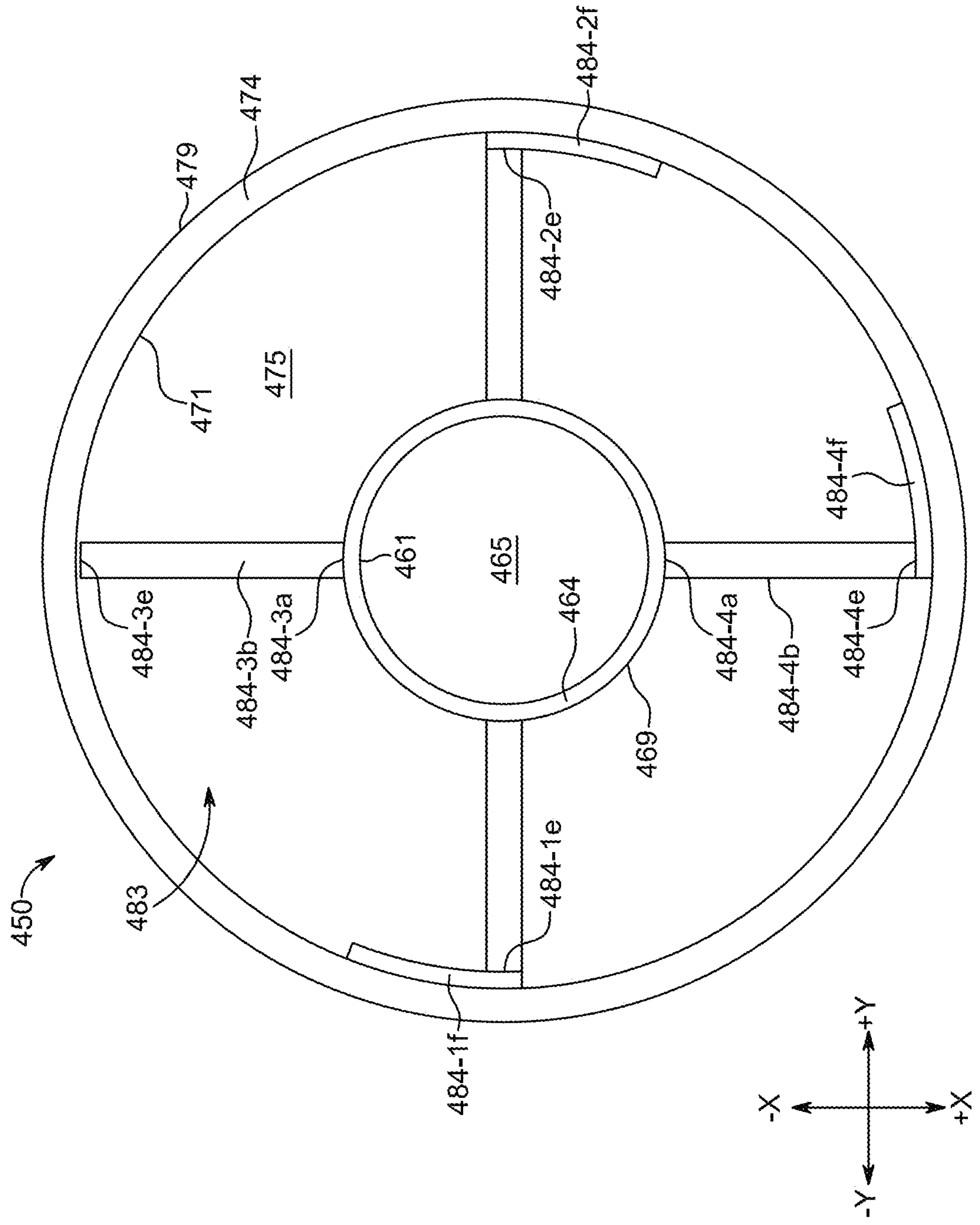
FIG. 15 is a cross-sectional view of the eartip subassembly of FIGS. 12-14, taken from line XV-XV of FIG. 13.

As shown in FIGS. 13 and 15, outer eartip internal support subsystem 480 may include an outer eartip internal support feature 483 that may extend from inner eartip exterior surface 469 towards outer eartip interior surface 471 (e.g., through a portion of outer eartip space 475). For example, outer eartip internal support feature 483 may include one or more support components, such as a first support component 484-1 with a support body **484-1*b* that may extend out to a free end 484-1*e* from an anchor end 484-1*a* that may be coupled to or integrated with inner eartip exterior surface 469 along a fifth longitudinal portion of inner eartip body 464, a second support component 484-2 with a support body 484-2*b* that may extend out to a free end 484-2*e* from an anchor end 484-2*a* that may be coupled to or integrated with inner eartip exterior surface 469 along a sixth longitudinal portion of inner eartip body 464, a third support component 484-3 with a support body 484-3*b* that may extend out to a free end 484-3*e* from an anchor end 484-3*a* that may be coupled to or integrated with inner eartip exterior surface 469 along a seventh portion of inner eartip body 464, and/or a fourth support component 484-4 with a support body 484-4*b* that may extend out to a free end 484-4*e* from an anchor end 484-4*a* that may be coupled to or integrated with inner eartip exterior surface 469 along an eighth portion of inner eartip body 464. The rotational orientation (e.g., about the longitudinal Z-axis of inner eartip space 465) of the fifth longitudinal portion of inner eartip body 464 coupled to anchor end 484-1*a* of support component 484-1 may be the same as the rotational orientation of the first longitudinal portion of inner eartip body 464 coupled to anchor end 482-1*a* of support component 482-1, the rotational orientation of the sixth longitudinal portion of inner eartip body 464 coupled to anchor end 484-2*a* of support component 484-2 may be the same as the rotational orientation of the second longitudinal portion of inner eartip body 464 coupled to anchor end 482-2*a* of support component 482-2, the rotational orientation of the seventh longitudinal portion of inner eartip body 464 coupled to anchor end 484-3*a* of support component 484-3 may be the same as the rotational orientation of the third longitudinal portion of inner eartip body 464 coupled to anchor end 482-3*a* of support component 482-3, and the rotational orientation of the eighth longitudinal portion of inner eartip body 464 coupled to anchor end 484-4*a* of support component 484-4 may be the same as the rotational orientation of the fourth longitudinal portion of inner eartip body 464 coupled to anchor end 482-4*a* of support component 482-4**. However, the geometries (e.g., thicknesses or depths) of any two such similarly rotationally oriented support components may differ or be the same.

Additionally or alternatively, the rigidities (e.g., flexibilities) of any two such similarly rotationally oriented support components may differ or be the same. For example, although flap portion **482-1*f* of support component 482-1 may extend about the Z-axis in a counter-clockwise direction with a contour similar to that of an adjacent portion of outer eartip interior surface 471, a flap portion 484-1*f* of support component 484-1 may extend about the Z-axis in a clockwise direction with a contour similar to that of an adjacent portion of outer eartip interior surface 471, despite support component 482-1 and support component 484-1 being similarly rotationally oriented (e.g., extending radially out from inner eartip body 464 at the same rotational orientation with respect to the same Z-axis (e.g., the −Y-direction of FIG. 13)). As another example, although flap portion 482-2*f* of support component 482-2 may extend about the Z-axis in a counter-clockwise direction with a contour similar to that of an adjacent portion of outer eartip interior surface 471, a flap portion 484-2*f* of support component 484-2 may extend about the Z-axis in a clockwise direction with a contour similar to that of an adjacent portion of outer eartip interior surface 471, despite support component 482-2 and support component 484-2 being similarly rotationally oriented (e.g., extending radially out from inner eartip body 464 at the same rotational orientation with respect to the same Z-axis (e.g., the −FY-direction of FIG. 13)). As yet another example, although flap portion 482-3*f* of support component 482-3 may extend about the Z-axis in a counter-clockwise direction with a contour similar to that of an adjacent portion of outer eartip interior surface 471, support component 484-3 may not include any flap extending in any direction from end 484-3*e*, despite support component 482-3 and support component 484-3 being similarly rotationally oriented (e.g., extending radially out from inner eartip body 464 at the same rotational orientation with respect to the same Z-axis (e.g., the −X-direction of FIGS. 14 and 15)). As yet another example, although flap portion 482-4*f* of support component 482-4 may extend about the Z-axis in a counter-clockwise direction with a contour similar to that of an adjacent portion of outer eartip interior surface 471, support component 484-4 may not include any flap extending in any direction from end 484-4*e*, despite support component 482-4 and support component 484-4 being similarly rotationally oriented (e.g., extending radially out from inner eartip body 464 at the same rotational orientation with respect to the same Z-axis (e.g., the +X-direction of FIGS. 14 and 15**)).

Figure 16:
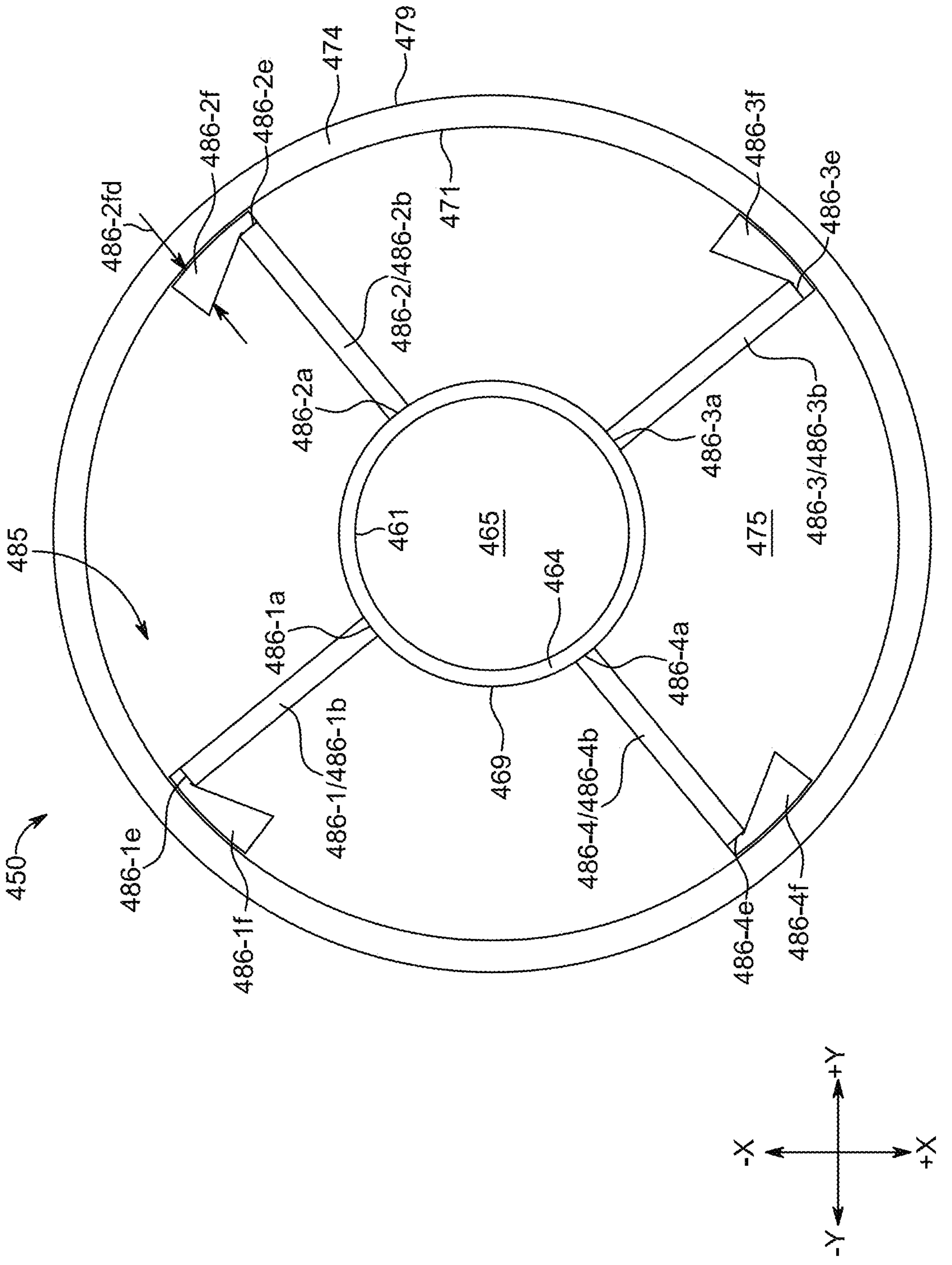
FIG. 16 is a cross-sectional view of the eartip subassembly of FIGS. 12-15, taken from line XVI-XVI of FIG. 13.
Figure 17:
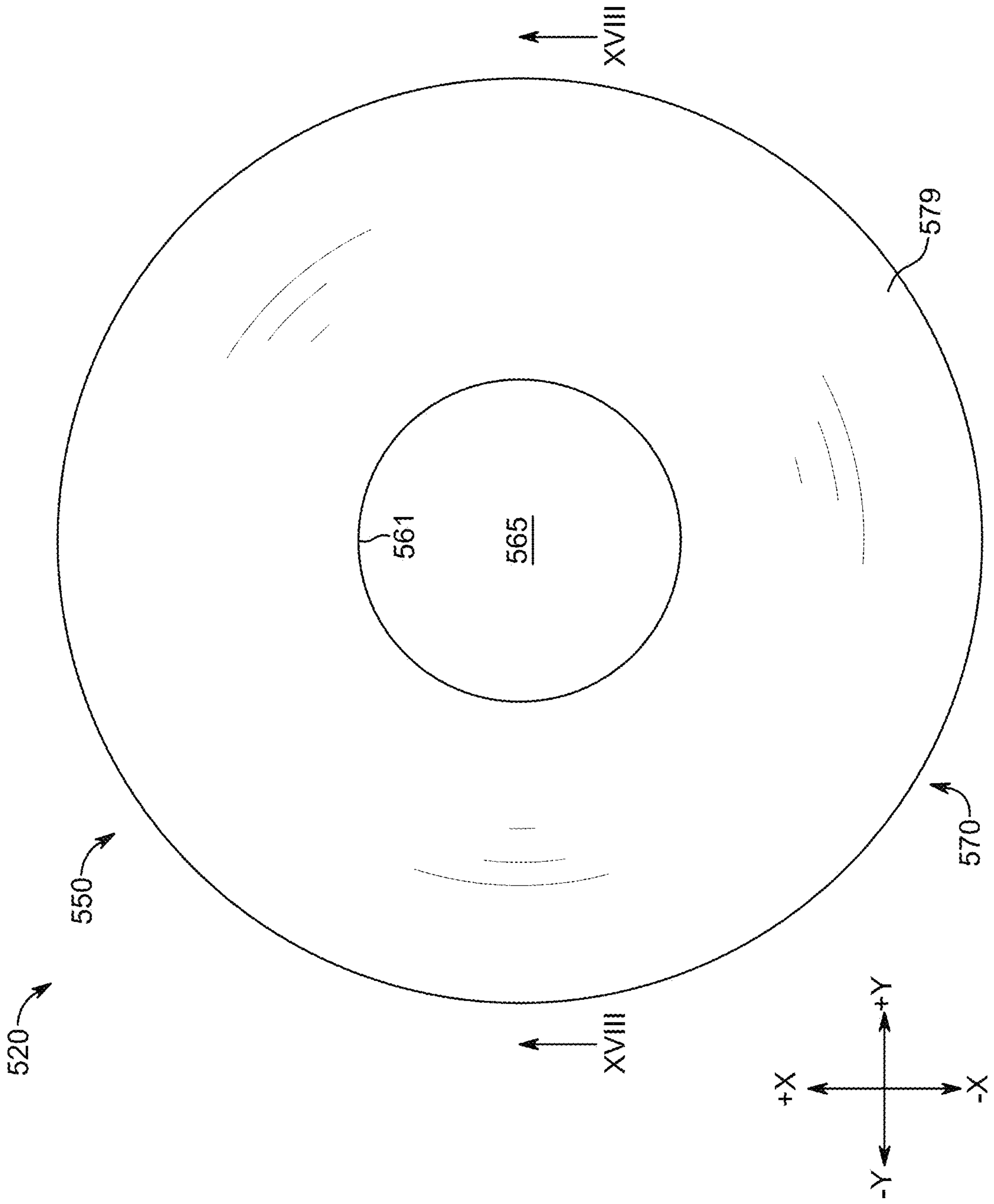
FIG. 17 is a top elevational view of yet another illustrative earpiece with internal support components.
Figure 18:
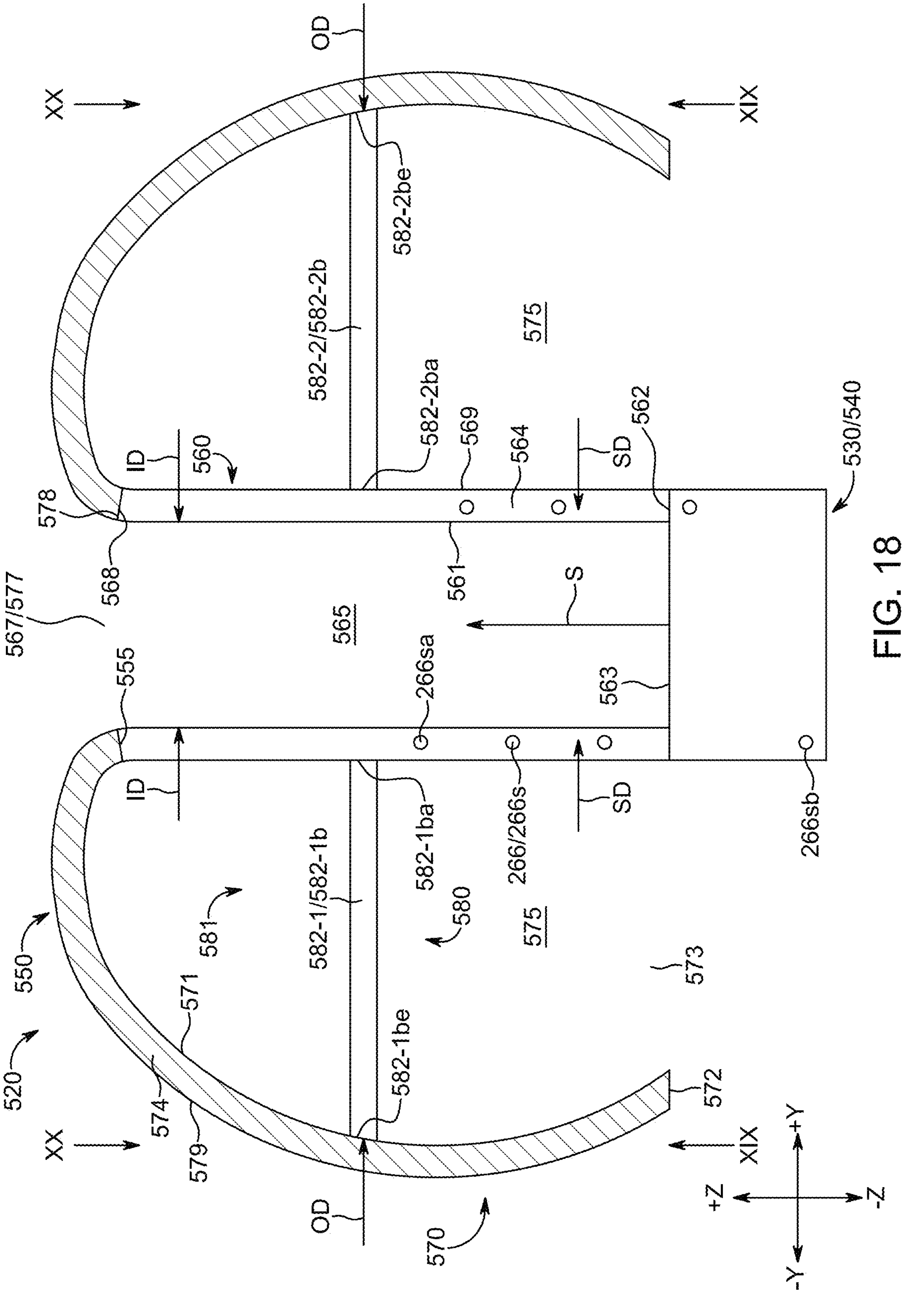
FIG. 18 is a cross-sectional view of the earpiece of FIG. 17, taken from line XVIII-XVIII of FIG. 17.

As shown in FIGS. 13 and 16, outer eartip internal support subsystem 480 may include an outer eartip internal support feature 485 that may extend from inner eartip exterior surface 469 towards outer eartip interior surface 471 (e.g., through a portion of outer eartip space 475). For example, outer eartip internal support feature 485 may include one or more support components, such as a first support component 486-1 with a support body **486-1*b* that may extend out to a free end 486-1*e* from an anchor end 486-1*a* that may be coupled to or integrated with inner eartip exterior surface 469 along a ninth longitudinal portion of inner eartip body 464, a second support component 486-2 with a support body 486-2*b* that may extend out to a free end 484-6*e* from an anchor end 484-6*a* that may be coupled to or integrated with inner eartip exterior surface 469 along a tenth longitudinal portion of inner eartip body 464, a third support component 486-3 with a support body 486-3*b* that may extend out to a free end 486-3*e* from an anchor end 486-3*a* that may be coupled to or integrated with inner eartip exterior surface 469 along an eleventh portion of inner eartip body 464, and/or a fourth support component 486-4 with a support body 486-4*b* that may extend out to a free end 486-4*e* from an anchor end 486-4*a* that may be coupled to or integrated with inner eartip exterior surface 469 along a twelfth portion of inner eartip body 464. The rotational orientation (e.g., about the longitudinal Z-axis of inner eartip space 465) of the ninth longitudinal portion of inner eartip body 464 coupled to anchor end 486-1*a* of support component 486-1 may be between the rotational orientation of the first longitudinal portion of inner eartip body 464 coupled to anchor end 482-1*a* of support component 482-1 and the rotational orientation of the third longitudinal portion of inner eartip body 464 coupled to anchor end 482-3*a* of support component 482-3, the rotational orientation (e.g., about the longitudinal Z-axis of inner eartip space 465) of the tenth longitudinal portion of inner eartip body 464 coupled to anchor end 486-2*a* of support component 486-2 may be between the rotational orientation of the third longitudinal portion of inner eartip body 464 coupled to anchor end 482-3*a* of support component 482-3 and the rotational orientation of the second longitudinal portion of inner eartip body 464 coupled to anchor end 482-2*a* of support component 482-2, the rotational orientation (e.g., about the longitudinal Z-axis of inner eartip space 465) of the eleventh longitudinal portion of inner eartip body 464 coupled to anchor end 486-3***a* of support component 486-3 may be between the rotational orientation of the second longitudinal portion of inner eartip body 464 coupled to anchor end 482-2*a* of support component 482-2 and the rotational orientation of the fourth longitudinal portion of inner eartip body 464 coupled to anchor end 482-4*a* of support component 482-4, and the rotational orientation (e.g., about the longitudinal Z-axis of inner eartip space 465) of the twelfth longitudinal portion of inner eartip body 464 coupled to anchor end 486-4*a* of support component 486-4 may be between the rotational orientation of the fourth longitudinal portion of inner eartip body 464 coupled to anchor end 482-4*a* of support component 482-4 and the rotational orientation of the first longitudinal portion of inner eartip body 464 coupled to anchor end 482-1*a* of support component 482-1.

The rigidities (e.g., flexibilities) of any two such rotationally offset support components may differ or be the same. For example, just like flap portion 482-1*f* of support component 482-1 may extend about the Z-axis in a counter-clockwise direction with a contour similar to that of an adjacent portion of outer eartip interior surface 471, a flap portion 486-1*f* of support component 486-1 may extend about the Z-axis in a counter-clockwise direction with a contour similar to that of an adjacent portion of outer eartip interior surface 471, despite support component 482-1 and support component 486-1 having offset rotational orientations (e.g., 450 rotational orientation offset). As another example, just like flap portion 482-1*f* of support component 482-1 may extend about the Z-axis in a counter-clockwise direction with a contour similar to that of an adjacent portion of outer eartip interior surface 471, a flap portion 486-2*f* of support component 486-2 may extend about the Z-axis in a counter-clockwise direction with a contour similar to that of an adjacent portion of outer eartip interior surface 471, despite support component 482-1 and support component 486-2 having offset rotational orientations (e.g., 450 rotational orientation offset). As yet another example, just like flap portion 482-4*f* of support component 482-4 may extend about the Z-axis in a counter-clockwise direction with a contour similar to that of an adjacent portion of outer eartip interior surface 471, a flap portion 486-3*f* of support component 486-3 may extend about the Z-axis in a counter-clockwise direction with a contour similar to that of an adjacent portion of outer eartip interior surface 471, despite support component 482-4 and support component 486-3 having offset rotational orientations (e.g., 45° rotational orientation offset). As yet another example, just like flap portion 482-4*f* of support component 482-4 may extend about the Z-axis in a counter-clockwise direction with a contour similar to that of an adjacent portion of outer eartip interior surface 471, a flap portion 486-4*f* of support component 486-4 may extend about the Z-axis in a counter-clockwise direction with a contour similar to that of an adjacent portion of outer eartip interior surface 471, despite support component 482-4 and support component 486-4 having offset rotational orientations (e.g., 45' rotational orientation offset). The geometries of the flaps of any two such rotationally offset support components may differ or be the same. For example, although each one of flap portions 482-1*f*, 482-2*f*, 482-3*f*, and 482-4*f* may have a consistent width (e.g., width 482-2*fd* of flap portion 482-2*f* may be the same along the entire length of flap portion 482-2*f* as it extends away from end 482-2*e*, as shown in FIG. 14), the width of a flap portion of a rotationally offset support component may have a variable width (e.g., width 486-2*fd* of flap portion 486-2*f* may grow along the entire length of flap portion 486-2*f* as it extends away from end 486-2*e*, as shown in FIG. 16).

Different support bodies of different support components of a particular eartip internal support feature of an eartip subassembly may be oriented rotationally offset from one another (e.g., in a single cross-sectional plane transverse to a longitudinal axis of the eartip subassembly), which may be operative to provide variable effective surface stiffness to an outer eartip body of the eartip subassembly about a particular perimeter portion of the outer eartip body within a particular transaxial plane of the eartip subassembly. Alternatively or additionally, a support body of a support component of a first eartip internal support feature of a particular outer eartip internal support subsystem of an eartip subassembly may be oriented rotationally offset from a support body of a support component of a second eartip internal support feature of the same particular outer eartip internal support subsystem of the eartip subassembly (e.g., in respective longitudinally spaced parallel cross-sectional planes that are transverse to a longitudinal axis of the eartip subassembly), which may be operative to provide variable effective surface stiffness to an outer eartip body of the eartip subassembly along a particular perimeter portion of the outer eartip body within a particular longitudinal plane of the eartip subassembly. For example, as shown in FIGS. 13-16, not only may different support bodies 482-1*b*, 482-2*b*, 482-3*b*, and 482-4*b* (or free ends) of respective different support components 482-1, 482-2, 482-3, and 482-4 of eartip internal support feature 481 of eartip subassembly 480 be oriented rotationally offset from one another (e.g., generally by 90° between support bodies 482-1*b* and 482-3*b*, another 90° between support bodies 482-3*b* and 482-2*b*, another 90° between support bodies 482-2*b* and 482-4*b*, and another 90° between support bodies 482-4*b* and 482-1*b* as rotating clockwise in FIG. 14 about a longitudinal axis Z in a single cross-sectional plane transverse to that longitudinal axis), but also support body 482-1*b* of support component 482-1 of eartip internal support feature 481 of outer eartip internal support subsystem 480 of eartip subassembly 450 may be oriented rotationally offset from support body 486-1*b* of support component 486-1 of eartip internal support feature 485 of that same outer eartip internal support subsystem 480 of eartip subassembly 450 (e.g., generally by 45° as rotating counter-clockwise about a longitudinal axis Z in respective longitudinally spaced parallel cross-sectional planes of FIGS. 14 and 16 that are transverse to that longitudinal axis). Therefore, various support components of outer eartip internal support subsystem 480 may be operative to provide variable effective surface stiffness to outer eartip body 474 of eartip subassembly 450 about a particular perimeter portion of outer eartip body 474 within a particular transaxial plane of eartip subassembly 450 (e.g., in the plane of FIG. 14 and/or in the plane of FIG. 16) and/or along a particular perimeter portion of outer eartip body 474 within a particular longitudinal plane of eartip subassembly 450 (e.g., in the plane of FIG. 13).

Different flap portions of different support components of a particular eartip internal support feature of an eartip subassembly may extend in different directions from one another (e.g., in a single cross-sectional plane transverse to a longitudinal axis of the eartip subassembly), which may be operative to provide variable effective surface stiffness to an outer eartip body of the eartip subassembly about a particular perimeter portion of the outer eartip body within a particular transaxial plane of the eartip subassembly. Alternatively or additionally, a flap portion of a support component of a first eartip internal support feature of a particular outer eartip internal support subsystem of an eartip subassembly may extend in a different direction than a flap portion of a support component of a second eartip internal support feature of the same particular outer eartip internal support subsystem of the eartip subassembly (e.g., in respective longitudinally spaced parallel cross-sectional planes that are transverse to a longitudinal axis of the eartip subassembly), which may be operative to provide variable effective surface stiffness to an outer eartip body of the eartip subassembly along a particular perimeter portion of the outer eartip body within a particular longitudinal plane of the eartip subassembly. For example, as shown in FIGS. 13-16, not only may different flap portions **484-1*f* and 484-4*f* of respective different support components 484-*i* and 484-4 of eartip internal support feature 483 of eartip subassembly 480 extend in different directions from one another (e.g., as shown by FIG. 1.5 with respect to a longitudinal axis Z in a single cross-sectional plane transverse to that longitudinal axis, flap portion 484-1*f* may extend generally clockwise away from end 484-1*e* about axis Z while flap portion 484-4*f* may extend generally counter-clockwise away from end 484-4*e* about axis Z), but also flap portion 482-1*f* of support component 482-1 of eartip internal support feature 481 of outer eartip internal support subsystem 480 of eartip subassembly 450 may extend in a different direction than flap portion 484-1*f* of support component 484-1 of eartip internal support feature 483 of that same outer eartip internal support subsystem 480 of eartip subassembly 450 (e.g., with respect to a longitudinal axis Z in respective longitudinally spaced parallel cross-sectional planes of FIGS. 14 and 15 that are transverse to that longitudinal axis, flap portion 482-1*f* may extend generally counter-clockwise away from end 482-1*e* about axis Z while flap portion 484-1*f* may extend generally clockwise away from end 484-1*e* about axis Z). Therefore, various flap portions of various support components of outer eartip internal support subsystem 480 may be operative to provide variable effective surface stiffness to outer eartip body 474 of eartip subassembly 450 about a particular perimeter portion of outer eartip body 474 within a particular transaxial plane of eartip subassembly 450 (e.g., in the plane of FIG. 15) and/or along a particular perimeter portion of outer eartip body 474 within a particular longitudinal plane of eartip subassembly 450 (e.g., in the plane of FIG. 13**).

FIGS. 17-20

FIGS. 17-20 show another illustrative earpiece 520, which may be similar to earpiece 120 of FIGS. 1-4 but may include an outer eartip internal support subsystem with one or more support components extending away from an exterior surface of an inner eartip body spiraling about and along a longitudinal length of the inner eartip body for varying the effective rigidity of an exterior surface of an outer eartip body to affect the ability of the outer eartip body to conform to various ear canal geometries. Earpiece 520 of FIGS. 17-20 may include similar components to earpiece 120 of FIGS. 1-4, where elements of earpiece 520 of FIGS. 17-20 being labeled with "5xx" reference labels may correspond to the "1xx" reference labels of the labeled elements of earpiece 120 of FIGS. 1-4, and where differences therebetween may be described below. As shown, earpiece 520 may include an eartip subassembly 550 that may include an inner eartip portion 560 and an outer eartip portion 570 coupled to inner eartip portion 560 at interface 555. Inner eartip portion 560 may include an inner eartip body 564 that may extend between an inner eartip back end 562 and an inner eartip front end 568, where both an inner eartip interior surface 561 of inner eartip body 564 and an opposite inner eartip exterior surface 569 of inner eartip body 564 may extend between inner eartip back end 562 and inner eartip front end 568, and where an inner eartip space 565 may be defined by inner eartip interior surface 561 and may extend between an inner eartip back opening 563 that may be provided through inner eartip back end 562 and an inner eartip front opening 567 that may be provided through inner eartip front end 568. Outer eartip portion 570 may include an outer eartip body 574 that may extend between an outer eartip back end 572 and an outer eartip front end 578, where both an outer eartip interior surface 571 of outer eartip body 574 and an opposite outer eartip exterior surface 579 of outer eartip body 574 may extend between outer eartip back end 572 and outer eartip front end 578, and where an outer eartip space 575 may be defined by outer eartip interior surface 571 (e.g., one portion of space 575 may be defined between outer eartip interior surface 571 and inner eartip exterior surface 569 when at least a portion of inner eartip body 564 is positioned between portions of outer eartip interior surface 571, and another portion of space 575 may be occupied by inner eartip body 564 and inner eartip space 565) and may extend between outer eartip back end 572 and outer eartip front end 578, while an outer eartip back opening 573 may be provided through outer eartip back end 572 and an outer eartip front opening 577 may be provided through outer eartip front end 578. Although not shown, earpiece 520 may include any suitable inner eartip internal support system, such as inner eartip internal support system 166 of eartip subassembly 150. Alternatively, as shown, earpiece 520 may include inner eartip internal support system 266 of eartip subassembly 250. Moreover, earpiece 520 may be coupled to any suitable housing subassembly 530 and any suitable sound emitting subassembly 540 in any suitable manner for providing earpiece 520 for any suitable headphone assembly.

Eartip subassembly 550 may include an outer eartip internal support subsystem 580 that may be operative to vary the ability of outer eartip exterior surface 579 to conform to various ear canal geometries for improving the ability of eartip subassembly 550 to create an effective acoustic seal and/or to provide comfort to the user. Outer eartip internal support subsystem 580 may be operative to vary the effective surface stiffness of eartip exterior surface 579 along a length of eartip exterior surface 579 (e.g., from outer eartip front end 578 to outer eartip back end 572) and/or about a perimeter of eartip exterior surface 579 (e.g., about at least a portion of the path of sound S (e.g., about the Z-axis in an X-Y plane)). Outer eartip internal support subsystem 580 may include one or more eartip internal support features (e.g., eartip internal support feature 581), each of which may include one or more support components that may extend from inner eartip exterior surface 569 in a spiral fashion about and along at least a portion of a length of inner eartip exterior surface 569 (e.g., about and along at least a portion of a longitudinal axis of inner eartip space 565) at a first end towards a second end that may be coupled to or contact or lie proximal to a portion of outer eartip interior surface 571 (e.g., as a spiral-shaped support component).

As shown in FIGS. 17-20, outer eartip internal support subsystem 580 may include an outer eartip internal support feature 581 that may extend from inner eartip exterior surface 569 towards outer eartip interior surface 571 (e.g., through a portion of outer eartip space 575). For example, outer eartip internal support feature 581 may include one or more spiral-shaped support components, such as a first spiral-shaped support component 582-1 with a support body

582-1_b_ that may extend out from a first end 582-1_ba_ that may be coupled to or integrated with inner eartip exterior surface 569 along and about a first portion of inner eartip body 564 (e.g., in a spiral path or as a helix, such as along a Z-axis and about a portion of inner eartip space 565 (e.g., about the Z-axis)) and to a second end 582-1_be_ that may be interfaced with (e.g., coupled to or integrated with or at least proximately facing) an interface portion of outer eartip interior surface 571, which may define a spiral with respect to a longitudinal axis of eartip subassembly 550 (e.g., a spiral along and about a first portion of outer eartip body 574 (e.g., in a spiral path or as a helix, such as along a Z-axis and about a portion of inner eartip space 565 (e.g., about the Z-axis)), a second spiral-shaped support component 582-2 with a support body 582-2_b_ that may extend out from a first end 582-2_ba_ that may be coupled to or integrated with inner eartip exterior surface 569 along and about a second portion of inner eartip body 564 (e.g., in a spiral path or as a helix, such as along a Z-axis and about a portion of inner eartip space 565 (e.g., about the Z-axis)) and to a second end 582-2_be_ that may be interfaced with (e.g., coupled to or integrated with or at least proximately facing) an interface portion of outer eartip interior surface 571, which may define a spiral with respect to a longitudinal axis of eartip subassembly 550 (e.g., a spiral along and about a second portion of outer eartip body 574 (e.g., in a spiral path or as a helix, such as along a Z-axis and about a portion of inner eartip space 565 (e.g., about the Z-axis)), a third spiral-shaped support component 582-3 with a support body 582-3_b_ that may extend out from a first end 582-3_ba_ that may be coupled to or integrated with inner eartip exterior surface 569 along and about a third portion of inner eartip body 564 (e.g., in a spiral path or as a helix, such as along a Z-axis and about a portion of inner eartip space 565 (e.g., about the Z-axis)) and to a second end 582-3_be_ that may be interfaced with (e.g., coupled to or integrated with or at least proximately facing) an interface portion of outer eartip interior surface 571, which may define a spiral with respect to a longitudinal axis of eartip subassembly 550 (e.g., a spiral along and about a third portion of outer eartip body 574 (e.g., in a spiral path or as a helix, such as along a Z-axis and about a portion of inner eartip space 565 (e.g., about the Z-axis)), and a fourth spiral-shaped support component 582-4 with a support body 582-4_b_ that may extend out from a first end 582-4_ba_ that may be coupled to or integrated with inner eartip exterior surface 569 along and about a fourth portion of inner eartip body 564 (e.g., in a spiral path or as a helix, such as along a Z-axis and about a portion of inner eartip space 565 (e.g., about the Z-axis)) and to a second end 582-4_be_ that may be interfaced with (e.g., coupled to or integrated with or at least proximately facing) an interface portion of outer eartip interior surface 571, which may define a spiral with respect to a longitudinal axis of eartip subassembly 550 (e.g., a spiral along and about a fourth portion of outer eartip body 574 (e.g., in a spiral path or as a helix, such as along a Z-axis and about a portion of inner eartip space 565 (e.g., about the Z-axis)).

Figure 19:
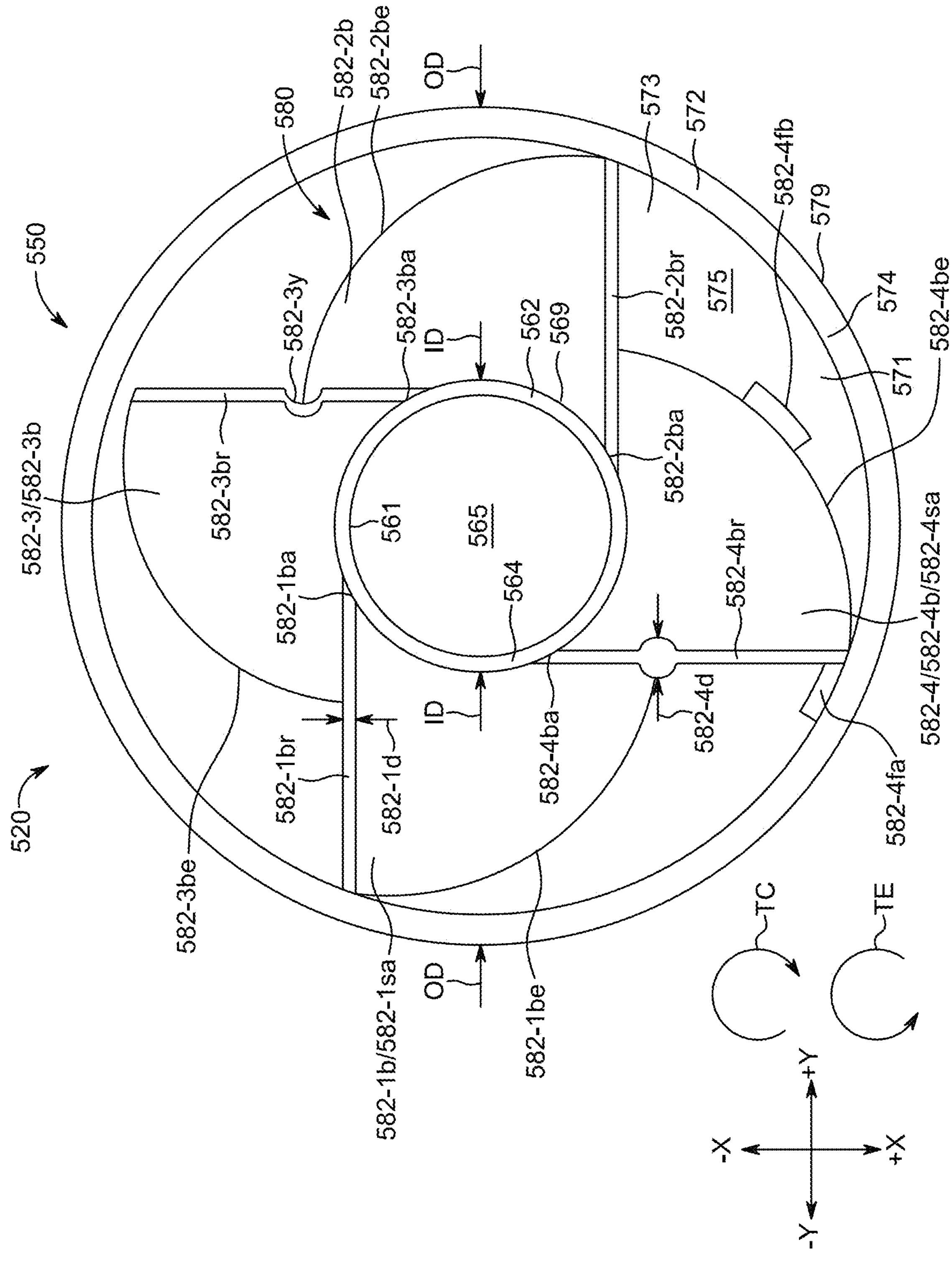
FIG. 19 is a bottom elevational view of the earpiece of FIGS. 17 and 18, taken from line XIX-XIX of FIG. 18.
Figure 20:
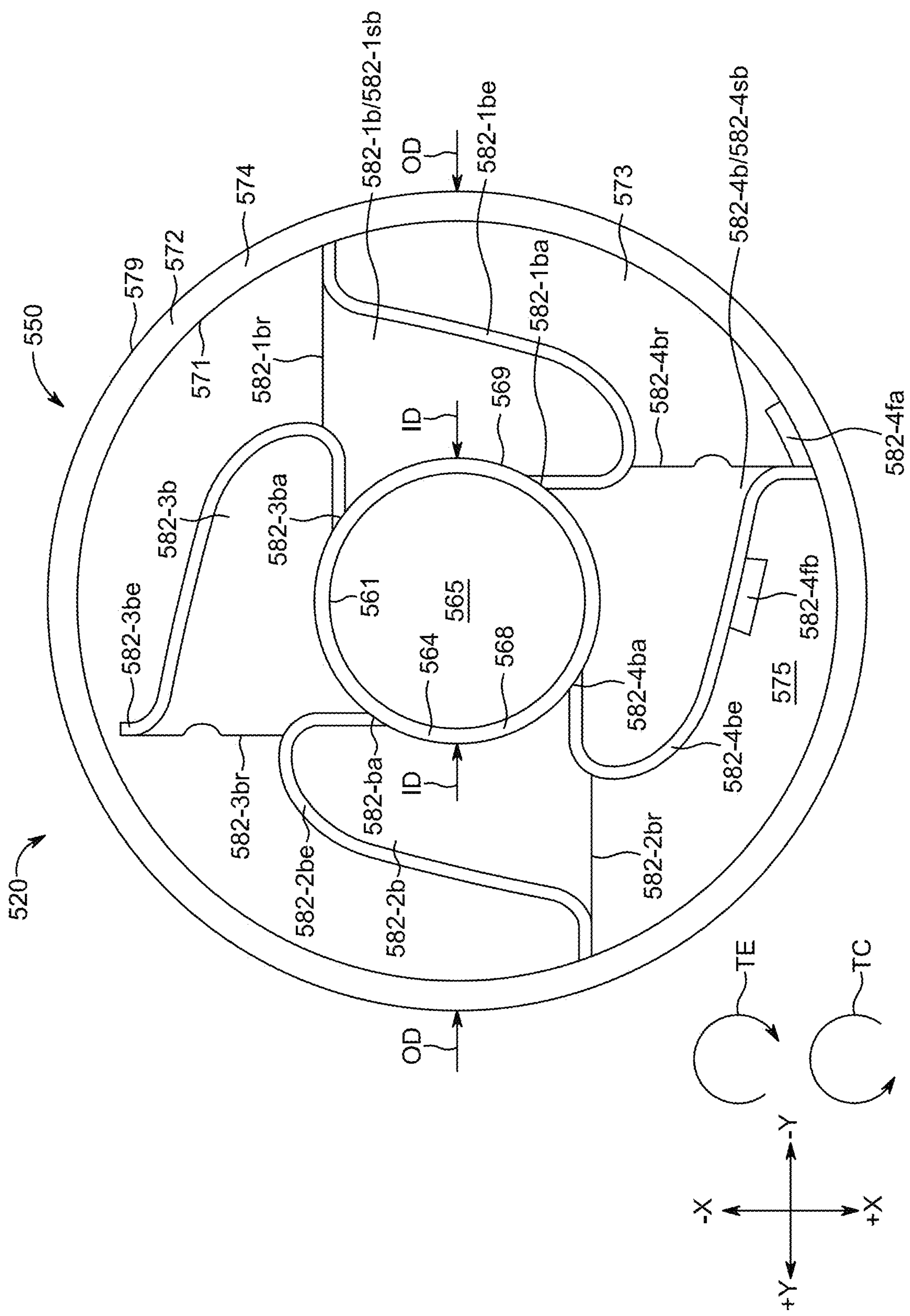
FIG. 20 is a top elevational view of the earpiece of FIGS. 17-19, taken from line XX-XX of FIG. 18, but with only a back end of an outer eartip portion shown.
Figure 21:
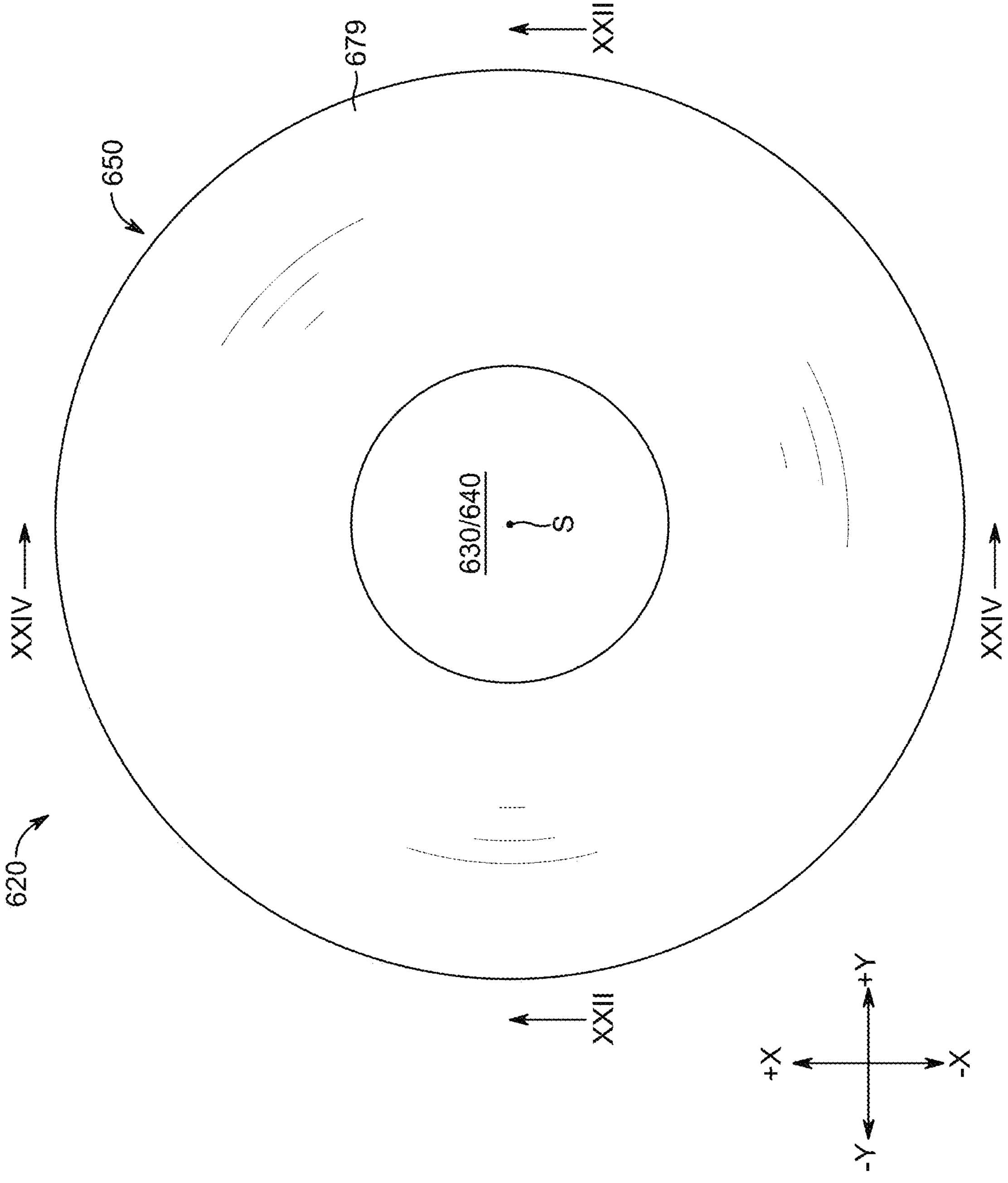
FIG. 21 is a top elevational view of yet another illustrative earpiece with internal support components.

The geometries of different support bodies of eartip internal support feature 581 may be the same or may vary in any suitable way. The depth of a support body may be consistent or may vary in any suitable manner along the support body. For example, as shown, depth 582-1_d_ of support body 582-1_b_ of support component 582-1 between opposite surfaces 582-1_sa_ and 582-1_sb_ of support body 582-1_b_ may be consistent along its entirety (e.g., between end 582-1_ba_ and end 582-_be_), while depth 582-4_d_ of support body 582-4_b_ of support component 582-4 between opposite surfaces 582-4_sa_ and 582-4_sb_ of support body 582-4_b_ may vary along at least a portion of support body 582-4_b_ (e.g., between end 582-4_ba_ and end 582-4_be_). The height of each support body may be the same or may vary between support bodies. For example, the height of first support body 582-1_b_ may be configured to span the entirety or substantially the entirety of the height of eartip subassembly 350 (e.g., such that a front portion of first end 582-1_ba_ may be at inner eartip front end 568 and/or a front portion of second end 582-_ibe_ may be at outer eartip front end 578, and such that a back portion of first end 582-1_ba_ may be at inner eartip back end 562 and/or a back portion of second end 582-1 be may be at outer eartip back end 572), while the height of third support body 582-3_b_ may be configured to span only a specific portion of the entirety of the height of eartip subassembly 350 (e.g., such that a front portion of first end 582-3_ba_ may be positioned downwardly (e.g., in the −Z direction) from inner eartip front end 568 and/or a front portion of first end 582-3_be_ may positioned downwardly from outer eartip front end 578, and/or such that a back portion of first end 582-3_ba_ may be positioned upwardly (e.g., in the ±Z direction) from inner eartip back end 562 and/or a back portion of second end 582-3_be_ may be positioned upwardly from outer eartip back end 572 (e.g., as shown in FIGS. 19 and 20)).

Different support components of outer eartip internal support feature 581 may be configured with different geometries for deforming in different manners (e.g., in response to pressure being exerted thereon by outer eartip interior surface 571 in response to outer eartip exterior surface 579 being deformed by an external force of a user). For example, as shown in FIGS. 19 and 20, the geometry of support body 582-3_b_ of third support component 582-3 in a default configuration may include one or more flexibility features 582-3_y_ that may be operative to provide additional flexibility to support body 582-3_b_. As just one example, a flexibility feature 582-3_y_ may be operative to make the length of a back surface 582-3_br_ of support body 582-3_b_ longer than the distance between ends 582-3_ba_ and 582-3_be_ defining that back surface 582-3_br_ in the default configuration of support body 582-3_b_, such that support body 582-3_b_ may be operative to flex more easily at such a flexibility feature 582-3_y_ (e.g., for increasing or decreasing the distance between ends 582-3_ba_ and 582-3_be_ defining that back surface 582-3_br_ when support body 582-3_b_ may be deformed in any suitable manner). One or more local cuts, holes, pockets, or reduced thickness portions may be provided along any suitable portion or portions of a support body to vary the flexibility of the support body. Additionally or alternatively, a tapering wall section, a constant thickness section of a varying shape along its length or width (e.g., adding an S-shape or the like within a plane of the body), varying the size of a coupling between a support body at an anchor end and an eartip body, varying the degree and/or angle of the rotation, spiral, or twist, varying the rate of the rotation, spiral, or twist along its length (i.e., along the Z-axis), or the like may be utilized to vary the flexibility of a support body.

Any suitable relationships between different spiral-shaped support components of outer eartip internal support feature 581 may exist. For example, any suitable number of spiral-shaped support components may be provided by outer eartip internal support feature 581 (e.g., four spiral-shaped support components as may be shown in FIGS. 18-20 or more or fewer than four). As another example, the amount at which any one of the spiral-shaped support components twists about a longitudinal axis may be any suitable amount (e.g., about 45°, about 90° (e.g., as may be shown for each one of the spiral-shaped support components of FIGS. 18-20, although different components may twist in different amounts), about 180°, about 360°, or more than 360°). As yet another example, the direction in which any one of the spiral-shaped support components twists about a longitudinal axis may be any suitable direction (e.g., clockwise or counter-clockwise (e.g., as may be shown for each one of the spiral-shaped support components of FIGS. 18-20 with respect to the line of site of FIG. 20, although different components may twist in different directions)). As yet another example, the rotational offset between any two of the spiral-shaped support components, such as at their back surfaces (and/or at their front surfaces), may be any suitable offset (e.g., about 15°, about 4.5°, about 90° (e.g., as may be shown between back surface 582-1*br* of support body 582-1*b* and back surface 582-3*br* of support body 582-3*b*, between back surface 582-1*br* of support body 582-1*b* and back surface 582-4*br* of support body 582-4*b*, and between back surface 582-2*br* of support body 582-2*b* and back surface 582-3*br* of support body 582-3*b* in FIG. 19, although any two components may be oriented rotationally offset from one another in any suitable manner), about 135°, about 180°, and the like). As yet another example, the manner in which a support body of outer eartip internal support feature 581 may extend from a curve of inner eartip exterior surface 569 may be any suitable manner (e.g., tangentially (e.g., as may be shown by each support body of FIGS. 19 and 20, for example, where back surface 582-1*br* of support body 582-1*b* may extend tangentially from curved inner eartip exterior surface 569 and/or where end 582-1*be* may extend tangentially from the curved inner eartip exterior surface 569) or as a secant (e.g., as may be shown by support body 384-1*b* extending from curved inner eartip exterior surface 369 of FIG. 10)).

The particular embodiment of outer eartip internal support feature 581 shown in FIGS. 17-20 may have four support components with four spiral-shaped support bodies, where all of the four spiral-shaped support bodies may twist in the same direction about a longitudinal axis Z by 90° (e.g., the amount by which second end 582-1*be* may twist about axis Z (e.g., as second end 582-1*be* may extend from a front of first end 582-1*ba* (e.g., at or proximal to front end 568 of inner eartip body 564 at inner eartip exterior surface 569 and at or proximal to front end 578 of outer eartip body 574 at outer eartip interior surface 571) to back surface 582-1*br* (e.g., at or proximal to back end 578 of outer eartip body 574 at outer eartip interior surface 571))), and where each of the four spiral-shaped support bodies may be oriented rotationally offset from two other ones of the four spiral-shaped support bodies by 90°, such that no gap may exist along eartip subassembly 550 between any two spiral-shaped support bodies (e.g., the combination of spiral-shaped support bodies may span the full exterior circumference of inner eartip exterior surface 569 about axis Z). Similarly, if there were six spiral-shaped support bodies where each one was twisting in the same direction about a longitudinal axis Z by 60° and where each one was oriented rotationally offset from two other ones by 60°, no gap may exist. Alternatively, the number, rotation direction, twist amount, and/or rotational offset amount of spiral-shaped components may be such that a gap may exist.

Each spiral-shaped support component of outer eartip internal support feature 581 may be coupled to inner eartip body 564 and/or outer eartip body 574 in any suitable manner. In some embodiments, only one portion of a support body of a support component may be coupled to one of inner eartip body 564 and outer eartip body 574 and no portion of that support body may be coupled to the other one of inner eartip body 564 and outer eartip body 574 but instead may simply face or be proximate thereto for contact during certain deformation of eartip subassembly 550. However, in other embodiments, as shown in FIGS. 17-20, at least two portions of a first end of each spiral-shaped support component may be coupled to different portions of inner eartip body 564 and at least two portions of a second end of each spiral-shaped support component may be coupled to different portions of outer eartip body 574. For example, a front portion of first end 582-1*ba* of first support component 582-1 may be coupled to a front portion of inner eartip body 564 at inner eartip exterior surface 569 at or near inner eartip front end 568, a front portion of second end 582-1*be* of first support component 582-1 (e.g., proximal to front portion of first end 582-1*ba*) may be coupled to a front portion of outer eartip body 574 at outer eartip interior surface 571 at or near outer eartip front end 578, a rear portion of first end 582-1*ba* of first support component 582-1 may be coupled to a rear portion of inner eartip body 564 at inner eartip exterior surface 569 at or near inner eartip rear end 562, and a rear portion of second end 582-1*be* of first support component 582-1 (e.g., proximal to back surface 582-1*br* of first support component 582-1) may be coupled to a rear portion of outer eartip body 574 at outer eartip interior surface 571 at or near outer eartip rear end 572, such that different ends of support body 582-1*b* of first support component 582-1 may be coupled to both inner eartip body 564 and outer eartip body 574. Moreover, a front portion of first end 582-2*ba* of second support component 582-2 may be coupled to a front portion of inner eartip body 564 at inner eartip exterior surface 569 at or near inner eartip front end 568, a front portion of second end 582-2*be* of second support component 582-2 (e.g., proximal to front portion of first end 582-2*ba*) may be coupled to a front portion of outer eartip body 574 at outer eartip interior surface 571 at or near outer eartip front end 578, a rear portion of first end 582-2*ba* of second support component 582-2 may be coupled to a rear portion of inner eartip body 564 at inner eartip exterior surface 569 at or near inner eartip rear end 562, and a rear portion of second end 582-2*be* of second support component 582-2 (e.g., proximal to back surface 582-2*br* of first support component 582-2) may be coupled to a rear portion of outer eartip body 574 at outer eartip interior surface 571 at or near outer eartip rear end 572, such that different ends of support body 582-2*b* of second support component 582-2 may be coupled to both inner eartip body 564 and outer eartip body 574. Moreover, a front portion of first end 582-3*ba* of third support component 582-3 may be coupled to a front portion of inner eartip body 564 at inner eartip exterior surface 569 at or near inner eartip front end 568, a front portion of second end 582-3*be* of third support component 582-3 (e.g., proximal to front portion of first end 582-3*ba*) may be coupled to a front portion of outer eartip body 574 at outer eartip interior surface 571 at or near outer eartip front end 578, a rear portion of first end 582-3*ba* of third support component 582-3 may be coupled to a rear portion of inner eartip body 564 at inner eartip exterior surface 569 at or near inner eartip rear end 562, and a rear portion of second end 582-3*be* of third support component 582-3 (e.g., proximal to back surface 582-3*br* of third support component 582-3) may be coupled to a rear portion of outer eartip body 574 at outer eartip interior surface 571 at or near outer eartip rear end 572, such that different ends of support body 582-3*b* of third support component 582-3 may be coupled to both inner eartip body 564 and outer eartip body 574. Moreover, a front portion of first end 582-3*ba* of fourth support component

582-4 may be coupled to a front portion of inner eartip body 564 at inner eartip exterior surface 569 at or near inner eartip front end 568, a front portion of second end 582-4*be* of fourth support component 582-4 (e.g., proximal to front portion of first end 582-4*ba*) may be coupled to a front portion of outer eartip body 574 at outer eartip interior surface 571 at or near outer eartip front end 578, a rear portion of first end 582-4*ba* of fourth support component 582-4 may be coupled to a rear portion of inner eartip body 564 at inner eartip exterior surface 569 at or near inner eartip rear end 562, and a rear portion of second end 582-4*be* of fourth support component 582-4 (e.g., proximal to back surface 582-4*br* of fourth support component 582-4) may be coupled to a rear portion of outer eartip body 574 at outer eartip interior surface 571 at or near outer eartip rear end 572, such that different ends of support body 582-4*b* of fourth support component 582-4 may be coupled to both inner eartip body 564 and outer eartip body 574.

Such coupling of different ends of each support body of each support component of outer eartip internal support feature 581 of outer eartip internal support subsystem 580 to both inner eartip body 564 and outer eartip body 574 may enable a user to twist eartip subassembly 550 (e.g., with respect to a housing subassembly and/or a sound emitting subassembly of a headphone assembly including eartip subassembly 550) for contracting or expanding the size (e.g., a cross-sectional area) of eartip subassembly 550 for enabling easier insertion into and/or removal from a user's ear canal of eartip subassembly 550 while also enabling eartip subassembly 550 to form an acoustic seal with the user's ear canal. Inner eartip portion 560 may be twisted with respect to outer eartip portion 570 (or vice versa) before, after, or while earpiece 520 is inserted into a user's ear. For example, such twisting of eartip subassembly 550 in a first direction about longitudinal axis Z (e.g., in the same direction with which the spiral-shaped support components of spring component 266*s* may twist about axis Z in the default configuration (e.g., the direction of arrow TC of FIGS. 19 and 20 and/or the arrow D of FIG. 6)) may be operative to contract or tighten the circumference or cross-sectional area of any suitable portion(s) of eartip subassembly 550 (e.g., to contract the inner cross-sectional area or diameter SD of spring support component 266*s* from its default configuration (e.g., to any inner cross-sectional area or diameter that may or may not be less than the minimum cross-sectional dimensions that spring support component 266*s* may be configured to maintain when only external forces provided by the user's ear canal are exerted on earpiece 520) and/or to contract the inner cross-sectional area or diameter ID of inner eartip space 565 from its default configuration and/or to contract the inner cross-sectional area or diameter OD of outer eartip space 575 from its default configuration), which may enable a user to insert eartip subassembly 550 into a user's ear canal more easily and/or to remove eartip subassembly 550 from a user's ear canal more easily. Additionally or alternatively, such twisting of eartip subassembly 550 in a second direction about longitudinal axis Z (e.g., in a direction opposite to the direction with which the spiral-shaped support components of spring component 266*s* may twist about axis Z in the default configuration (e.g., the direction of arrow TE of FIGS. 19 and 20)) may be operative to expand or loosen the circumference or cross-sectional area of any suitable portion(s) of eartip subassembly 550 (e.g., to expand the inner cross-sectional area or diameter SD of spring support component 266*s* from a contracted configuration to its default configuration and/or to expand the inner cross-sectional area or diameter ID of inner eartip space 565 from a contracted configuration to its default configuration and/or to expand the inner cross-sectional area or diameter OD of outer eartip space 575 from a contracted configuration to its default configuration), which may enable a user to expand eartip subassembly 550 once eartip subassembly 550 has been inserted into a user's ear canal for creating an acoustic seal therein. Therefore, spring support component 266*s* may be configured such that the inner cross-sectional area or diameter SD of spring support component 266*s* may not only be contracted (e.g., from its default configuration) to a first contracted configuration when deformed by first forces exerted on eartip subassembly 550 through active user manipulation (e.g., when twisted by a user's hand(s)) for easier insertion into or removal from an ear canal but may also be contracted (e.g., from its default configuration) to a second contracted configuration when deformed by forces exerted on eartip subassembly 550 by the surfaces of a user's ear canal. Such a first contracted configuration may provide a smaller inner cross-sectional area or diameter SD than the inner cross-sectional area or diameter SD of the second contracted configuration, such that the inner cross-sectional area or diameter SD of the second contracted configuration may be no smaller than the inner cross-sectional area or diameter SD that may ensure at least the minimum inner cross-sectional area or diameter ID of inner eartip space 565 for enabling an effective (e.g., non-distorting or non-blocking) sound path for sound S through inner eartip space 565, yet such that the inner cross-sectional area or diameter SD of the first contracted configuration may be small enough to enable comfortable insertion into or removal from the ear canal of eartip subassembly 550.

As shown, earpiece 520 may include inner eartip internal support system 266 of eartip subassembly 250, which may be operative to couple eartip subassembly 550 to housing subassembly 530 and/or sound emitting subassembly 540. When a twisting reference component (e.g., any suitable portion of housing subassembly 530 and/or any suitable portion of sound emitting subassembly 540) is coupled to eartip subassembly 550 (e.g., to inner eartip body 564) using inner eartip internal support system 266 at least partially with spring support component 266*s*, and then a user twists eartip subassembly 550 with respect to such a twisting reference component for contracting or expanding the size of eartip subassembly 550, the size of spring support component 266*s* may likewise be contracted or expanded (e.g., to contract the inner cross-sectional area or diameter SD of spring support component 266*s* from its default configuration or to expand the inner cross-sectional area or diameter SD of spring support component 266*s* from a contracted configuration to its default configuration), which may further enable a user to insert eartip subassembly 550 into a user's ear canal more easily and/or to remove eartip subassembly 550 from a user's ear canal more easily.

Although not shown, in some embodiments, if each one of a pair of two earpieces of a headset assembly is provided with an eartip subassembly similar to eartip subassembly 550, certain directions associated with the eartip subassembly for a first earpiece of such a particular pair (e.g., the directions with which spiral-shaped support components twist with respect to an inner eartip body, the direction with which a spring support component spirals through an inner eartip body, and/or the directions of arrows TC and TE with respect to a longitudinal axis for respectively collapsing and expanding the eartip subassembly) may be reversed for the eartip subassembly for the second earpiece of that particular pair, such that a user may more easily expand or contract both eartip subassemblies at the same time during use (e.g., forwardly twisting both the left and right eartip subassemblies from the point of view of the user may be operative to expand the eartip subassemblies of both earpieces rather than to expand one and to contract the other). Additionally or alternatively, it is to be understood that any one or more of the support components of outer eartip internal support feature 581 of outer eartip internal support subsystem 580 may include one or more suitable flap portions, as described with respect to flap portions of FIGS. 7-16. For example, as shown in FIG. 20, support component 582-4 may include a flap portion 582-4*fa* that may extend from body 582-4*b* (e.g., along at least a portion of outer eartip interior surface 571 adjacent outer eartip back end 572), and/or support component 582-4 may include a flap portion 582-4*fb* that may extend from body 582-4*b* (e.g., in a spiral along and about at least a portion of outer eartip interior surface 571). Additionally or alternatively, although not shown in FIGS. 17-20, it is to be understood that outer eartip internal support subsystem 580 may include one or more additional outer eartip internal support features along with outer eartip internal support feature 581 (e.g., a second outer eartip internal support feature positioned longitudinally above or below outer eartip internal support feature 581 along and about inner eartip body 564, such as an additional outer eartip internal support feature with one or more additional spiral-shaped support components that may have any suitable geometries or orientations or twisting directions that may be the same as or different than that of the spiral-shaped support components of outer eartip internal support feature 581).

FIGS. 21-25

FIGS. 21-25 show another illustrative earpiece 620, which may be similar to earpiece 120 of FIGS. 1-4 but may include an outer eartip internal support subsystem with one or more support components that may extend inwardly from an interior surface of an outer eartip body for varying the effective rigidity of an exterior surface of the outer eartip body to affect the ability of the outer eartip body to conform to various ear canal geometries. Earpiece 620 of FIGS. 21-25 may include similar components to earpiece 120 of FIGS. 1-4, where elements of earpiece 620 of FIGS. 21-25 being labeled with "6xx" reference labels may correspond to the "1 xx" reference labels of the labeled elements of earpiece 120 of FIGS. 1-4, and where differences therebetween may be described below. As shown, earpiece 620 may include an eartip subassembly 650 that may include an inner eartip portion 660 and an outer eartip portion 670 coupled to inner eartip portion 660 at interface 655. Inner eartip portion 660 may include an inner eartip body 664 that may extend between an inner eartip back end 662 and an inner eartip front end 668, where both an inner eartip interior surface 661 of inner eartip body 664 and an opposite inner eartip exterior surface 669 of inner eartip body 664 may extend between inner eartip back end 662 and inner eartip front end 668, and where an inner eartip space 665 may be defined by inner eartip interior surface 661 and may extend between an inner eartip back opening 663 that may be provided through inner eartip back end 662 and an inner eartip front opening 667 that may be provided through inner eartip front end 668. Outer eartip portion 670 may include an outer eartip body 674 that may extend between an outer eartip back end 672 and an outer eartip front end 678, where both an outer eartip interior surface 671 of outer eartip body 674 and an opposite outer eartip exterior surface 679 of outer eartip body 674 may extend between outer eartip back end 672 and outer eartip front end 678, and where an outer eartip space 675 may be defined by outer eartip interior surface 671 (e.g., one portion of space 675 may be defined between outer eartip interior surface 671 and inner eartip exterior surface 669 when at least a portion of inner eartip body 664 is positioned between portions of outer eartip interior surface 671, and another portion of space 675 may be occupied by inner eartip body 664 and inner eartip space 665) and may extend between outer eartip back end 672 and outer eartip front end 678, while an outer eartip back opening 673 may be provided through outer eartip back end 672 and an outer eartip front opening 677 may be provided through outer eartip front end 678. Earpiece 620 may also include any suitable housing subassembly 630 and any suitable sound emitting subassembly 640 for emitting sound S through inner eartip space 665, one or both of which may be coupled to eartip subassembly 650 in any suitable manner. Although not shown, earpiece 620 may also include any suitable inner eartip internal support system, such as inner eartip internal support system 166 of eartip subassembly 150 or inner eartip internal support system 266 of eartip subassembly 250, which may be operative to couple eartip subassembly 650 to housing subassembly 630 and/or to sound emitting subassembly 640.

Eartip subassembly 650 may include an outer eartip internal support subsystem 680 that may be operative to vary the ability of outer eartip exterior surface 679 to conform to various ear canal geometries for improving the ability of eartip subassembly 650 to create an effective acoustic seal and/or to provide comfort to the user. Outer eartip internal support subsystem 680 may be operative to vary the effective surface stiffness of eartip exterior surface 679 along a length of eartip exterior surface 679 (e.g., from outer eartip front end 678 to outer eartip back end 672) and/or about a perimeter of eartip exterior surface 679 (e.g., about at least a portion of the path of sound S (e.g., about the Z-axis in an X-Y plane)). Outer eartip internal support subsystem 680 may include one or more eartip internal support features (e.g., three eartip internal support features 681, 683, and 685), each of which may include one or more support components that may either be coupled to and extend from inner eartip exterior surface 669 along and/or about a longitudinal length of inner eartip body 664 at an anchor end towards a free end that may contact or lie proximal to a portion of outer eartip interior surface 671 (e.g., as one or more outwardly extending transverse and/or longitudinal and/or spiral support components) or be coupled to and extend from outer eartip interior surface 671 along and/or about a longitudinal length of outer eartip body 674 at an anchor end towards a free end that may contact or lie proximal to a portion of inner eartip exterior surface 669 (e.g., as one or more inwardly extending transverse and/or longitudinal and/or spiral support components). Different eartip internal support features of outer eartip internal support subsystem 680 may be spaced longitudinally from one another along the length of inner eartip body 664 and/or along the length of outer eartip interior surface 671 such that different eartip internal support features may be operative to interact with different portions of outer eartip interior surface 671 along the length of outer eartip portion 670 (e.g., from outer eartip front end 678 to outer eartip back end 672).

Figure 22:
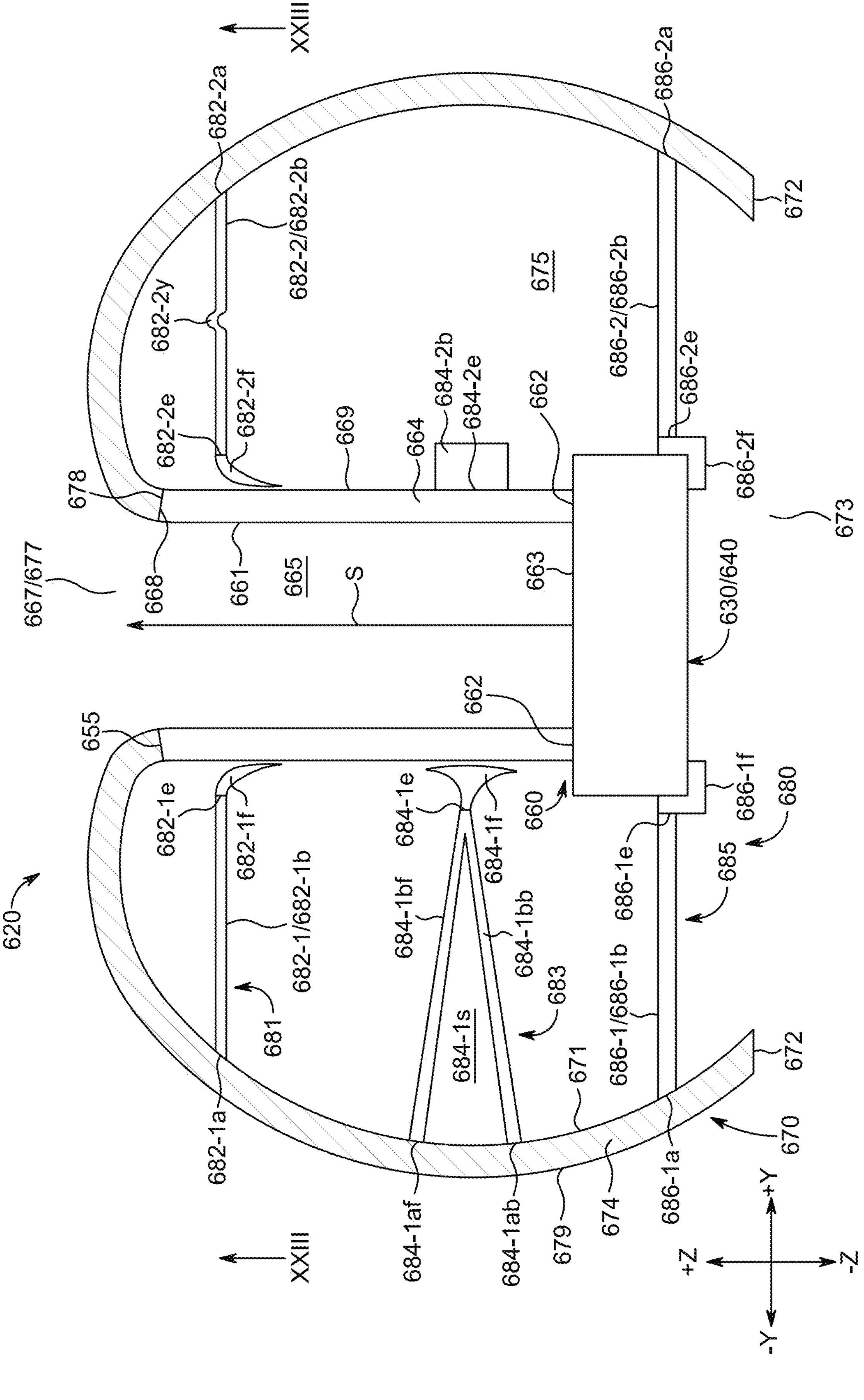
FIG. 22 is a cross-sectional view of the earpiece of FIG. 21, taken from line XXII-XXII of FIG. 21.
Figure 23:
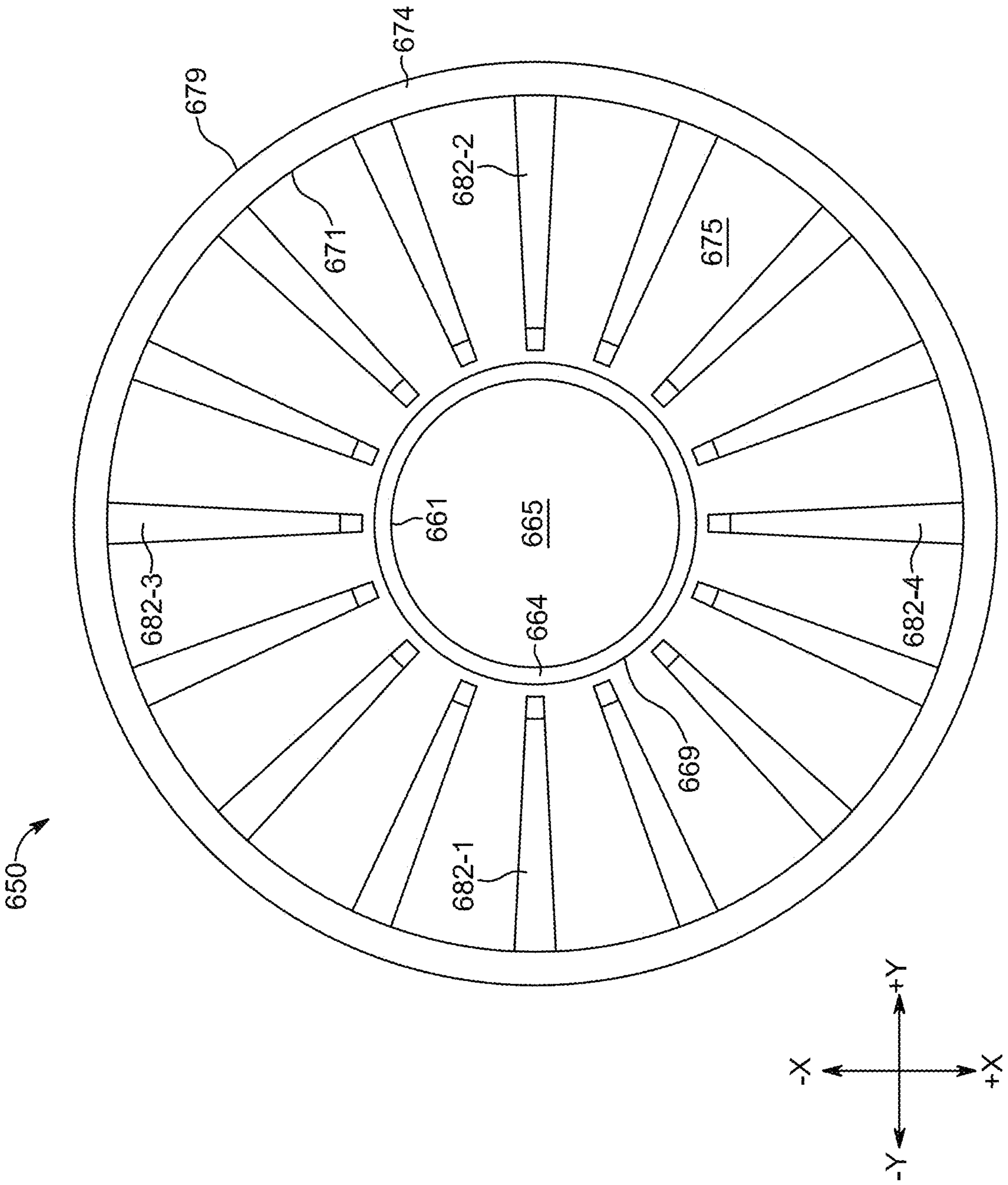
FIG. 23 is a cross-sectional view of the earpiece of FIGS. 21 and 22, taken from line XXIII-XXIII of FIG. 22.
Figure 24:
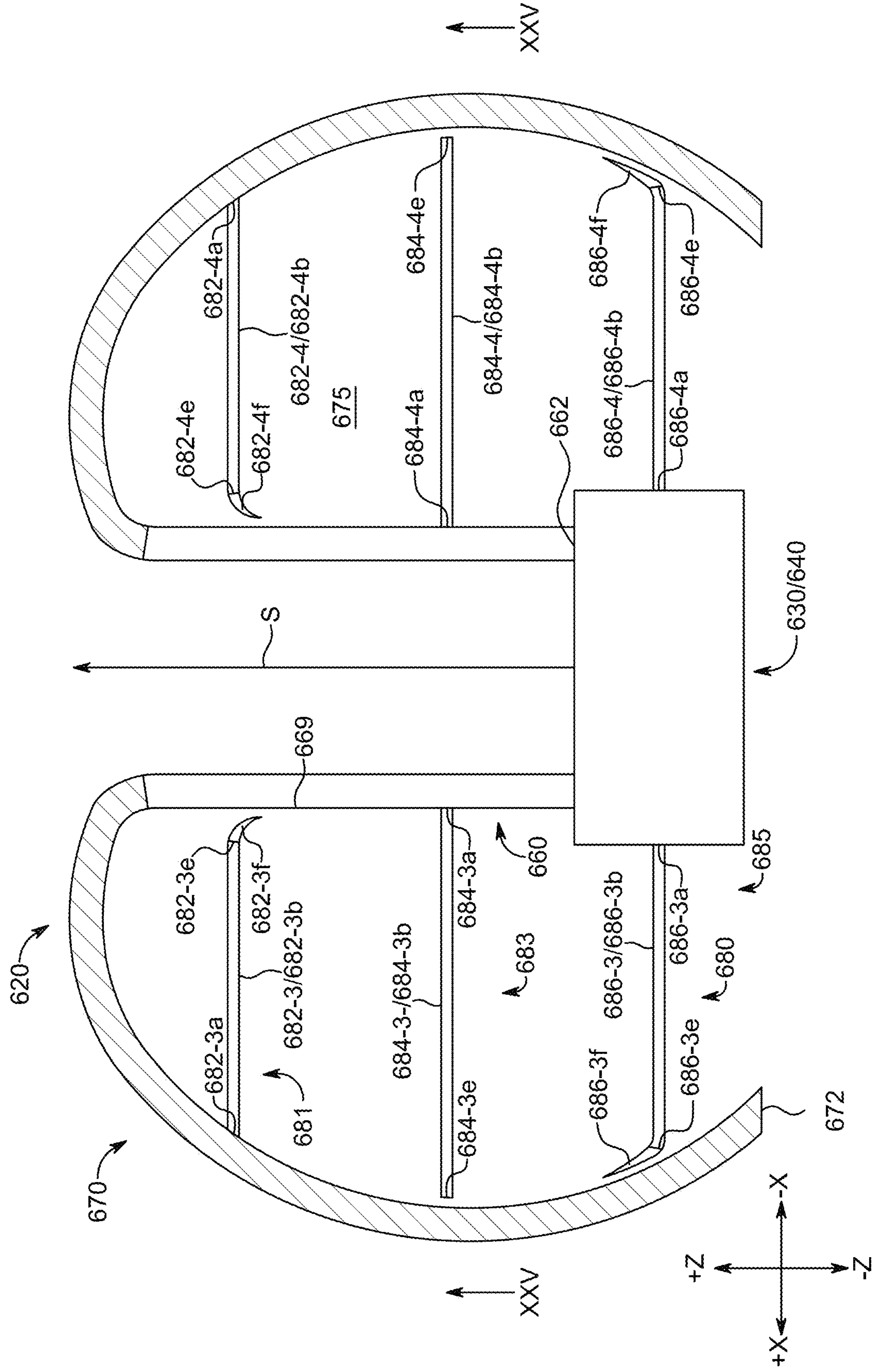
FIG. 24 is a cross-sectional view of the earpiece of FIGS. 21-23, taken from line XXIV-XXIV of FIG. 21.

As shown in FIGS. 22-24, outer eartip internal support subsystem 680 may include an outer eartip internal support feature 681 that may extend from outer eartip interior surface 671 towards inner eartip exterior surface 669 (e.g., through a portion of outer eartip space 675). For example, as shown, outer eartip internal support feature 681 may include sixteen support components, although any other suitable number is possible, including support components 682-1, 682-2, 682-3, and 682-4, each of which may include a support body that may extend inwardly towards inner eartip exterior surface 669 to a free end from an anchor end that may be coupled to or integrated with outer eartip interior surface 671 (e.g., support component 682-1 may include a support body 682-1*b* extending inwardly from anchor end 682-1*a* to free end 682-1*e*, support component 682-2 may include a support body 682-2*b* extending inwardly from anchor end 682-2*a* to free end 682-2*e*, support component 682-3 may include a support body 682-3*b* extending inwardly from anchor end 682-3*a* to free end 682-3*e*, and support component 682-4 may include a support body 682-4*b* extending inwardly from anchor end 682-4*a* to free end 682-4*e*). Any support body of outer eartip internal support feature 681 may have any suitable geometry (e.g., thickness and/or depth) that may be consistent and/or variable across its length. Moreover, any support body may form any suitable angle with outer eartip interior surface 671 as it extends therefrom towards inner eartip exterior surface 669. For example, as shown, support body 682-1*b* may extend linearly from outer eartip body 674 to free end 682-1*e* (e.g., in a plane of FIG. 23 that may be transverse to longitudinal axis Z). In an undeformed configuration of eartip subassembly 650 of FIGS. 21-25 (e.g., the functional configuration of eartip subassembly 650 without any external forces applied thereto, such as by a user), free end 682-1*e* of support body 682-1*b* of support component 682-1 may contact inner eartip exterior surface 669 or may be distanced any suitable distance therefrom, where such a distance may be small enough so as to be closed when outer eartip body 674 may receive an external force on outer eartip exterior surface 679 (e.g., by a user's ear canal) that may deform outer eartip body 674 for moving anchor end 682-1*a* and thus free end 682-1*e* of support body 682-1*b* to contact at least a portion inner eartip exterior surface 669 of inner eartip body 664 and potentially to deform support component 682-1 (e.g., to deform support body 682-1*b* so as to shorten the distance between ends 682-1*a* and 682-1*e* of support body 682-1*b*).

Different support components of outer eartip internal support feature 681 may be configured with different geometries for deforming in different manners (e.g., in response to pressure being exerted thereon by outer eartip interior surface 671 in response to outer eartip exterior surface 679 being deformed by an external force of a user). For example, as shown in FIG. 22, the geometry of support body 682-2*b* of support component 682-2 in a default configuration may include one or more flexibility features 682-2*y* that may be operative to provide additional flexibility to support body 682-2*b*. As just one example, a flexibility feature 682-2*y* may be operative to make the length of a front surface and/or the length of a back surface of support body 682-2*y* longer than the length between ends 682-2*a* and 682-2*e* in the default configuration of support body 682-2*b*, such that support body 682-2*b* may be operative to flex more easily out of plane at such a flexibility feature 682-2*y*.

While support body 682-1*b* of support component 682-1*a* may extend substantially linearly between ends 682-1*a* and 682-1*e*, a flap portion 682-1*f* may be provided at free end 682-1*e* that may be operative to extend away from support body 682-1*b* (e.g., at any suitable flap angle) for following at least a portion of a contour of inner eartip exterior surface 669. For example, as shown, while free end 682-1*e* of body 682-1*b* may be an end of a substantially uniformly thick support body 682-1*b* with a free end surface, flap portion 682-1*f* may be provided to extend from at least a portion of free end 682-1*e* for providing a portion of support component 682-1 that may be operative to provide a larger surface area for interacting with inner eartip exterior surface 669. In its default configuration, flap portion 682-1*f* may extend downwardly for any suitable distance from free end 682-1*e* with an exterior flap surface that may be shaped similarly to or otherwise follow a contoured shape similar to that of a portion of inner eartip exterior surface 669 that may be facing the exterior flap surface, where such surfaces may be contacting one another or positioned proximate one another when eartip subassembly 650 may be in its default configuration. Flap portion 682-1*f* may be operative to provide a larger and more gradual interface than free end 682-1*e* for a portion of inner eartip exterior surface 669 with support component 682-1 when a portion of outer eartip interior surface 671 coupled to anchor end 682-1*a* of support component 682-*i* may be deformed. For example, flap portion 682-1*f* may be operative to act as a soft leaf spring for providing some rigidity to at least the portion of inner eartip exterior surface 669 that may contact an exterior flap surface of flap portion 682-1*f* during any attempted deformation of a particular portion of outer eartip interior surface 671 (e.g., at or adjacent anchor end 682-1*a*). Any one or more of the support components of outer eartip internal support feature 681 may include a flap portion (e.g., flap portion 682-1*f* coupled to free end 682-1*e*, flap portion 682-2*f* coupled to free end 682-2*e*, flap portion 682-3*f* coupled to free end 682-3*e*, and flap portion 682-4*f* coupled to free end 682-4*e*). Alternatively, no flap portion may be provided on one or more free ends of one or more support components of outer eartip interior surface 671.

Figure 25:
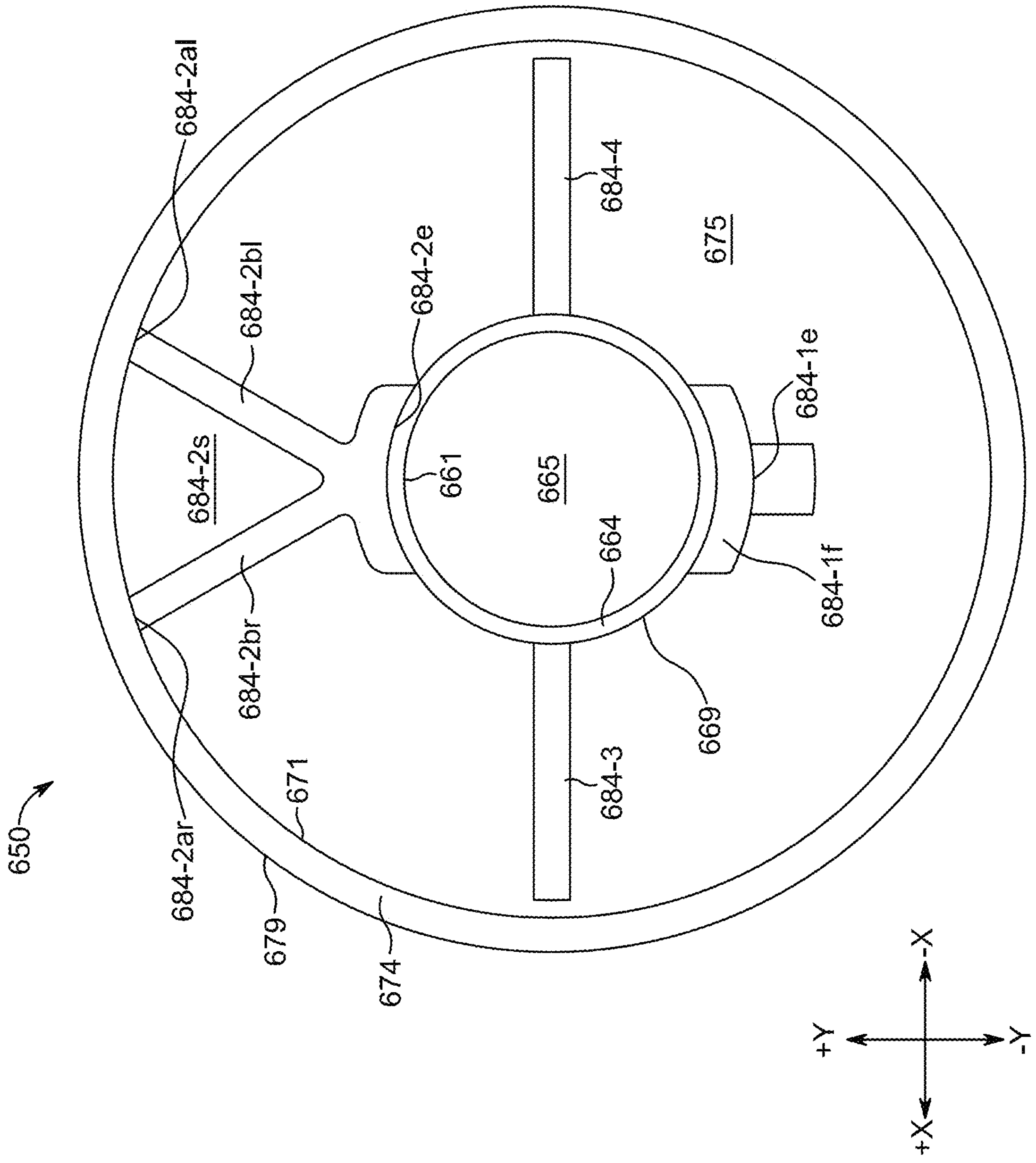
FIG. 25 is a cross-sectional view of the earpiece of FIGS. 21-24, taken from line XXV-XXV of FIG. 24.

As shown in FIGS. 22, 24, and 25, outer eartip internal support subsystem 680 may include an outer eartip internal support feature 683 with one or more support components (e.g., support components 684-1 and 684-2) that may extend from outer eartip interior surface 671 towards inner eartip exterior surface 669 (e.g., through a portion of outer eartip space 675) as well as one or more support components (e.g., support components 684-3 and 684-4) that may extend from inner eartip exterior surface 669 towards outer eartip interior surface 671 (e.g., through a portion of outer eartip space 675). For example, outer eartip internal support feature 683 may include four support components, such as a first support component 684-1 with a front support body 684-1*bf* that may extend out to a free end 684-1*e* from a front anchor end 684-1*af* that may be coupled to or integrated with outer eartip interior surface 671 at a front portion of outer eartip body 674 and a back support body 684-1*bb* that may extend out to free end 684-1*e* from a back anchor end 684-1*ab* that may be coupled to or integrated with outer eartip interior surface 671 at a back portion of outer eartip body 674, a second support component 684-2 with a left support body 684-2*b*1 that may extend out to a free end 684-2*e* from a left anchor end 684-2*a*1 that may be coupled to or integrated with outer eartip interior surface 671 at a left portion of outer eartip body 674 and a right support body 684-2*br* that may extend out to free end 684-2*e* from a right anchor end 684-*tar* that may be coupled to or integrated with outer eartip interior surface 671 at a right portion of outer eartip body 674, a third support component 684-3 with a support body 684-3*b* that may extend out to a free end 684-3*e* from an anchor end 684-3*a* that may be coupled to or integrated with inner eartip exterior surface 669 about a portion of a perimeter of inner eartip body 664, and a fourth support component 684-4 with a support body 684-4*b* that may extend out to a free end 684-4*e* from an anchor end 684-4*a* that may be coupled to or integrated with inner eartip exterior surface 669 about a portion of a perimeter of inner eartip body 664. As shown, each one of free ends 684-1*e*, 684-2*e*, 684-3*e*, and 684-4*e* may be at least partially provided in the same plane (e.g., a single X-Y plane of FIG. 25), such that each support component of outer eartip internal support feature 683 may be operative to interface with different portions of outer eartip interior surface 671 and different portions of inner eartip exterior surface 669 within a single cross-sectional periphery thereof.

Different portions of a flap may extend in different directions from a free end of a support body for interfacing with different portions of an inner eartip exterior surface. For example, as shown in FIG. 22, a flap portion 684-1*f* may be provided at free end 684-1*e* along a portion or the entirety of free end 684-1*e* and an upward portion of flap portion 684-1*f* may extend upwardly from free end 684-1*e* (e.g., following a contour of a portion of inner eartip exterior surface 669 extending towards front end 668 that may interface with that upwardly extending portion of flap portion 684-10 while a downward portion of flap portion 684-1*f* may extend downwardly from free end 684-1*e* (e.g., following a contour of a portion of inner eartip exterior surface 669 extending towards back end 662 that may interface with that downwardly extending portion of flap portion 684-10. Alternatively or additionally, as shown in FIG. 25, flap portion 684-1*f* may be provided at free end 684-1*e* along a portion or the entirety of free end 684-1*e* and a leftward portion of flap portion 684-1*f* may extend leftwardly from free end 684-1*e* (e.g., following a contour of a portion of inner eartip exterior surface 669 extending in a clockwise direction about the path for sound S of inner eartip space 665 (e.g., about the Z-axis) that may interface with that leftwardly extending portion of flap portion 684-10 while a rightward portion of flap portion 684-1*f* may extend rightwardly from free end 684-1*e* (e.g., following a contour of a portion of inner eartip exterior surface 669 extending in a counter-clockwise direction about the path for sound S of inner eartip space 665 (e.g., about the Z-axis) that may interface with that rightwardly extending portion of flap portion 684-10. Different portions of a flap (e.g., an upward portion and downward portion) may be configured to have different rigidities for imparting different flexibility characteristics to the respective different portions of an inner eartip exterior surface with which those different flap portions may interface (e.g., during deformation of outer eartip body 674 when eartip subassembly 650 is positioned within a user's ear canal).

In some embodiments, a support component may not be provided with a flap portion but, instead, the free end of the support body of that support component may be shaped to follow the contour of a portion of an outer eartip interior surface. For example, as shown in FIGS. 22 and 25, the external surface of free end 684-2*e* of support component 686-2 may be shaped to match the contour of a portion of inner eartip exterior surface 669 that may interface with support component 684-2. Particularly, as shown in FIG. 22, a first geometry of the external surface of free end 684-2*e* may be operative to match the geometry of a portion of inner eartip exterior surface 669 in a Y-Z plane (e.g., along a length of a portion of inner eartip exterior surface 669) and/or, as shown in FIG. 25, a second geometry of the external surface of free end 684-2*e* may be operative to match the geometry of a portion of inner eartip exterior surface 669 in a X-Y plane (e.g., along a transverse cross-sectional perimeter of a portion of inner eartip exterior surface 669).

Different support components of outer eartip internal support feature 683 may be configured with different geometries for deforming in different manners (e.g., in response to pressure being exerted thereon by outer eartip interior surface 671 in response to outer eartip exterior surface 679 being deformed by an external force of a user). For example, as shown in FIG. 22, the geometry of support component 684-1 may include two different support bodies (e.g., front support body 684-1*bf* and back support body 684-1*bb*) that may extend to the same free end 684-1*e* from different anchor points along the length of outer eartip body 674 (e.g., a first anchor point at anchor end 684-1*af* that may be more proximal to front end 678 of outer eartip body 674 and a second anchor point at anchor end 684-1*ab* that may be more proximal to back end 672 of outer eartip body 674) for defining a longitudinal space 684-1*s* therebetween that may be deformed when an external force is applied by a portion of outer eartip body 674 to anchor end 684-1*af* and/or anchor end 684-1*ab* (e.g., deformation in the Y-Z plane of FIG. 22). As another example, as shown in FIG. 25, the geometry of support component 684-2 may include two different support bodies (e.g., left support body 684-2*b*1 and right support body 684-2*br*) that may extend to the same free end 684-2*e* from the same or different anchor ends about the periphery of outer eartip interior surface 671 of outer eartip body 674 for defining a transverse or radial space 684-2*s* therebetween that may be deformed when an external force is applied by a portion of outer eartip body 674 to anchor end 684-2*ar* and/or anchor end 684-2*a*1 (e.g., deformation in the X-Y plane of FIG. 25). In some embodiments, rather than two support bodies being provided by support component 684-1 or support component 684-2, only one of such support bodies may be provided, thereby changing the rigidity of that support component and, thus, the effective surface stiffness of the portion of outer eartip interior surface 671 that may be coupled to that support component 684-1 or that support component 684-2.

As shown in FIGS. 22 and 24, outer eartip internal support subsystem 680 may include an outer eartip internal support feature 685 with one or more support components (e.g., support components 686-1 and 686-2) that may extend from outer eartip interior surface 671 towards an exterior housing surface 137 of earpiece housing subassembly 130 and/or of sound emitting subassembly 140 (e.g., through a portion of outer eartip space 675) as well as one or more support components (e.g., support components 686-3 and 686-4) that may extend from exterior housing surface 137 of earpiece housing subassembly 130 and/or of sound emitting subassembly 140 towards outer eartip interior surface 671 (e.g., through a portion of outer eartip space 675). For example, outer eartip internal support feature 685 may include four support components, such as a first support component 686-1 that may include a support body 686-1*b* extending inwardly to a free end 686-1*e* from an anchor end 686-1*a* that may be coupled to or integrated with outer eartip interior surface 671 of outer eartip body 674, a second support component 686-2 that may include a support body 686-2*b* extending inwardly to a free end 686-2*e* from an anchor end 686-2*a* that may be coupled to or integrated with outer eartip interior surface 671 of outer eartip body 674, a third support component 686-3 with a support body 686-3*b* that may extend out to a free end 686-3*e* from an anchor end 686-3*a* that may be coupled to or integrated with a portion of exterior housing surface 137, and a fourth support component 686-4 with a support body 686-4*b* that may extend out to a free end 686-4*e* from an anchor end 686-4*a* that may be coupled to or integrated with a portion of exterior housing surface 137.

Different portions of a flap may extend in different directions from a free end of a support body for interfacing with different portions of exterior housing surface 137. For example, as shown in FIG. 22, a flap portion 686-1*f* may be provided at free end 686-1*e* along a portion or the entirety of free end 686-1*e* of support body 686-1*b* for interfacing with any suitable portion of exterior housing surface 137 (e.g., a side surface and/or a bottom surface of housing subassembly 130 and/or of sound emitting subassembly 140), which may not only provide additional rigidity to a portion of outer eartip interior surface 671 of outer eartip body 674 that may be proximal to anchor end 686-1*a* (e.g., when deformation of that portion of outer eartip interior surface 671 may result in flap portion 686-1*f* and/or free end portion 686-1*e* contacting exterior housing surface 137), but may also provide for some support of housing subassembly 130 and/or of sound emitting subassembly 140 (e.g., by providing a surface on which exterior housing surface 137 may at least partially rest). Similarly, as shown in FIG. 22, a flap portion 686-2*f* may be provided at free end 686-2*e* along a portion or the entirety of free end 686-2*e* of support body 686-2*b* for interfacing with any suitable portion of exterior housing surface 137, which may not only provide additional rigidity to a portion of outer eartip interior surface 671 of outer eartip body 674 that may be proximal to anchor end 686-2*a* (e.g., when deformation of that portion of outer eartip interior surface 671 may result in flap portion 686-2*f* and/or free end portion 686-2*e* contacting exterior housing surface 137), but may also provide for some support of housing subassembly 130 and/or of sound emitting subassembly 140 (e.g., by providing a surface on which exterior housing surface 137 may at least partially rest). Additionally or alternatively, different portions of a flap may extend in different directions from a free end of a support body for interfacing with different portions of outer eartip interior surface 671. For example, as shown in FIG. 24, a flap portion 686-3*f* may be provided at free end 686-3*e* along a portion or the entirety of free end 686-3*e* of support body 686-3*b* for interfacing with any suitable portion of outer eartip interior surface 671, which may provide additional rigidity to a portion of outer eartip interior surface 671 of outer eartip body 674 that may be proximal to flap portion 686-3*f* and/or free end 686-3*e* (e.g., when deformation of that portion of outer eartip interior surface 671 may result in flap portion 686-3*f* and/or free end portion 686-3*e* contacting outer eartip interior surface 671). Similarly, as shown in FIG. 24, a flap portion 686-4*f* may be provided at free end 686-4*e* along a portion or the entirety of free end 686-4*e* of support body 686-4*b* for interfacing with any suitable portion of outer eartip interior surface 671, which may provide additional rigidity to a portion of outer eartip interior surface 671 of outer eartip body 674 that may be proximal to flap portion 686-4*f* and/or free end 686-4*e* (e.g., when deformation of that portion of outer eartip interior surface 671 may result in flap portion 686-4*f* and/or free end portion 686-4*e* contacting outer eartip interior surface 671). Therefore, exterior housing surface 137 (e.g., any suitable portion of housing subassembly 130 and/or of sound emitting subassembly 140) may be operative to provide additional rigidity to outer eartip body 674 via any suitable intervening internal support component during deformation of outer eartip body 674.

Eartip internal support features 681, 683, and 685 of outer eartip internal support subsystem 680 may be spaced apart from one another along the length of earpiece 620 (e.g., along the Z-axis) in any suitable fashion. For example, each pair of consecutively positioned eartip internal support features may be spaced equidistant from one another along the length of earpiece 620. Alternatively, the spacing between different pairs of consecutively positioned eartip internal support features may vary along the length of earpiece 620.

Any portion or the entirety of one or more outer eartip internal support features of outer eartip internal support subsystem 680 (e.g., support bodies and/or flap portions of eartip internal support features 681, 683, and 685) may be formed of any suitable material, which may be the same as or different than the material of inner eartip body 664, outer eartip body 674, and/or exterior housing surface 137. Moreover, one or more outer eartip internal support features of outer eartip internal support subsystem 680 (e.g., one or more of the support bodies of eartip internal support features 681, 683, and 685) may be coupled to the appropriate one of inner eartip portion 660, outer eartip portion 670, and exterior housing surface 137 (e.g., with one or more anchor ends) using any suitable approach or mechanism, including, but not limited to, any suitable adhesive(s) (e.g., glues or tapes), any suitable gasket(s), any suitable heat staking or other heat treatment, any suitable interference fit(s), any suitable mechanical connector(s), and/or the like. Additionally or alternatively, one or more outer eartip internal support features of outer eartip internal support subsystem 680 (e.g., eartip internal support features 681, 683, and 685) may be molded to or otherwise integrated with the appropriate one of inner eartip portion 660, outer eartip portion 670, and exterior housing surface 137 using any suitable process (e.g., in a single or double-shot molding process).

FIGS. 26-28

Figure 26:
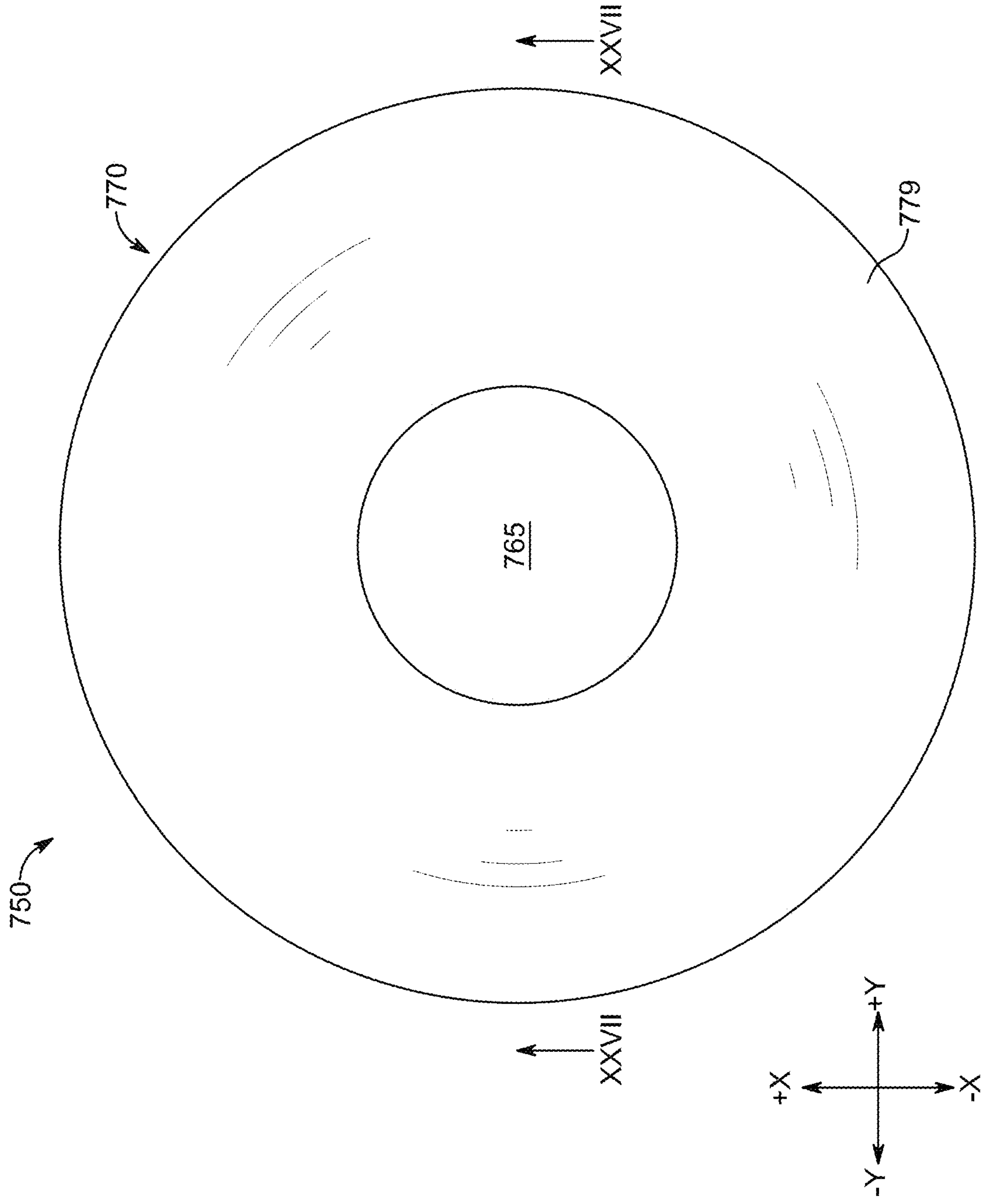
FIG. 26 is a top elevational view of yet another illustrative eartip subassembly with internal support components.
Figure 27:
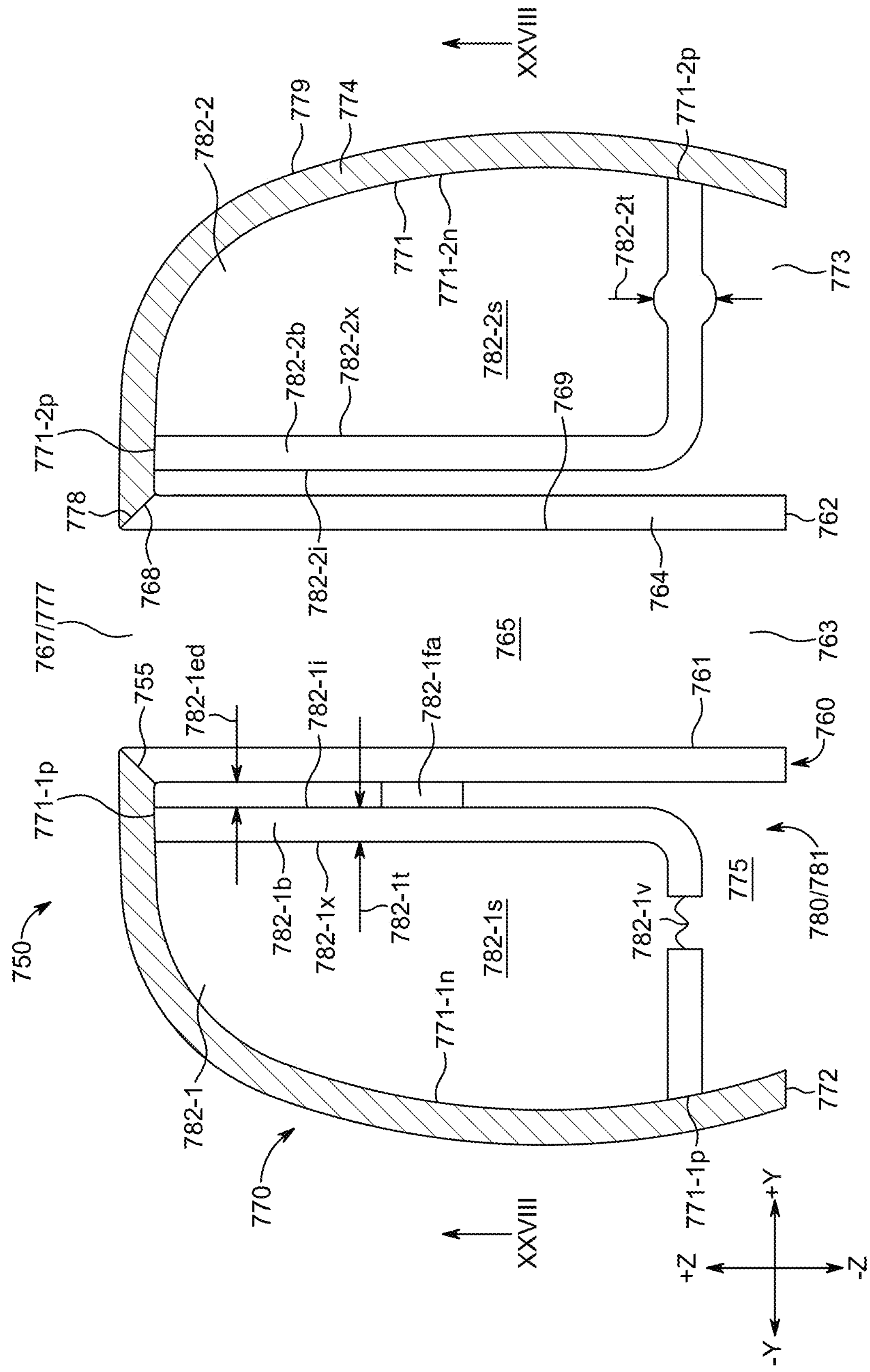
FIG. 27 is a cross-sectional view of the eartip subassembly of FIG. 26, taken from line XXVII-XXVII of FIG. 26.
Figure 28:
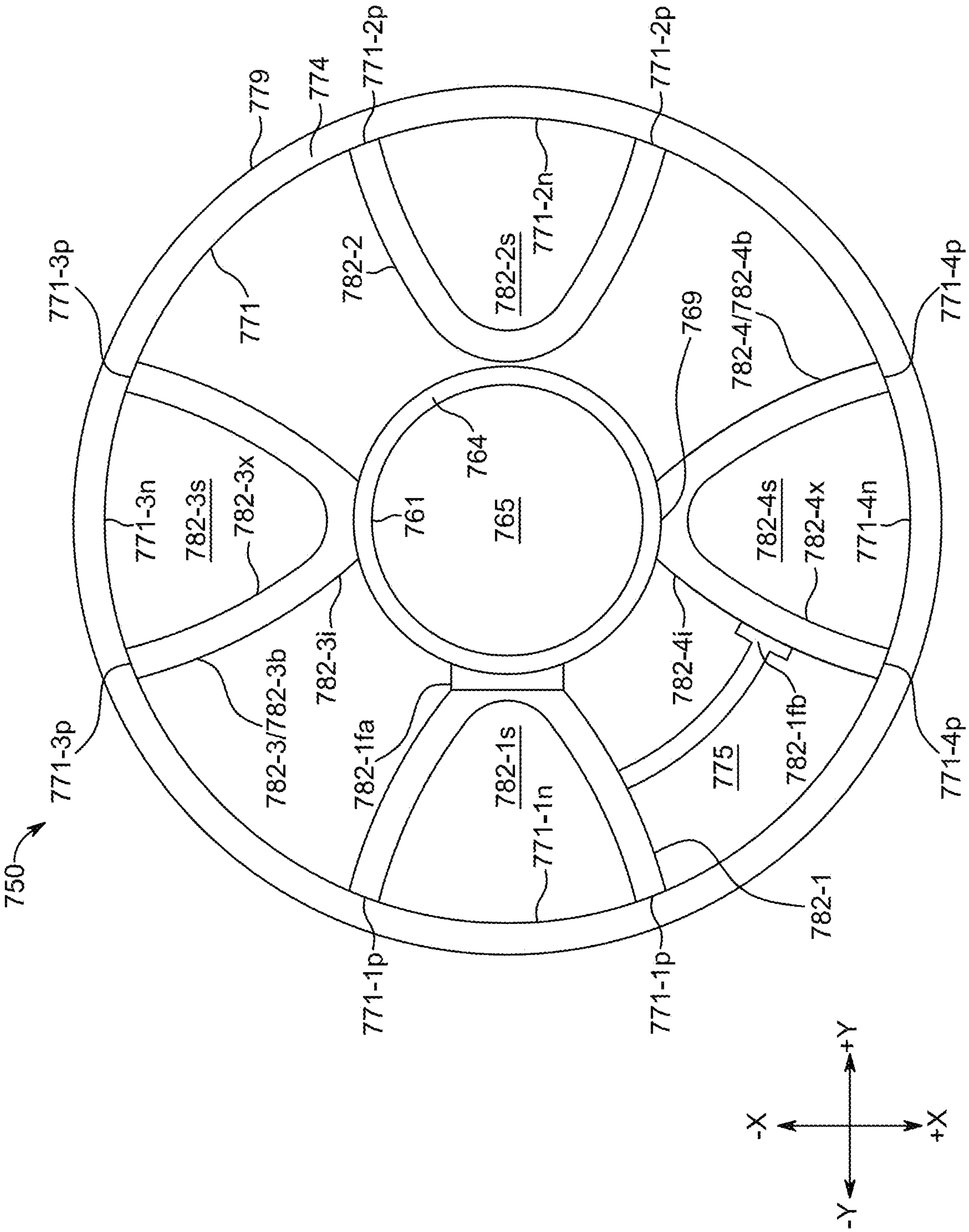
FIG. 28 is a cross-sectional view of the eartip subassembly of FIGS. 26 and 27, taken from line XXVIII-XXVIII of FIG. 27.

FIGS. 26-28 show another illustrative eartip subassembly 750, which may be similar to eartip subassembly 150 of FIGS. 1-4 but may include an outer eartip internal support subsystem with at least one support component that may define a fluid enclosure coupled to or integrally formed with an interior surface of an outer eartip body for varying the effective rigidity of an exterior surface of the outer eartip body to affect the ability of the outer eartip body to conform to various ear canal geometries. Eartip subassembly 750 of FIGS. 26-28 may include similar components to eartip subassembly 150 of FIGS. 1-4, where elements of eartip subassembly 750 of FIGS. 26-28 being labeled with "7xx" reference labels may correspond to the "1 xx" reference labels of the labeled elements of eartip subassembly 150 of FIGS. 1-4, and where differences therebetween may be described below. As shown, eartip subassembly 750 may include an inner eartip portion 760 and an outer eartip portion 770 coupled to inner eartip portion 760 at interface 755. Inner eartip portion 760 may include an inner eartip body 764 that may extend between an inner eartip back end 762 and an inner eartip front end 768, where both an inner eartip interior surface 761 of inner eartip body 764 and an opposite inner eartip exterior surface 769 of inner eartip body 764 may extend between inner eartip back end 762 and inner eartip front end 768, and where an inner eartip space 765 may be defined by inner eartip interior surface 761 and may extend between an inner eartip back opening 763 that may be provided through inner eartip back end 762 and an inner eartip front opening 767 that may be provided through inner eartip front end 768. Outer eartip portion 770 may include an outer eartip body 774 that may extend between an outer eartip back end 772 and an outer eartip front end 778, where both an outer eartip interior surface 771 of outer eartip body 774 and an opposite outer eartip exterior surface 779 of outer eartip body 774 may extend between outer eartip back end 772 and outer eartip front end 778, and where an outer eartip space 775 may be defined by outer eartip interior surface 771 (e.g., one portion of space 775 may be defined between outer eartip interior surface 771 and inner eartip exterior surface 769 when at least a portion of inner eartip body 764 is positioned between portions of outer eartip interior surface 771, and another portion of space 775 may be occupied by inner eartip body 764 and inner eartip space 765) and may extend between outer eartip back end 772 and outer eartip front end 778, while an outer eartip back opening 773 may be provided through outer eartip back end 772 and an outer eartip front opening 777 may be provided through outer eartip front end 778. Although not shown, eartip subassembly 750 may include any suitable inner eartip internal support system, such as inner eartip internal support system 166 of eartip subassembly 150 or inner eartip internal support system 266 of eartip subassembly 250. Additionally or alternatively, although not shown, eartip subassembly 750 may be coupled to any suitable housing subassembly and any suitable sound emitting subassembly in any suitable manner for providing any suitable earpiece for a headphone assembly.

Eartip subassembly 750 may include an outer eartip internal support subsystem 780 that may be operative to vary the ability of outer eartip exterior surface 779 to conform to various ear canal geometries for improving the ability of eartip subassembly 750 to create an effective acoustic seal and/or to provide comfort to the user. Outer eartip internal support subsystem 780 may be operative to vary the effective surface stiffness of eartip exterior surface 779 along a length of eartip exterior surface 779 (e.g., from outer eartip front end 778 to outer eartip back end 772) and/or about a perimeter of eartip exterior surface 779 (e.g., about at least a portion of the path of sound S (e.g., about the Z-axis in an X-Y plane)). Outer eartip internal support subsystem 780 may include one or more eartip internal support features, such as outer eartip internal support feature 781. As shown in FIGS. 26-28, outer eartip internal support feature 781 may include four fluid enclosure support components 782-1, 782-2, 782-3, and 782-4, although any other suitable number of fluid enclosure support components may be provided (e.g., 1, 2, 3, or many more than 4). First fluid enclosure support component 782-1 may include a support body **782-1*b* that may be coupled to or integrated with outer eartip interior surface 771 in any suitable manner along any suitable path 771-1*p* on outer eartip interior surface 771 such that at least a portion of an exterior surface 782-1*x* of support body 782-1*b* and the portion of outer eartip interior surface 771 within path 771-1*p* (i.e., outer eartip interior surface portion 771-1*n*) may together define a fluid enclosure space 782-1*s* between outer eartip interior surface portion 771-*in* of outer eartip interior surface 771 within path 771-1*p* and exterior surface 782-1*x* of support body 782-1*b*, and such that at least a portion of an interior surface 782-1*i* of support body 782-1*b* (e.g., opposite to exterior surface 782-1*x*) may contact or lie proximal to a portion of inner eartip exterior surface 769. Similarly, second fluid enclosure support component 782-2 may include a support body 782-2*b* that may be coupled to or integrated with outer eartip interior surface 771 in any suitable manner along any suitable path 771-2*p* on outer eartip interior surface 771 such that at least a portion of an exterior surface 782-2*x* of support body 782-2*b* and the portion of outer eartip interior surface 771 within path 771-1*p* (i.e., outer eartip interior surface portion 771-2*n*) may together define a fluid enclosure space 782-2*s* between outer eartip interior surface portion 771-2*n* of outer eartip interior surface 771 within path 771-2*p* and exterior surface 782-2*x* of support body 782-2*b*, and such that at least a portion of an interior surface 782-2*i* of support body 782-2*b* (e.g., opposite to exterior surface 782-2*x*) may contact or lie proximal to a portion of inner eartip exterior surface 769. Similarly, third fluid enclosure support component 782-3 may include a support body 782-3*b* that may be coupled to or integrated with outer eartip interior surface 771 in any suitable manner along any suitable path 771-3*p* on outer eartip interior surface 771 such that at least a portion of an exterior surface 782-3*x* of support body 782-3*b* and the portion of outer eartip interior surface 771 within path 771-3*p* (i.e., outer eartip interior surface portion 771-3*n*) may together define a fluid enclosure space 782-3*s* between outer eartip interior surface portion 771-3*n* of outer eartip interior surface 771 within path 771-3*p* and exterior surface 782-3*x* of support body 782-3*b*, and such that at least a portion of an interior surface 782-3*i* of support body 782-3*b* (e.g., opposite to exterior surface 782-3*x*) may contact or lie proximal to a portion of inner eartip exterior surface 769. Similarly, fourth fluid enclosure support component 782-4 may include a support body 782-4*b* that may be coupled to or integrated with outer eartip interior surface 771 in any suitable manner along any suitable path 771-4*p* on outer eartip interior surface 771 such that at least a portion of an exterior surface 782-4*x* of support body 782-4*b* and the portion of outer eartip interior surface 771 within path 771-4*p* (i.e., outer eartip interior surface portion 771-4*n*) may together define a fluid enclosure space 782-4*s* between outer eartip interior surface portion 771-4*n* of outer eartip interior surface 771 within path 771-4*p* and exterior surface 782-4*x* of support body 782-4*b*, and such that at least a portion of an interior surface 782-4*i* of support body 782-4*b* (e.g., opposite to exterior surface 782-4*x*) may contact or lie proximal to a portion of inner eartip exterior surface 769**.

As shown, each one of paths **771-1*p* through 771-4*p* may be unique and non-overlapping. For example, fluid enclosure spaces 782-1*s* through 782-4*s* may be rotationally offset from one another about a longitudinal axis by any suitable amount (e.g., by 90°, as may be shown in the X-Y plane of FIG. 28 about longitudinal axis Z). Alternatively, two or more of paths 771-1*p* through 771-4*p*** may overlap such that a portion of an outer eartip interior surface portion of a first path may be the same as a portion of an outer eartip interior surface portion of a second path.

The geometry of a support body of a fluid enclosure support component may be consistent or variable. For example, as shown, thickness **782-1*t* of support body 782-1*b* of support component 782-1 between exterior surface 782-1*x* and interior surface 782-1*i* of support body 782-1*b* may be consistent along its entirety (e.g., between any two portions of support body 782-1*b* coupled to any two portions of path 771-1*p*). Alternatively, as shown, thickness 782-2*t* of support body 782-2*b* of support component 782-2 between exterior surface 782-2*x* and interior surface 782-2*i* of support body 782-2*b* may vary along different portions thereof. The size and shape of each fluid enclosure space defined by each fluid enclosure support component may be the same as each other, or the size and/or shape of one fluid enclosure space defined by one fluid enclosure support component may be different than that of another fluid enclosure space defined by another fluid enclosure support. A fluid enclosure space defined by a fluid enclosure support component may be any suitable size and/or any suitable shape. In an undeformed configuration of eartip subassembly 750 of FIGS. 26-28 (e.g., the functional configuration of eartip subassembly 750 without any external forces applied thereto, such as by a user), at least a portion of an interior surface of a support body may contact inner eartip exterior surface 769** or may be distanced any suitable distance from inner eartip exterior surface 769. For example, as shown, at least a portion of interior surface 782-4*i* of support body 782-4*b* may contact inner eartip exterior surface 769. In some embodiments, such contact may be maintained by coupling interior surface 782-4*i* of support body 782-4*b* to inner eartip exterior surface 769 (e.g., with adhesive(s), mechanical fastener(s), manufacturing techniques (e.g., molding), and the like). Alternatively, as shown, a portion of interior surface 782-1*i* of support body 782-1*b* may be distanced any suitable distance 782-1*ed* from inner eartip exterior surface 769, where such a distance 782-1*ed* may be small enough so as to be closed when outer eartip body 774 may receive an external force on outer eartip exterior surface 779 (e.g., by a user's ear canal) that may deform outer eartip interior surface portion 771-*in* of outer eartip interior surface 771 within path 771-1*p* such that the shape of fluid enclosure space 782-1*s* may be deformed for pushing a portion of interior surface 782-1*i* of support body 782-1*b* against a portion of inner eartip exterior surface 769.

Any suitable fluid may be held within a fluid enclosure space of a fluid enclosure support component in the default configuration of eartip subassembly 750, such as any suitable gas (e.g., air), any suitable liquid (e.g., water), any combination thereof (e.g., gel), and the like, which may be operative to deform when the shape of the fluid enclosure space deforms due to deformation of any suitable portion of the surfaces defining the fluid enclosure space. In some embodiments, the volume of such fluid may remain constant throughout the use of eartip subassembly 750 (e.g., the volume of such fluid in the default configuration of the fluid enclosure space may be the same as when the fluid enclosure space is deformed (e.g., when eartip subassembly 750 is positioned within a user's ear canal)). In other embodiments, the volume of such fluid may vary throughout the use of eartip subassembly 750 (e.g., fluid may be enabled to enter and exit the fluid enclosure space as the fluid enclosure space changes shapes). For example, as shown, support body 782-1*b* of fluid enclosure support component 782-1 may include one or more valves 782-1*v* that may be operative to selectively enable a fluid to enter into fluid enclosure space 782-1*s* and/or to exit fluid enclosure space 782-1*s* therethrough. In some embodiments, valve 782-1*v* may be operative to enable a user to adjust the volume of fluid within fluid enclosure space 782-1*s* of fluid enclosure support component 782-1. For example, valve 782-1*v* may be operative to enable a user to remove some or substantially all air from fluid enclosure space 782-1*s* prior to and/or during insertion of eartip subassembly 750 into the user's ear canal, and then valve 782-1*v* may be operative to enable a user to add air into fluid enclosure space 782-1*s* while eartip subassembly 750 is positioned within the user's ear canal, thereby enabling eartip subassembly 750 to be more easily inserted into an ear canal when fluid enclosure space 782-1*s* containing less fluid and then to be more strongly held within the ear canal when fluid enclosure space 782-1*s* contains more fluid. In some embodiments, valve 782-1*v* may be a passive type valve, such as a one-way reed valve, where internal pressure may be directed and/or controlled by any suitable external mechanism, such as a mechanism in a housing subassembly and/or in a sound emitting subassembly and/or any suitable external adjustment tool. Additionally or alternatively, valve 782-1*v* may be operative to enable a user to manually inflate and/or deflate fluid enclosure space 782-1*s* by any suitable amount.

Additionally or alternatively, it is to be understood that any one or more of the support components of outer eartip internal support feature 781 of outer eartip internal support subsystem 780 may include one or more suitable flap portions, as described with respect to any flap portions of FIGS. 7-25 (e.g., extending in any suitable direction(s) from any suitable portion of interior surface 782-1*i* of support body 782-1*b* with any suitable shape (e.g., for interfacing with and/or matching a contour of inner eartip exterior surface 769 (e.g., as shown by flap portion 782-1*fa* of support component 782-1) and/or of interior surface 782-3*i* of support body 782-3*b* and/or of interior surface 782-4*i* of support body 782-4*b* ((e.g., as shown by flap portion 782-1*ib* of support component 782-1))). Additionally or alternatively, although not shown in FIGS. 26-28, it is to be understood that outer eartip internal support subsystem 780 may include one or more additional outer eartip internal support features along with outer eartip internal support feature 781 (e.g., a second outer eartip internal support feature positioned longitudinally above or below outer eartip internal support feature 781 along and about outer eartip body 774 and/or along and about inner eartip body 764, such as an additional outer eartip internal support feature defining one or more additional fluid enclosure spaces that may have any suitable geometries or orientations that may be the same as or different than that of the fluid enclosure spaces of outer eartip internal support feature 781).

Any portion or the entirety eartip internal support feature 781 of outer eartip internal support subsystem 780 (e.g., support bodies and/or flap portions of eartip internal support feature 781) may be formed of any suitable material, which may be the same as or different than the material of inner eartip body 764 and/or outer eartip body 774. Moreover, one or more support bodies of outer eartip internal support subsystem 780 may be coupled to inner eartip portion 760 and/or outer eartip portion 770 using any suitable approach or mechanism, including, but not limited to, any suitable adhesive(s) (e.g., glues or tapes), any suitable gasket(s), any suitable heat staking or other heat treatment, any suitable interference fit(s), any suitable mechanical connector(s), and/or the like. Additionally or alternatively, one or more support bodies of outer eartip internal support subsystem 780 may be molded to or otherwise integrated with inner eartip portion 760 and/or outer eartip portion 770 using any suitable process (e.g., in a single or double-shot molding process).

FIGS. 29-31

Figure 29:
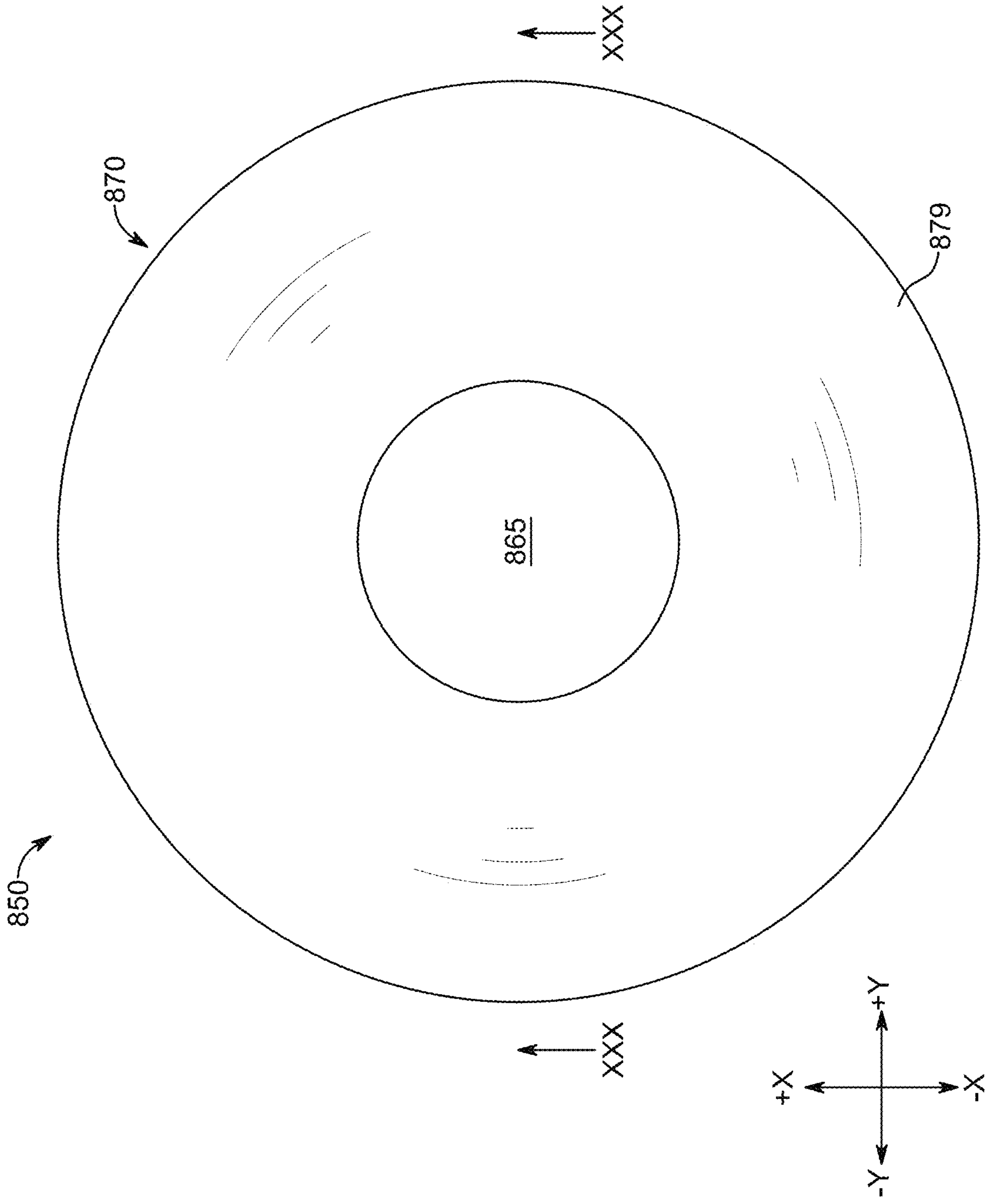
FIG. 29 is a top elevational view of yet another illustrative eartip subassembly with internal support components.
Figure 30:
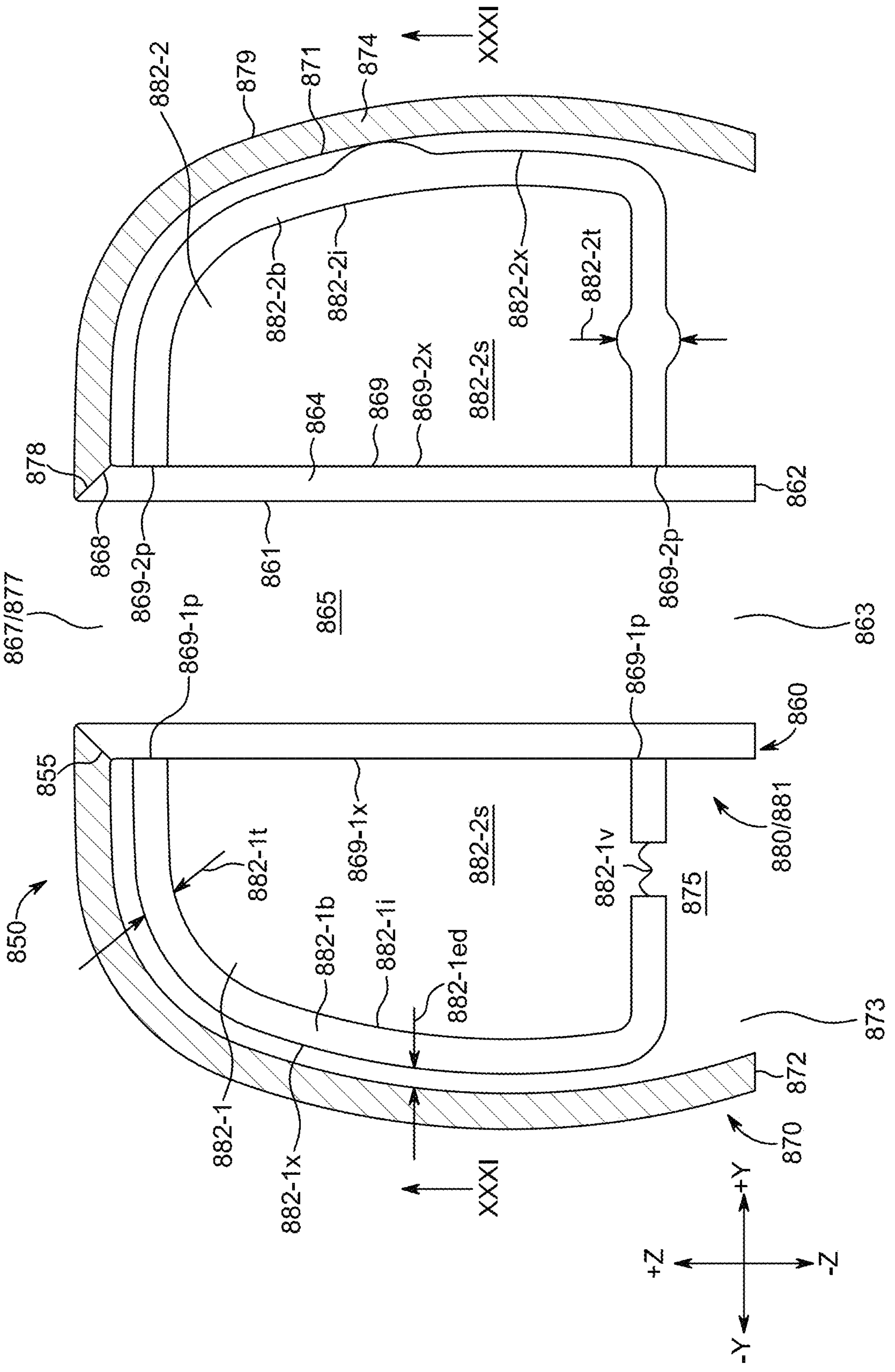
FIG. 30 is a cross-sectional view of the eartip subassembly of FIG. 29, taken from line XXX-XXX of FIG. 29.
Figure 31:
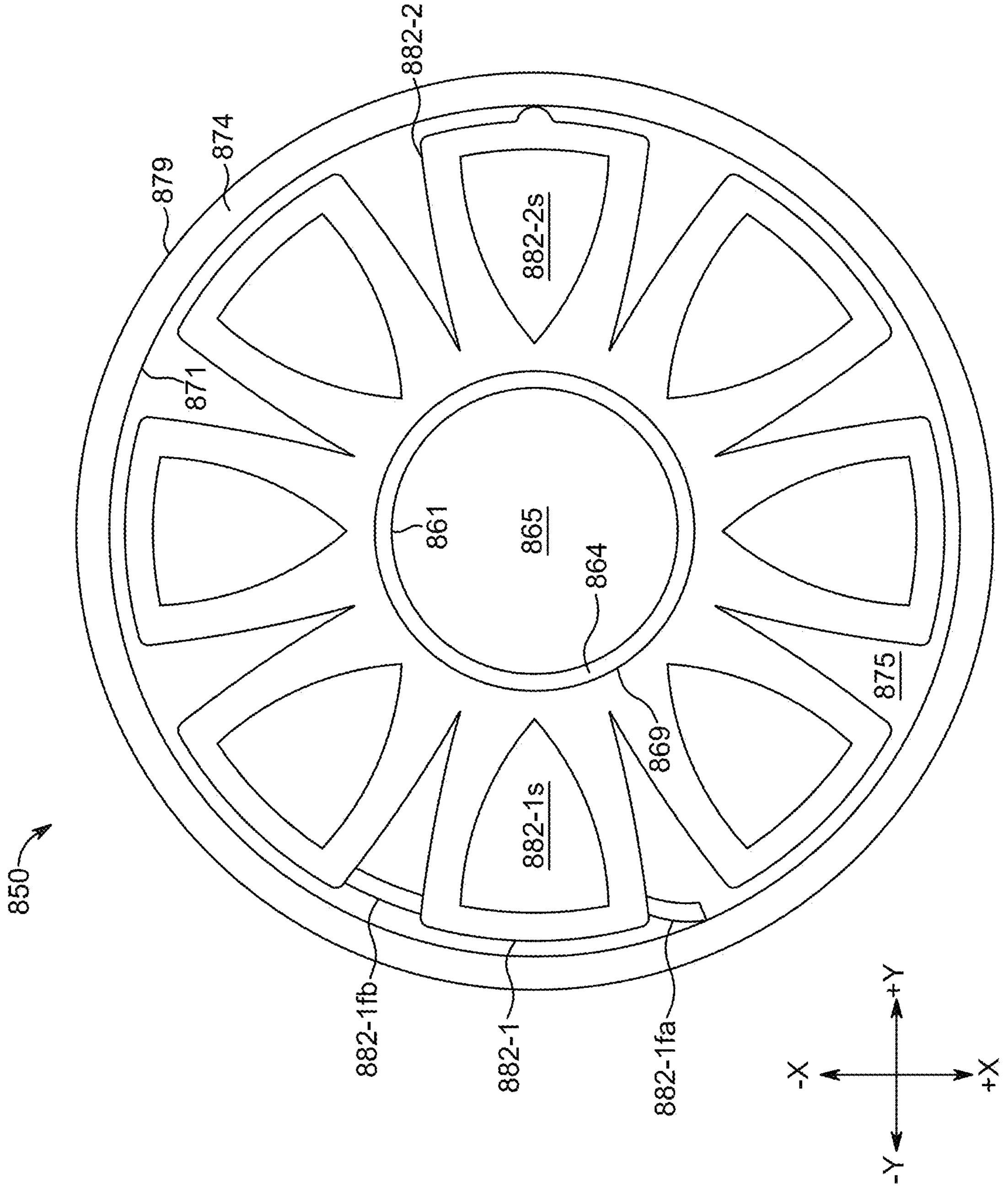
FIG. 31 is a cross-sectional view of the eartip subassembly of FIGS. 29 and 30, taken from line XXXI-XXXI of FIG. 30.

FIGS. 29-31 show another illustrative eartip subassembly 850, which may be similar to eartip subassembly 150 of FIGS. 1-4 but may include an outer eartip internal support subsystem with at least one support component that may define a fluid enclosure coupled to or integrally formed with an exterior surface of an inner eartip body for varying the effective rigidity of an exterior surface of an outer eartip body to affect the ability of the outer eartip body to conform to various ear canal geometries. Eartip subassembly 850 of FIGS. 29-31 may include similar components to eartip subassembly 150 of FIGS. 1-4, where elements of eartip subassembly 850 of FIGS. 29-31 being labeled with "7xx" reference labels may correspond to the "1xx" reference labels of the labeled elements of eartip subassembly 150 of FIGS. 1-4, and where differences therebetween may be described below. As shown, eartip subassembly 850 may include an inner eartip portion 860 and an outer eartip portion 870 coupled to inner eartip portion 860 at interface 855. Inner eartip portion 860 may include an inner eartip body 864 that may extend between an inner eartip back end 862 and an inner eartip front end 868, where both an inner eartip interior surface 861 of inner eartip body 864 and an opposite inner eartip exterior surface 869 of inner eartip body 864 may extend between inner eartip back end 862 and inner eartip front end 868, and where an inner eartip space 865 may be defined by inner eartip interior surface 861 and may extend between an inner eartip back opening 863 that may be provided through inner eartip back end 862 and an inner eartip front opening 867 that may be provided through inner eartip front end 868. Outer eartip portion 870 may include an outer eartip body 874 that may extend between an outer eartip back end 872 and an outer eartip front end 878, where both an outer eartip interior surface 871 of outer eartip body 874 and an opposite outer eartip exterior surface 879 of outer eartip body 874 may extend between outer eartip back end 872 and outer eartip front end 878, and where an outer eartip space 875 may be defined by outer eartip interior surface 871 (e.g., one portion of space 875 may be defined between outer eartip interior surface 871 and inner eartip exterior surface 869 when at least a portion of inner eartip body 864 is positioned between portions of outer eartip interior surface 871, and another portion of space 875 may be occupied by inner eartip body 864 and inner eartip space 865) and may extend between outer eartip back end 872 and outer eartip front end 878, while an outer eartip back opening 873 may be provided through outer eartip back end 872 and an outer eartip front opening 877 may be provided through outer eartip front end 878. Although not shown, eartip subassembly 850 may include any suitable inner eartip internal support system, such as inner eartip internal support system 166 of eartip subassembly 150 or inner eartip internal support system 266 of eartip subassembly 250. Additionally or alternatively, although not shown, eartip subassembly 850 may be coupled to any suitable housing subassembly and any suitable sound emitting subassembly in any suitable manner for providing any suitable earpiece for a headphone assembly.

Eartip subassembly 850 may include an outer eartip internal support subsystem 880 that may be operative to vary the ability of outer eartip exterior surface 879 to conform to various ear canal geometries for improving the ability of eartip subassembly 850 to create an effective acoustic seal and/or to provide comfort to the user. Outer eartip internal support subsystem 880 may be operative to vary the effective surface stiffness of eartip exterior surface 879 along a length of eartip exterior surface 879 (e.g., from outer eartip front end 878 to outer eartip back end 872) and/or about a perimeter of eartip exterior surface 879 (e.g., about at least a portion of the path of sound S (e.g., about the Z-axis in an X-Y plane)). Outer eartip internal support subsystem 880 may include one or more eartip internal support features, such as outer eartip internal support feature 881. As shown in FIGS. 29-31, outer eartip internal support feature 881 may include eight fluid enclosure support components, including fluid enclosure support components 882-1 and 882-2, although any other suitable number of fluid enclosure support components may be provided (e.g., 1, 2, 3, 7, or many more than 8). A first fluid enclosure support component 882-1 may include a support body 882-1*b* that may be coupled to or integrated with inner eartip exterior surface 869 in any suitable manner along any suitable path 869-1*p* on inner eartip exterior surface 869 such that at least a portion of an interior surface 882-*ii* of support body 882-1*b* and the portion of inner eartip exterior surface 869 within path 869-1*p* (i.e., inner eartip exterior surface portion 869-1*x*) may together define a fluid enclosure space 882-1*s* between inner eartip exterior surface portion 869-1*x* of inner eartip exterior surface 869 within path 869-1*p* and interior surface 882-1*i* of support body 882-1*b*. and such that at least a portion of an exterior surface 882-1*x* of support body 882-1*b* (e.g., opposite to interior surface 882-1*i*) may contact or lie proximal to a portion of outer eartip interior surface 871. Similarly, a second fluid enclosure support component 882-2 may include a support body 882-2*b* that may be coupled to or integrated with inner eartip exterior surface 869 in any suitable manner along any suitable path 869-2*p* on inner eartip exterior surface 869 such that at least a portion of an interior surface 882-2*i* of support body 882-1*b* and the portion of inner eartip exterior surface 869 within path 869-2*p* (i.e., inner eartip exterior surface portion 869-2*x*) may together define a fluid enclosure space 882-2*s* between inner eartip exterior surface portion 869-2*x* of inner eartip exterior surface 869 within path 869-2*p* and interior surface 882-2*i* of support body 882-2*b*, and such that at least a portion of an exterior surface 882-2*x* of support body 882-2*b* (e.g., opposite to interior surface 882-2*i*) may contact or lie proximal to a portion of outer eartip interior surface 871.

As shown, each one of the paths on inner eartip exterior surface 869 along which a support body of outer eartip internal support feature 881 is coupled may be unique and non-overlapping. For example, each one of the eight fluid enclosure space, including fluid enclosure spaces 882-1*s* and 882-2*s*, may be rotationally offset from one another about a longitudinal axis by any suitable amount (e.g., by 4.5°, as may be shown in the X-Y plane of FIG. 31 about longitudinal axis Z). Alternatively, two or more of such paths on inner eartip exterior surface 869 may overlap such that a portion of an inner eartip exterior surface portion of a first path may be the same as a portion of an inner eartip exterior surface portion of a second path.

The geometry of a support body of a fluid enclosure support component may be consistent or variable. For example, as shown, thickness 882-1*t* of support body 882-1*b* of support component 882-*i* between exterior surface 882-1*x* and interior surface 882-1*i* of support body 882-1*b* may be consistent along its entirety (e.g., between any two portions of support body 882-1*b* coupled to any two portions of path 869-1*p*). Alternatively, as shown, thickness 882-2*t* of support body 882-2*b* of support component 882-2 between exterior surface 882-2*x* and interior surface 882-2*i* of support body 882-2*b* may vary along different portions thereof. The size and shape of each fluid enclosure space defined by each fluid enclosure support component may be the same as each other, or the size and/or shape of one fluid enclosure space defined by one fluid enclosure support component may be different than that of another fluid enclosure space defined by another fluid enclosure support. A fluid enclosure space defined by a fluid enclosure support component of outer eartip internal support feature 881 may be any suitable size and/or any suitable shape. In an undeformed configuration of eartip subassembly 850 of FIGS. 29-31 (e.g., the functional configuration of eartip subassembly 850 without any external forces applied thereto, such as by a user), at least a portion of an interior surface of a support body may contact outer eartip interior surface 871 or may be distanced any suitable distance from outer eartip interior surface 871. For example, as shown, at least a portion of exterior surface 882-2*x* of support body 882-2*b* may contact outer eartip interior surface 871. In some embodiments, such contact may be maintained by coupling exterior surface 882-2*x* of support body 882-2*b* to outer eartip interior surface 871 (e.g., with adhesive(s), mechanical fastener(s), manufacturing techniques (e.g., molding), and the like). Alternatively, as shown, a portion of exterior surface 882-1*x* of support body 882-1*b* may be distanced any suitable distance 882-1*ed* from outer eartip interior surface 871, where such a distance 882-1*ed* may be small enough so as to be closed when outer eartip body 874 may receive an external force on outer eartip exterior surface 879 (e.g., by a user's ear canal) that may deform outer eartip interior surface 871 so as to push against a portion of exterior surface 882-Ix of support body 882-1*b* (e.g., such that the shape of fluid enclosure space 882-1*s* may be deformed).

As with fluid enclosure spaces of eartip subassembly 750, any suitable fluid may be held within a fluid enclosure space of a fluid enclosure support component in the default configuration of eartip subassembly 850, such as any suitable gas (e.g., air), any suitable liquid (e.g., water), any combination thereof, and the like, which may be operative to deform when the shape of the fluid enclosure space deforms due to deformation of any suitable portion of the surfaces defining the fluid enclosure space. The volume of such fluid may remain constant or may vary throughout the use of eartip subassembly 850. For example, as shown, support body 882-1*b* of fluid enclosure support component 882-1 may include one or more valves 882-1*v* that may be operative to selectively enable a fluid to enter into fluid enclosure space 882-1*s* and/or to exit fluid enclosure space 882-1*s* therethrough.

Additionally or alternatively, it is to be understood that any one or more of the support components of outer eartip internal support feature 881 of outer eartip internal support subsystem 880 may include one or more suitable flap portions, as described with respect to any flap portions of FIGS. 7-28 (e.g., extending in any suitable direction(s) from any suitable portion of exterior surface 882-1*x* of support body 882-1*b* with any suitable shape (e.g., for interfacing with and/or matching a contour of outer eartip interior surface 871 (e.g., flap portion 882-1*fa* of support component 882-1) and/or of exterior surface 882-1*x* of any adjacent support body (e.g., flap portion 882-1*fb* of support component 882-1))). Additionally or alternatively, although not shown in FIGS. 29-31, it is to be understood that outer eartip internal support subsystem 880 may include one or more additional outer eartip internal support features along with outer eartip internal support feature 881 (e.g., a second outer eartip internal support feature positioned longitudinally above or below outer eartip internal support feature 881 along and about outer eartip body 874 and/or along and about inner eartip body 864, such as an additional outer eartip internal support feature defining one or more additional fluid enclosure spaces that may have any suitable geometries or orientations that may be the same as or different than that of the fluid enclosure spaces of outer eartip internal support feature 881).

Any portion or the entirety eartip internal support feature 881 of outer eartip internal support subsystem 880 (e.g., support bodies and/or flap portions of eartip internal support feature 881) may be formed of any suitable material, which may be the same as or different than the material of inner eartip body 864 and/or outer eartip body 874. Moreover, one or more support bodies of outer eartip internal support subsystem 880 may be coupled to inner eartip portion 860 and/or outer eartip portion 870 using any suitable approach or mechanism, including, but not limited to, any suitable adhesive(s) (e.g., glues or tapes), any suitable gasket(s), any suitable heat staking or other heat treatment, any suitable interference fit(s), any suitable mechanical connector(s), and/or the like. Additionally or alternatively, one or more support bodies of outer eartip internal support subsystem 880 may be molded to or otherwise integrated with inner eartip portion 860 and/or outer eartip portion 870 using any suitable process (e.g., in a single or double-shot molding process).

FIGS. 32-34

Figure 32:
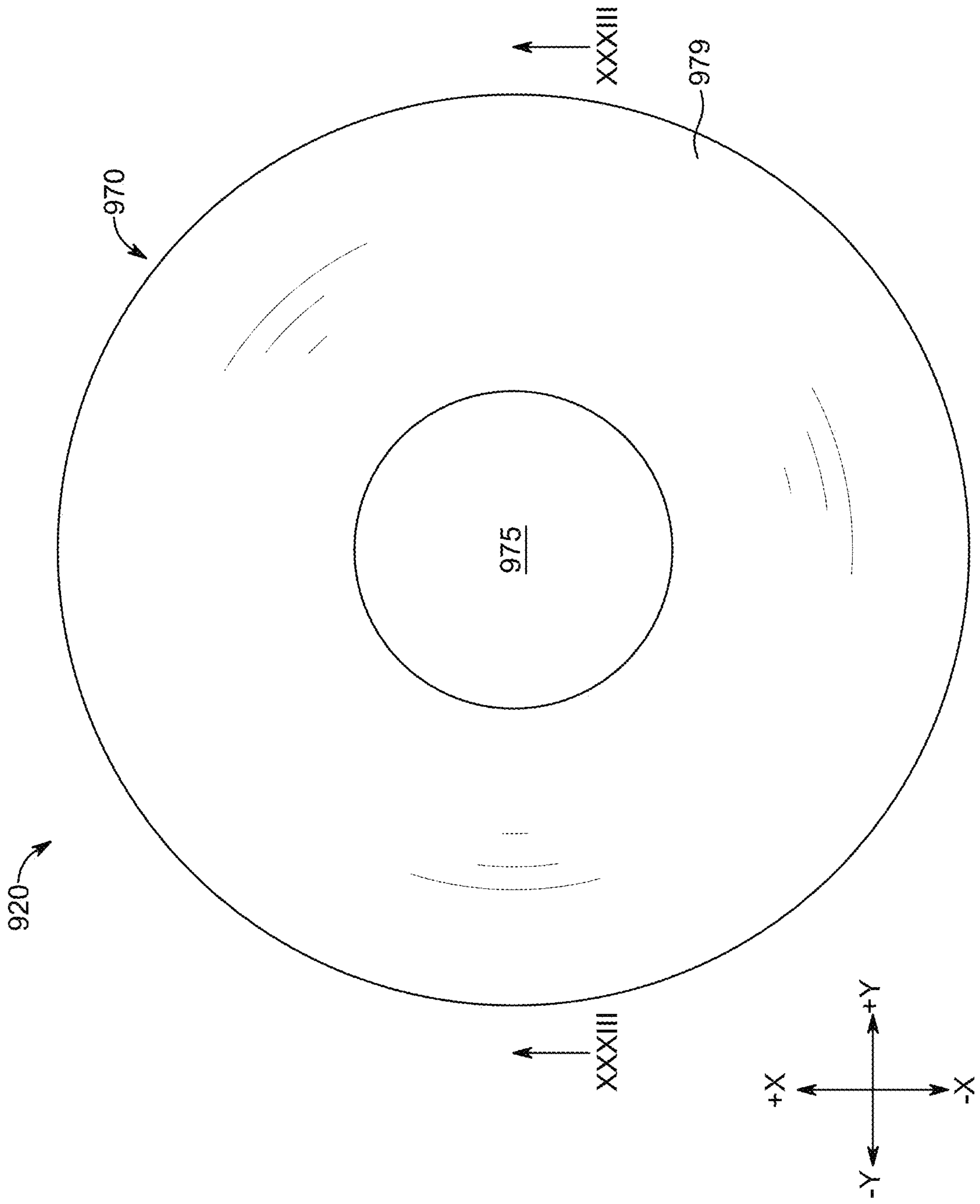
FIG. 32 is a top elevational view of yet another illustrative earpiece with internal support components.
Figure 33:
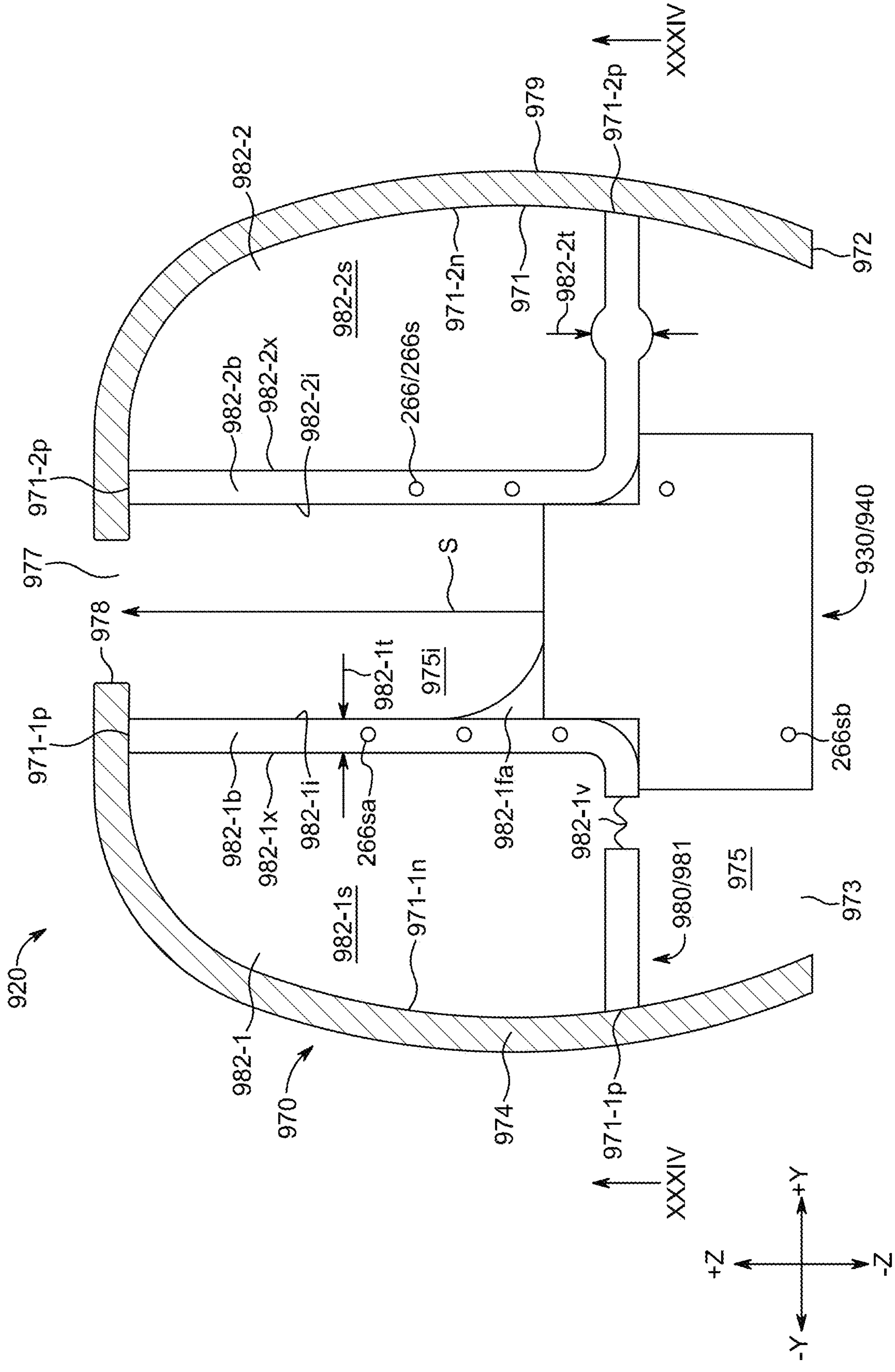
FIG. 33 is a cross-sectional view of the earpiece of FIG. 32, taken from line XXXIII-XXXIII of FIG. 32.
Figure 34:
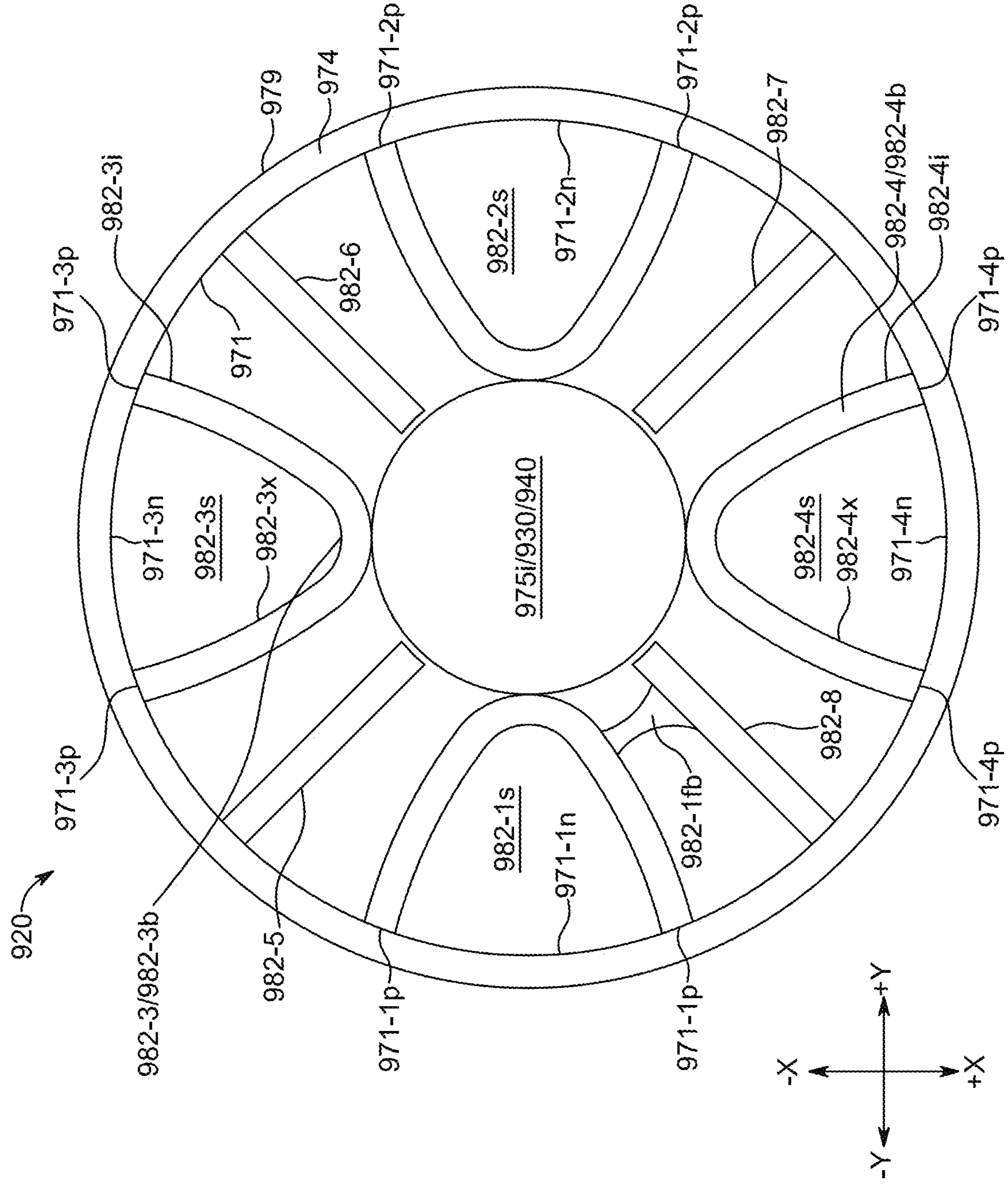
FIG. 34 is a cross-sectional view of the earpiece of FIGS. 32 and 33, taken from line XXXIV-XXXIV of FIG. 33.

FIGS. 32-34 show another illustrative earpiece 920, which may be similar to earpiece 120 of FIGS. 1-4 but may include an outer eartip internal support subsystem with at least one support component that may define a fluid enclosure coupled to or integrally formed with an interior surface of an outer eartip body for varying the effective rigidity of an exterior surface of the outer eartip body to affect the ability of the outer eartip body to conform to various ear canal geometries and for defining at least a portion of a sound path and/or for holding at least a portion of a sound emitting subassembly. Earpiece 920 of FIGS. 32-34 may include similar components to earpiece 120 of FIGS. 1-4, where elements of earpiece 920 of FIGS. 32-34 being labeled with "9xx" reference labels may correspond to the "1 xx" reference labels of the labeled elements of earpiece 120 of FIGS. 1-4, and where differences therebetween may be described below. As shown, earpiece 920 may include an eartip subassembly 950 that may include an outer eartip portion 970. Outer eartip portion 970 may include an outer eartip body 974 that may extend between an outer eartip back end 972 and an outer eartip front end 978, where both an outer eartip interior surface 971 of outer eartip body 974 and an opposite outer eartip exterior surface 979 of outer eartip body 974 may extend between outer eartip back end 972 and outer eartip front end 978, and where an outer eartip space 975 may be defined by outer eartip interior surface 971 (e.g., space 975 may be defined between the different portions of outer eartip interior surface 971) and may extend between outer eartip back end 972 and outer eartip front end 978, while an outer eartip back opening 973 may be provided through outer eartip back end 972 and an outer eartip front opening 977 may be provided through outer eartip front end 978. Earpiece 920 may also include any suitable housing subassembly 930 and any suitable sound emitting subassembly 940 for emitting sound S through a portion of outer eartip space 975, one or both of which may be coupled to eartip subassembly 950 in any suitable manner. Although not shown, earpiece 920 may also include any suitable inner eartip internal support system, such as inner eartip internal support system 166 of eartip subassembly 150. Alternatively, as shown, earpiece 920 may include inner eartip internal support system 266 of eartip subassembly 250, which may be operative to couple eartip subassembly 950 to housing subassembly 930 and/or to sound emitting subassembly 940. However, eartip subassembly 950 may not include an inner eartip portion (e.g., like inner eartip portion 160 of eartip subassembly 150). Instead, a portion of an eartip internal support subsystem (e.g., an interior surface of one or more fluid enclosure support bodies coupled to or integrated with outer eartip portion 970) may be operative to define an inner eartip space 975*i* of outer eartip space 975 (e.g., for at least partially retaining at least a portion of housing subassembly 930 and/or at least a portion of sound emitting subassembly 940, and/or for at least partially defining a path for sound S up towards outer eartip front opening 977, etc.).

Eartip subassembly 950 may include an outer eartip internal support subsystem 980 that may be operative to vary the ability of outer eartip exterior surface 979 to conform to various ear canal geometries for improving the ability of eartip subassembly 950 to create an effective acoustic seal and/or to provide comfort to the user. Outer eartip internal support subsystem 980 may be operative to vary the effective surface stiffness of eartip exterior surface 979 along a length of eartip exterior surface 979 (e.g., from outer eartip front end 978 to outer eartip back end 972) and/or about a perimeter of eartip exterior surface 979 (e.g., about at least a portion of the path of sound S (e.g., about the Z-axis in an X-Y plane)). Outer eartip internal support subsystem 980 may include one or more eartip internal support features, such as outer eartip internal support feature 981. As shown in FIGS. 32-34, outer eartip internal support feature 981 may include four fluid enclosure support components, including enclosure support components 982-1, 982-2, 982-3, and 982-4, although any other suitable number of fluid enclosure support components may be provided (e.g., 1, 2, 3, or many more than 4). First fluid enclosure support component 982-1 may include a support body **982-1*b* that may be coupled to or integrated with outer eartip interior surface 971 in any suitable manner along any suitable path 971-1*p* on outer eartip interior surface 971 such that at least a portion of an exterior surface 982-1*x* of support body 982-1*b* and the portion of outer eartip interior surface 971 within path 971-1*p* (i.e., outer eartip interior surface portion 971-1*n*) may together define a fluid enclosure space 982-1*s* between outer eartip interior surface portion 971-1*n* of outer eartip interior surface 971 within path 971-1*p* and exterior surface 982-1*x* of support body 982-1*b*, and such that at least a portion of an interior surface 982-1*i* of support body 982-1*b* (e.g., opposite to exterior surface 982-1*x*) may face inwardly for defining at least a portion of inner eartip space 975*i* of outer eartip space 975. Similarly, second fluid enclosure support component 982-2 may include a support body 982-2*b* that may be coupled to or integrated with outer eartip interior surface 971 in any suitable manner along any suitable path 971-2*p* on outer eartip interior surface 971 such that at least a portion of an exterior surface 982-2*x* of support body 982-2*b* and the portion of outer eartip interior surface 971 within path 971-1*p* (i.e., outer eartip interior surface portion 971-2*n*) may together define a fluid enclosure space 982-2*s* between outer eartip interior surface portion 971-2*n* of outer eartip interior surface 971 within path 971-2*p* and exterior surface 982-2*x* of support body 982-2*b*, and such that at least a portion of an interior surface 982-2*i* of support body 982-2*b* (e.g., opposite to exterior surface 982-2*x*) may face inwardly for defining at least a portion of inner eartip space 975*i* of outer eartip space 975. Similarly, third fluid enclosure support component 982-3 may include a support body 982-3*b* that may be coupled to or integrated with outer eartip interior surface 971 in any suitable manner along any suitable path 971-3*p* on outer eartip interior surface 971 such that at least a portion of an exterior surface 982-3*x* of support body 982-3*b* and the portion of outer eartip interior surface 971 within path 971-3*p* (i.e., outer eartip interior surface portion 971-3*n*) may together define a fluid enclosure space 982-3*s* between outer eartip interior surface portion 971-3*n* of outer eartip interior surface 971 within path 971-3*p* and exterior surface 982-3*x* of support body 982-3*b*, and such that at least a portion of an interior surface 982-3*i* of support body 982-3*b* (e.g., opposite to exterior surface 982-3*x*) may face inwardly for defining at least a portion of inner eartip space 975*i* of outer eartip space 975. Similarly, fourth fluid enclosure support component 982-4 may include a support body 982-4*b* that may be coupled to or integrated with outer eartip interior surface 971 in any suitable manner along any suitable path 971-4*p* on outer eartip interior surface 971 such that at least a portion of an exterior surface 982-4*x* of support body 982-4*b* and the portion of outer eartip interior surface 971 within path 971-4*p* (i.e., outer eartip interior surface portion 971-4*n*) may together define a fluid enclosure space 982-4*s* between outer eartip interior surface portion 971-4*n* of outer eartip interior surface 971 within path 971-4*p* and exterior surface 982-4*x* of support body 982-4*b*, and such that at least a portion of an interior surface 982-4*i* of support body 982-4*b* (e.g., opposite to exterior surface 982-4*x*) may face inwardly for defining at least a portion of inner eartip space 975*i* of outer eartip space 975**.

As shown, each one of paths **971-1*p* through 971-4*p* may be unique and non-overlapping. For example, fluid enclosure spaces 982-1*s* through 982-4*s* may be rotationally offset from one another about a longitudinal axis by any suitable amount (e.g., by 90°, as may be shown in the X-Y plane of FIG. 34 about longitudinal axis Z). Alternatively, two or more of paths 971-1*p* through 971-4*p*** may overlap such that a portion of an outer eartip interior surface portion of a first path may be the same as a portion of an outer eartip interior surface portion of a second path.

The geometry of a support body of a fluid enclosure support component may be consistent or variable. For example, as shown, thickness **982-1*t* of support body 982-1*b* of support component 982-1 between exterior surface 982-1*x* and interior surface 982-1*i* of support body 982-1*b* may be consistent along its entirety (e.g., between any two portions of support body 982-1*b* coupled to any two portions of path 971-1*p*). Alternatively, as shown, thickness 982-2*t* of support body 982-2*b* of support component 982-2 between exterior surface 982-2*x* and interior surface 982-2*i* of support body 982-2*b* may vary along different portions thereof. The size and shape of each fluid enclosure space defined by each fluid enclosure support component may be the same as each other, or the size and/or shape of one fluid enclosure space defined by one fluid enclosure support component may be different than that of another fluid enclosure space defined by another fluid enclosure support. A fluid enclosure space defined by a fluid enclosure support component may be any suitable size and/or any suitable shape. In an undeformed configuration of eartip subassembly 950 of FIGS. 32-34 (e.g., the functional configuration of eartip subassembly 950 without any external forces applied thereto, such as by a user), at least a portion of an interior surface of a support body may face another portion of that same interior surface or the interior surface of another support body for defining at least a portion of inner eartip space 975*i* of outer eartip space 975. Additionally, in some embodiments, other types of support components may be provided by outer eartip internal support feature 981 of eartip internal support subsystem 980 other than a number of fluid enclosure support components. For example, as shown, any suitable number of non-fluid enclosure support components 982-5 through 982-8 may be provided, each of which may be similar to support component 682-1 of FIGS. 22 and 23, and each of which may include a free end that may be operative to define at least a portion of inner eartip space 975*i* of outer eartip space 975. As shown, each one of non-fluid enclosure support components 982-5 through 982-8 may be rotationally offset from one another and interspersed between two particular ones of fluid enclosure support components 982-1 through 982-4**.

Inner eartip space **975*i*, as may be at least partially defined by a portion of one or more support components, may be operative to receive and at least partially retain at least a portion of housing subassembly 930 and/or sound emitting subassembly 940 such that sound S emitted therefrom may be effectively passed through inner eartip space 975*i* and out from outer eartip front opening 977. In some embodiments, the size and/or shape of at least a portion of inner eartip space 975*i* in its default configuration (e.g., when no external forces are being applied to eartip subassembly 950) may be such that at least a portion of housing subassembly 930 and/or sound emitting subassembly 940 may not fit therein, such that at least a portion of housing subassembly 930 and/or sound emitting subassembly 940 must deform one or more of the support components for deforming the size and/or shape of at least a portion of inner eartip space 975***i* from its default configuration such that housing subassembly 930 and/or sound emitting subassembly 940 may be held within inner eartip space 975*i*. In some embodiments, such contact between at least a portion of the one or more support components defining inner eartip space 975*i* (e.g., interior surface 982-*ii* of support body 982-1*b*) and a portion of housing subassembly 930 and/or sound emitting subassembly 940 may be maintained prior to, during, and after outer eartip body 974 may receive an external force on outer eartip exterior surface 979 (e.g., by a user's ear canal) that may deform outer eartip interior surface portion 971-*ln* of outer eartip interior surface 971 within path 971-1*p* such that the shape of fluid enclosure space 982-1*s* may be deformed for pushing a portion of interior surface 982-1*i* of support body 982-1*b* further against a portion of housing subassembly 930 and/or sound emitting subassembly 940. In some embodiments, as shown, spring component 266*s* of internal support system 266 of eartip subassembly 250 may be provided through portions of one or more of the support bodies defining inner eartip space 975*i* of subassembly 950 (e.g., rather than through inner eartip body 264 of subassembly 250) and/or at least a portion of housing subassembly 930 and/or of sound emitting subassembly 940.

Any suitable fluid may be held within a fluid enclosure space of a fluid enclosure support component in the default configuration of eartip subassembly 950, such as any suitable gas (e.g., air), any suitable liquid (e.g., water), any combination thereof, and the like, which may be operative to deform when the shape of the fluid enclosure space deforms due to deformation of any suitable portion of the surfaces defining the fluid enclosure space. In some embodiments, the volume of such fluid may remain constant throughout the use of eartip subassembly 950 (e.g., the volume of such fluid in the default configuration of the fluid enclosure space may be the same as when the fluid enclosure space is deformed (e.g., when eartip subassembly 950 is positioned within a user's ear canal)). In other embodiments, the volume of such fluid may vary throughout the use of eartip subassembly 950 (e.g., fluid may be enabled to enter and exit the fluid enclosure space as the fluid enclosure space changes shapes). For example, as shown, support body 982-1*b* of fluid enclosure support component 982-1 may include one or more valves 982-1*v* that may be operative to selectively enable a fluid to enter into fluid enclosure space 982-1*s* and/or to exit fluid enclosure space 982-1*s* therethrough.

Additionally or alternatively, it is to be understood that any one or more of the support components of outer eartip internal support feature 981 of outer eartip internal support subsystem 980 may include one or more suitable flap portions, as described with respect to any flap portions of FIGS. 7-31 (e.g., extending in any suitable direction(s) from any suitable portion of interior surface 982-1*i* of support body 982-1*b* with any suitable shape (e.g., for interfacing with and/or matching a contour of a portion of housing subassembly 930 and/or sound emitting subassembly 940 (e.g., flap portion 982-1*fa* of support component 982-1) and/or of a portion of an adjacent support component (e.g., support component 982-5 and/or support component 982-8 (e.g., flap portion 982-1*fb* of support component 982-1)))). Additionally or alternatively, although not shown in FIGS. 32-34, it is to be understood that outer eartip internal support subsystem 980 may include one or more additional outer eartip internal support features along with outer eartip internal support feature 981 (e.g., a second outer eartip internal support feature positioned longitudinally above or below outer eartip internal support feature 981 along and about outer eartip body 974, such as an additional outer eartip internal support feature defining one or more additional fluid enclosure spaces that may have any suitable geometries or orientations that may be the same as or different than that of the fluid enclosure spaces of outer eartip internal support feature 981).

Any portion or the entirety of eartip internal support feature 981 of outer eartip internal support subsystem 980 (e.g., support bodies and/or flap portions of eartip internal support feature 981) may be formed of any suitable material, which may be the same as or different than the material of outer eartip body 974. Moreover, one or more support bodies of outer eartip internal support subsystem 980 may be coupled to outer eartip portion 970 using any suitable approach or mechanism, including, but not limited to, any suitable adhesive(s) (e.g., glues or tapes), any suitable gasket(s), any suitable heat staking or other heat treatment, any suitable interference fit(s), any suitable mechanical connector(s), and/or the like. Additionally or alternatively, one or more support bodies of outer eartip internal support subsystem 980 may be molded to or otherwise integrated with outer eartip portion 970 using any suitable process (e.g., in a single or double-shot molding process).

Further Description of FIGS. 1-34

Therefore, independent of any geometry or material variability of an inner eartip body and/or of an outer eartip body of an eartip subassembly, any suitable inner eartip internal support subsystem (e.g., any suitable inner eartip internal support component(s) of subsystem 166 and/or subsystem 266) and/or any suitable outer eartip internal support subsystem (e.g., any suitable outer eartip internal support component(s) of subsystem 380, subsystem 480, subsystem 580, subsystem 680, subsystem 780, subsystem 880, and/or subsystem 980) may be operative to vary the effective rigidity of an eartip body for affecting the ability of the eartip subassembly to conform to various ear canal geometries. Different support components of one or more internal support subsystems may be positioned and configured to provide specific amounts and types of additional rigidity at specific portions of an exterior surface of an outer eartip body that may be expected to interface with specific portions of a user's ear canal geometry when the eartip subassembly is positioned within the user's ear canal (e.g., such that the eartip subassembly may be operative to conform to different bumps along the surfaces of the ear canal while maintaining an acoustic seal and while providing comfort to the user). Additionally or alternatively, at least one support component of an internal support subsystem may be positioned and configured to provide specific amounts and types of additional rigidity at specific portions of an inner eartip body defining an inner eartip space that may transmit sound to a user when the eartip subassembly is positioned within the user's ear canal (e.g., such that the eartip subassembly may be operative to ensure an effective sound path while also at least partially conforming to various ear canal geometries).

While there have been described headphone eartips with internal support components and methods for making the same, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. It is also to be understood that various directional and orientational terms, such as “up” and “down,” “front” and “back,” “exterior” and “interior,” “top” and “bottom” and “side,” “length” and “width” and “depth,” “thickness” and “diameter” and “cross-section” and “longitudinal,” “X−” and “Y−” and “Z−,” and the like may be used herein only for convenience, and that no fixed or absolute directional or orientational limitations are intended by the use of these words.

Therefore, those skilled in the art will appreciate that the invention can be practiced by other than the described embodiments, which are presented for purposes of illustration rather than of limitation.

What is claimed is:

1. An ear tip comprising:

an inner ear tip wall defining a sound channel extending along a length of the ear tip from an inner ear tip front end to an inner ear tip back end opposite the inner ear tip front end;

an outer ear tip wall integral with and extending away from the inner ear tip front end to an outer ear tip wall distal end that extends fully around a portion of the inner ear tip wall, wherein the outer ear tip wall is operative to be at least partially positioned within a human ear canal; and a support body disposed between the inner ear tip wall and the outer ear tip wall;

wherein the ear tip comprises first, second, third and fourth quadrants, each of which represents a nonoverlapping 90 degree segment extending radially from the inner ear tip wall to the outer ear tip wall, and wherein the support body is positioned entirely within first 90 quadrant of the ear tip changing a rigidity and effective stiffness of the ear tip in the first quadrant as compared to a rigidity and effective stiffness of the ear tip in the second, third and fourth quadrants.

2. The ear tip set forth in claim 1 wherein the support body varies an effective surface stiffness of an exterior surface of the ear tip along a length of the exterior surface.

3. The ear tip set forth in claim 1 wherein the support body extends from the outer ear tip wall towards the inner ear tip wall.

4. The ear tip set forth in claim 3 wherein an end of the support body is operative to be pressed against and follow a portion of a contour of an outer surface of the inner ear tip wall.

5. The ear tip set forth in claim 1 wherein the support body extends from the inner ear tip wall towards the outer ear tip wall.

6. The ear tip set forth in claim 5 wherein the support body includes first and second opposing ends, the first end being integrally coupled with the inner ear tip wall and the second end including a flap facing the outer ear tip wall.

7. The ear tip set forth in claim 1 wherein the support body is integrally coupled with both the inner ear tip wall and the outer ear tip wall.

8. The ear tip set forth in claim 1 wherein the sound channel defined by the inner ear tip wall has a circular cross-section.

9. The ear tip set forth in claim 1 wherein the sound channel defined by the inner ear tip wall has an elliptical cross-section.

10. The ear tip set forth in claim 1 wherein the outer ear tip wall has a constant thickness from the inner ear tip front end to the outer ear tip wall distal end.

11. An ear tip comprising:

an inner ear tip wall defining a sound channel extending along a length of the ear tip from an inner ear tip front end to an inner ear tip back end opposite the inner ear tip front end;

an outer ear tip wall integral with and extending away from the inner ear tip front end to an outer ear tip wall distal end that extends fully around a portion of the inner ear tip wall, wherein the outer ear tip wall is operative to be at least partially positioned within a human ear canal;

a first support component disposed between the inner ear tip wall and the outer ear tip wall; and a second support component disposed between the inner ear tip wall and the outer ear tip wall;

wherein the ear tip comprises first, second, third and fourth quadrants, each of which represents a nonoverlapping 90 degree segment extending radially from the inner ear tip wall to the outer ear tip wall with the first and third quadrants opposite each other and the second and fourth quadrants opposite each other; and wherein the first support component is positioned entirely within first 90 quadrant of the ear tip changing a rigidity and effective stiffness of the ear tip in the first quadrant as compared to a rigidity and effective stiffness of the ear tip in the second and third quadrants and the second support component is disposed entirely within the third quadrant changing a rigidity and effective stiffness of the ear tip in the third quadrant as compared to the rigidity and effective stiffness of the ear tip in the second and third quadrants.

12. The ear tip set forth in claim 11 wherein each of the first and second support components vary an effective surface stiffness of an exterior surface of the ear tip along a length of the exterior surface.

13. The ear tip set forth in claim 11 wherein the first and second support components have different cross-sectional shapes.

14. The ear tip set forth in claim 11 first wherein the support component extends from the outer ear tip wall towards the inner ear tip wall.

15. The ear tip set forth in claim 14 wherein an end of the first support component is operative to be pressed against and follow a portion of a contour of an outer surface of the inner ear tip wall.

16. The ear tip set forth in claim 11 wherein the second support component extends from the inner ear tip wall towards the outer ear tip wall.

17. The ear tip set forth in claim 16 wherein the second support component includes first and second opposing ends, the first end being integrally coupled with the inner ear tip wall and the second end facing and being spaced apart from the outer ear tip wall.

18. The ear tip set forth in claim 11 wherein the sound channel defined by the inner ear tip wall has a circular cross-section.

19. The ear tip set forth in claim 11 wherein the sound channel defined by the inner ear tip wall has an elliptical cross-section.

20. The ear tip set forth in claim 11 wherein the outer ear tip wall has a constant thickness from the inner ear tip front end to the outer ear tip wall distal end.

* * * * *